(12) United States Patent
Balderston

(10) Patent No.: US 11,552,667 B2
(45) Date of Patent: Jan. 10, 2023

(54) ADAPTIVE SUPPORT ACCESSORY FOR MOBILE DEVICES

(71) Applicant: Brian Robert Balderston, Centennial, CO (US)

(72) Inventor: Brian Robert Balderston, Centennial, CO (US)

(*) Notice: Subject to any disclaimer, the term of this patent is extended or adjusted under 35 U.S.C. 154(b) by 0 days.

(21) Appl. No.: 17/028,745

(22) Filed: Sep. 22, 2020

(65) Prior Publication Data

US 2022/0094379 A1  Mar. 24, 2022

(51) Int. Cl.
*H04B 1/3877* (2015.01)
*H04M 1/725* (2021.01)
*H04B 1/3827* (2015.01)

(52) U.S. Cl.
CPC ........... *H04B 1/3877* (2013.01); *H04B 1/385* (2013.01); *H04M 1/725* (2013.01); *H04B 2001/3861* (2013.01)

(58) Field of Classification Search
CPC .................................................... H04B 1/3877
See application file for complete search history.

(56) References Cited

U.S. PATENT DOCUMENTS

| | | | |
|---|---|---|---|
| 6,550,108 B2 | 4/2003 | Pratl | |
| 9,421,920 B2 | 8/2016 | Jang | |
| 10,419,054 B1 | 9/2019 | VanTassell et al. | |
| 10,666,781 B1 * | 5/2020 | Gyasi | H04B 1/385 |
| 2014/0166707 A1 | 6/2014 | Leisey-Bartsch | |
| 2014/0364176 A1 | 12/2014 | Pintor | |
| 2015/0257288 A1 | 9/2015 | Livernois | |
| 2015/0312389 A1 * | 10/2015 | Curran | H04M 1/0281 455/575.6 |
| 2016/0049983 A1 * | 2/2016 | Ripka | H04M 1/04 455/575.6 |
| 2016/0088924 A1 | 3/2016 | Haymond et al. | |
| 2017/0201286 A1 * | 7/2017 | Qian | H04B 1/3877 |
| 2018/0007184 A1 * | 1/2018 | Palacino | H04M 1/04 |
| 2019/0126154 A1 * | 5/2019 | Sears | H04M 1/04 |

FOREIGN PATENT DOCUMENTS

| | | |
|---|---|---|
| KR | 20140003807 A | 1/2014 |
| KR | 101733435 B1 | 5/2017 |
| KR | 200485274 Y1 | 12/2017 |
| KR | 101825404 B1 | 2/2018 |

* cited by examiner

*Primary Examiner* — Hsinchun Liao
(74) *Attorney, Agent, or Firm* — Holzer Patel Drennan

(57) ABSTRACT

An adaptive support accessory for providing improved handling, positioning, mounting, and adapting of a mobile device is disclosed. The accessory includes a base attachable to a mobile device and a cap rotationally coupled to the base. The base includes an annular base protrusion centered about an axis of rotation. The cap includes an annular cap protrusion centered about the axis of rotation and disposed adjacent to the annular base protrusion. An aperture formed in the center of the accessory and defining an interior perimetric face provides an engagement feature configured for engaging one or more of a user's fingers, a plug, a mount, and a mounting structure. One or more supports attached to the cap may be configured to engage one or more of a user's fingers, a mount, and a mounting structure. One or more detachably attachable plugs provide additional mounting, adapting, and augmenting the accessory.

27 Claims, 37 Drawing Sheets

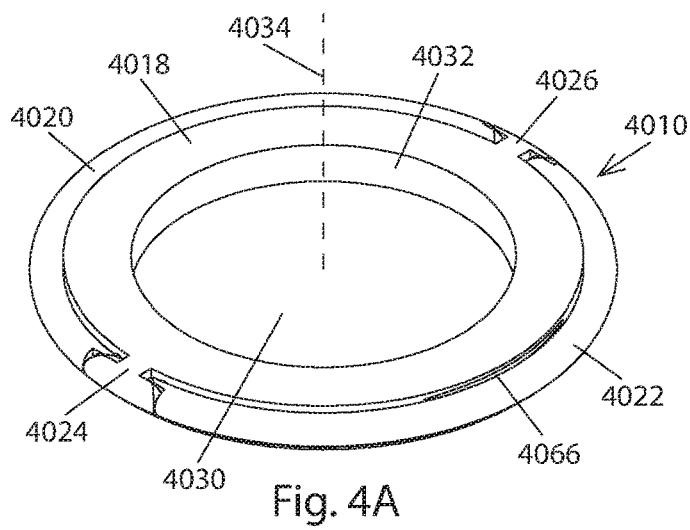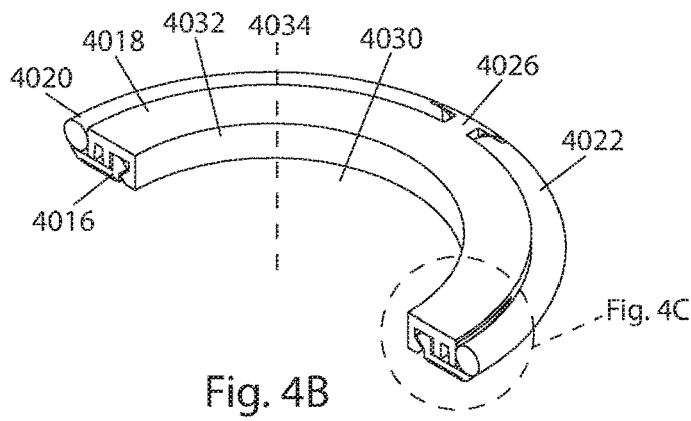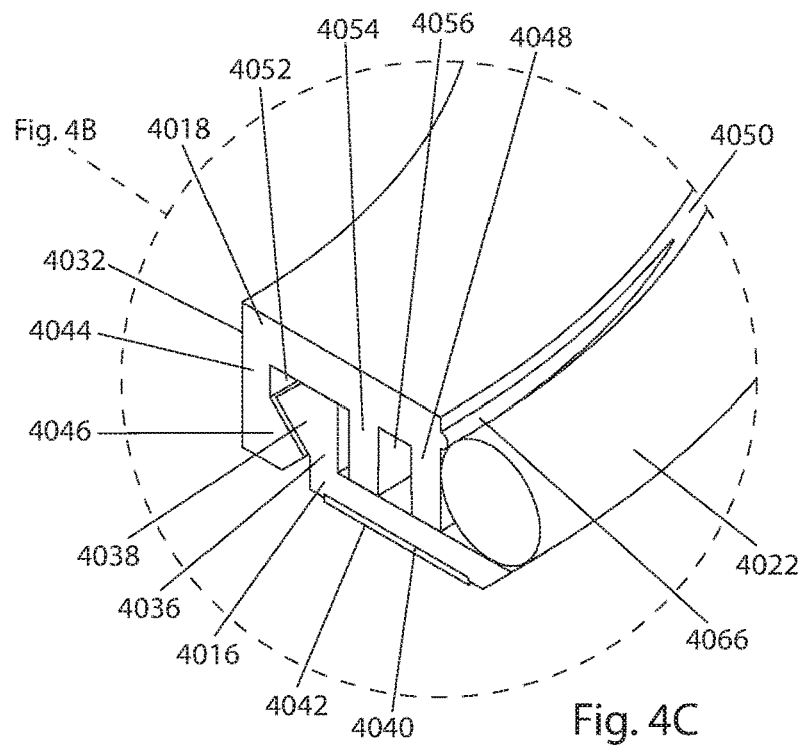

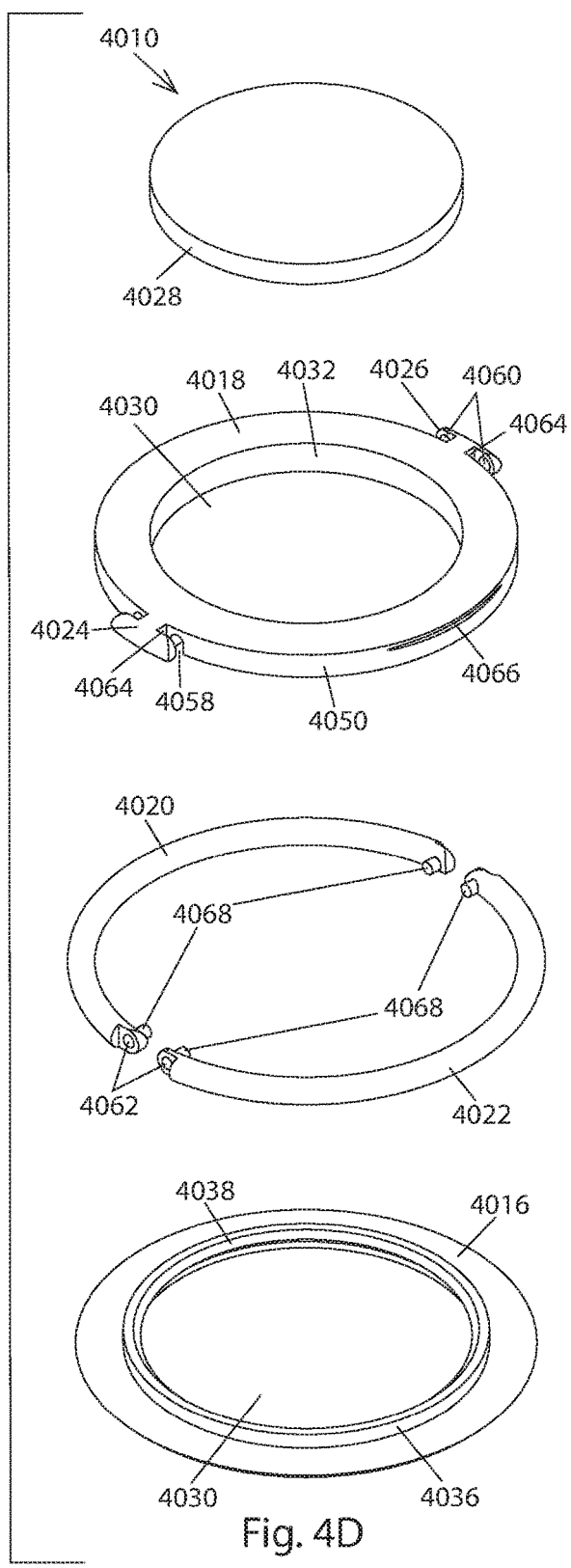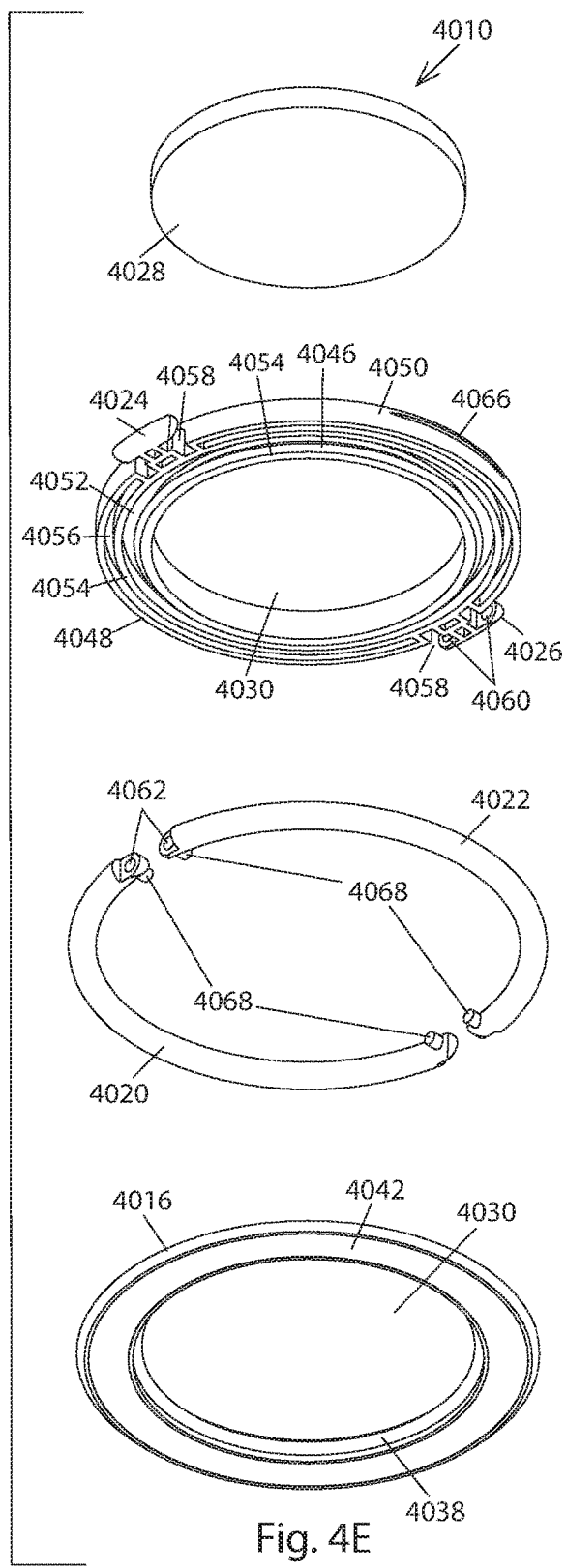

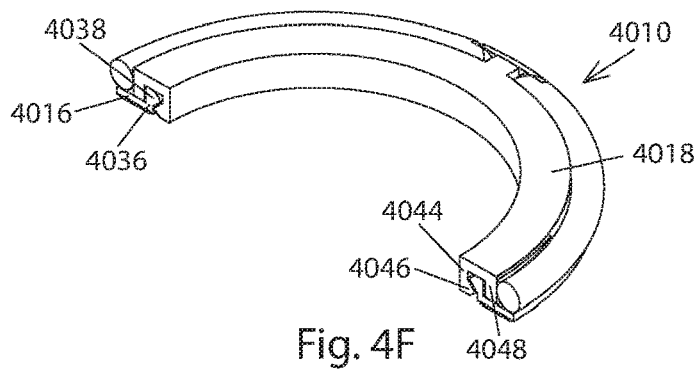
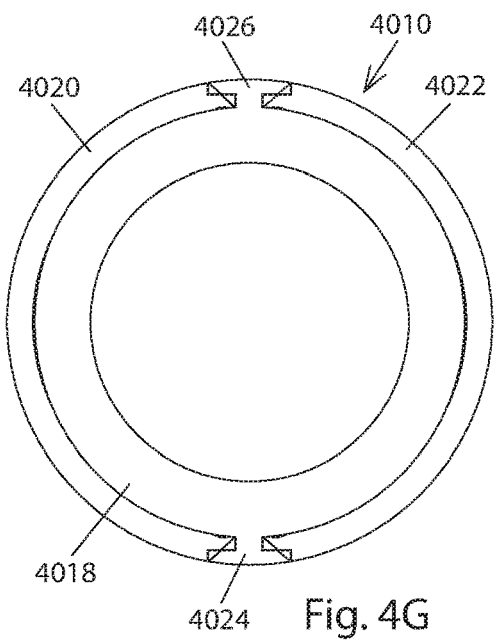
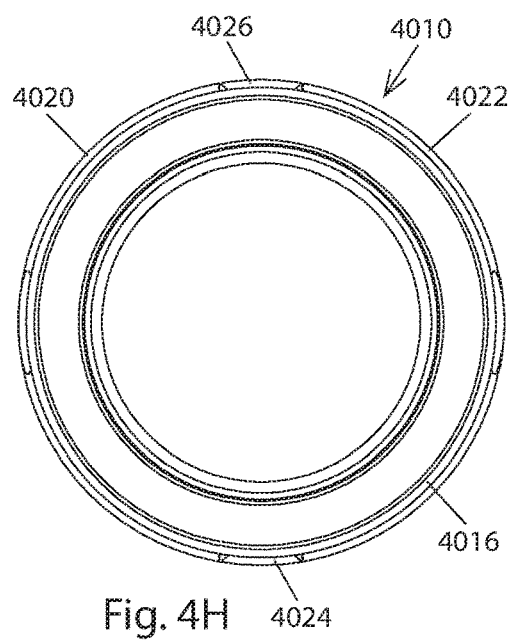
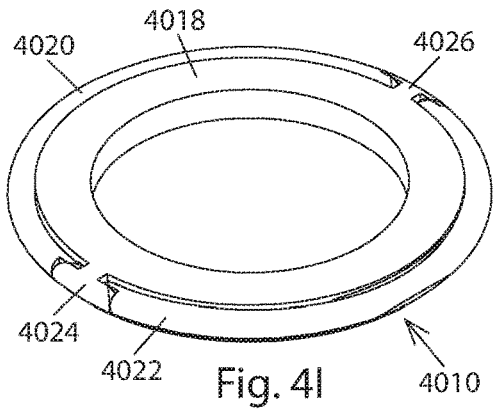
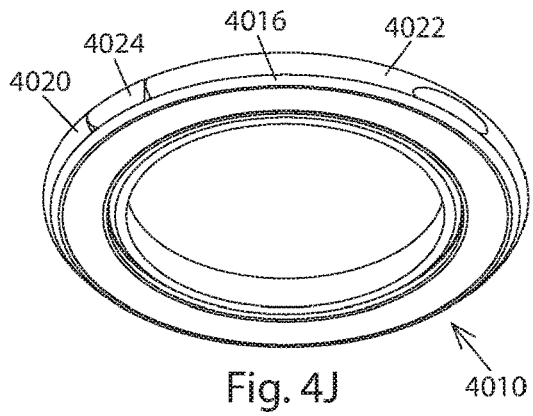
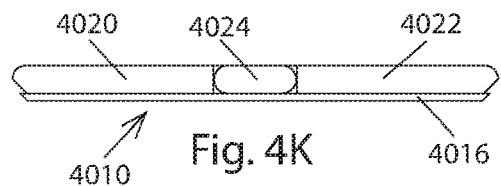
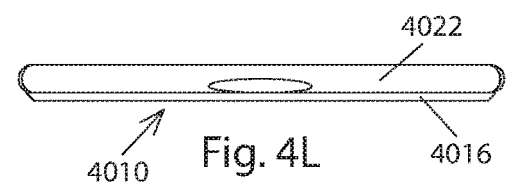

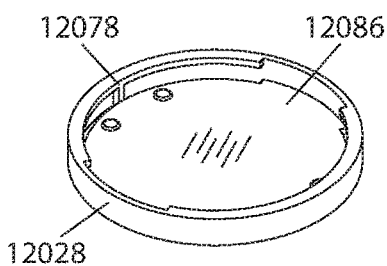
Fig. 12A
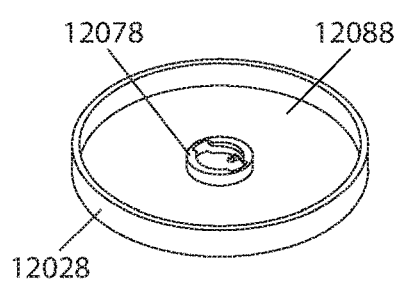
Fig. 12B
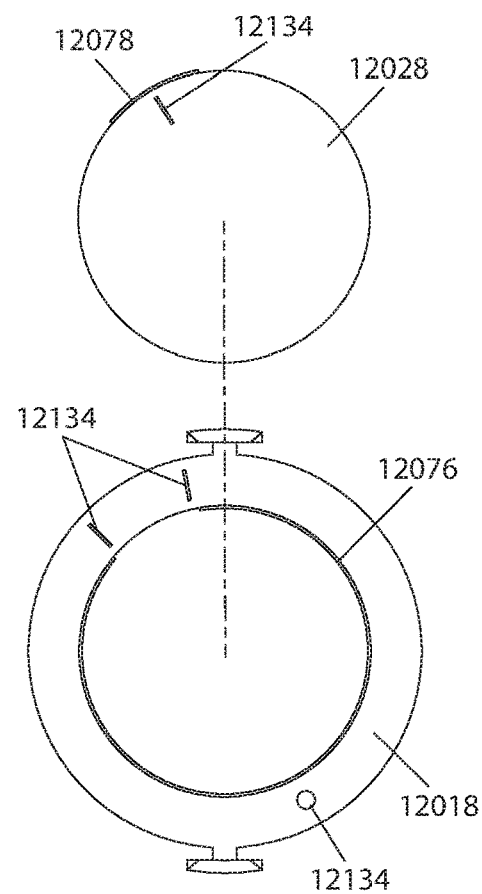
Fig. 12C
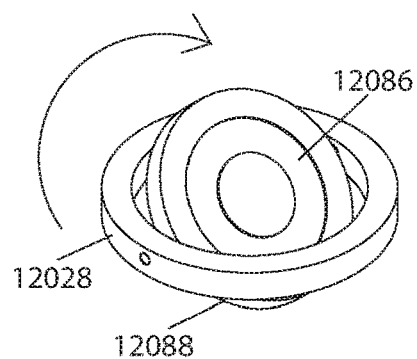
Fig. 12D
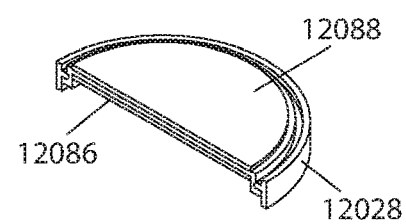
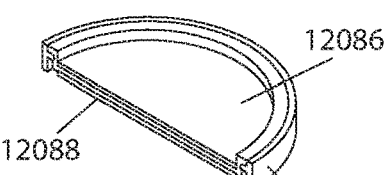
Fig. 12E
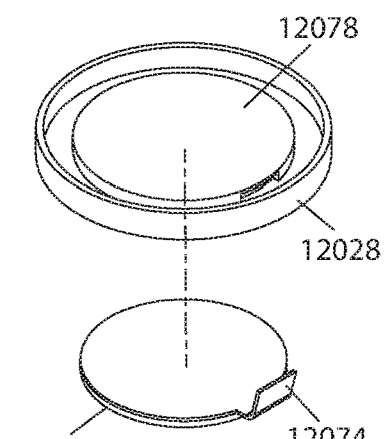
Fig. 12F

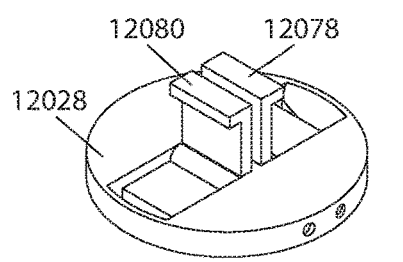
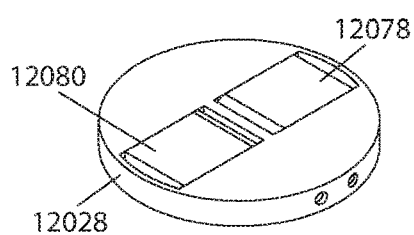
Fig. 12G
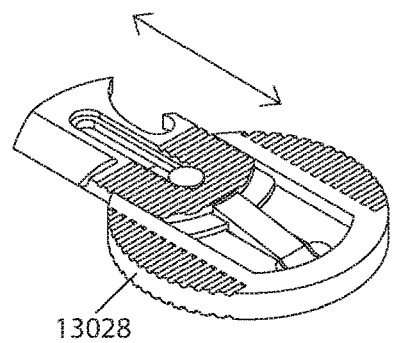
Fig. 13A
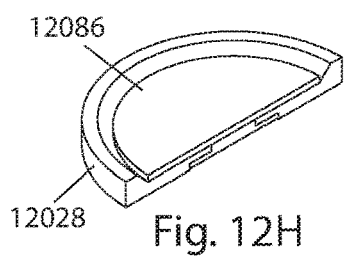
Fig. 12H
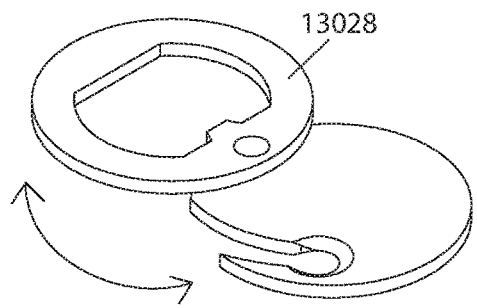
Fig. 13B
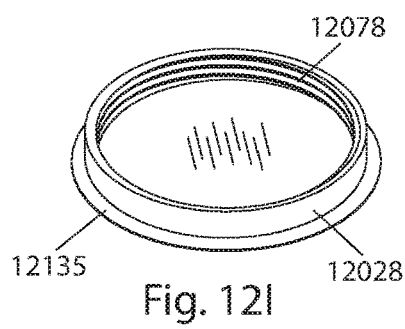
Fig. 12I
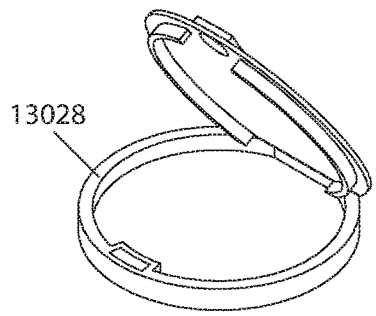
Fig. 13C
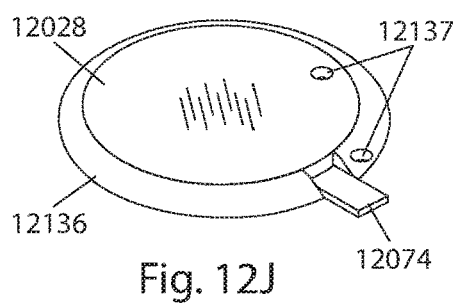
Fig. 12J
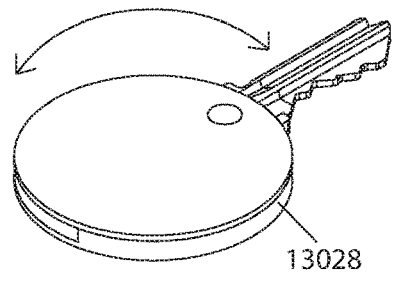
Fig. 13D

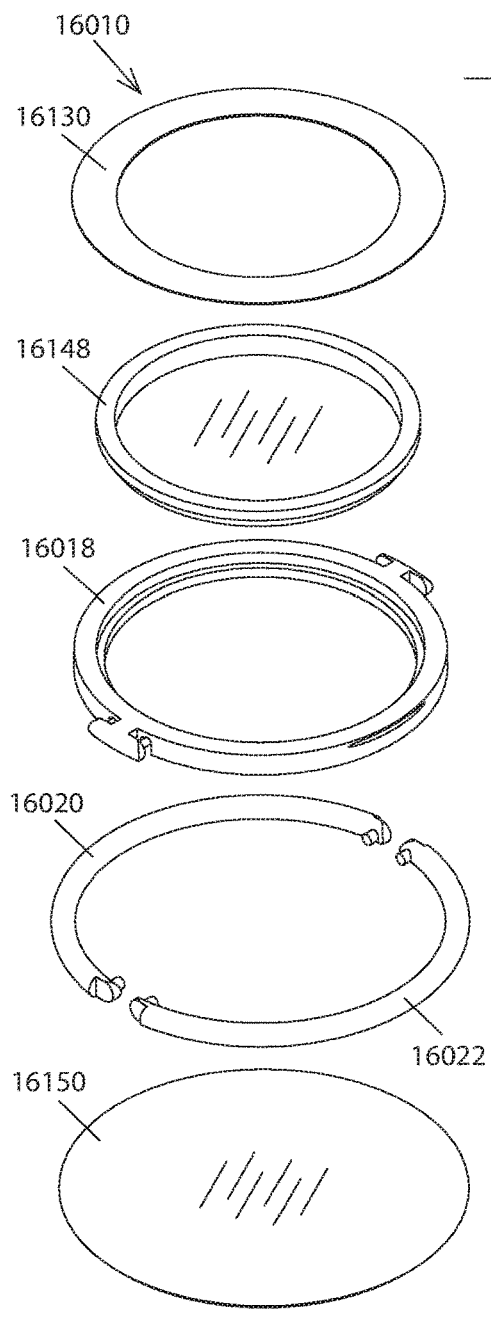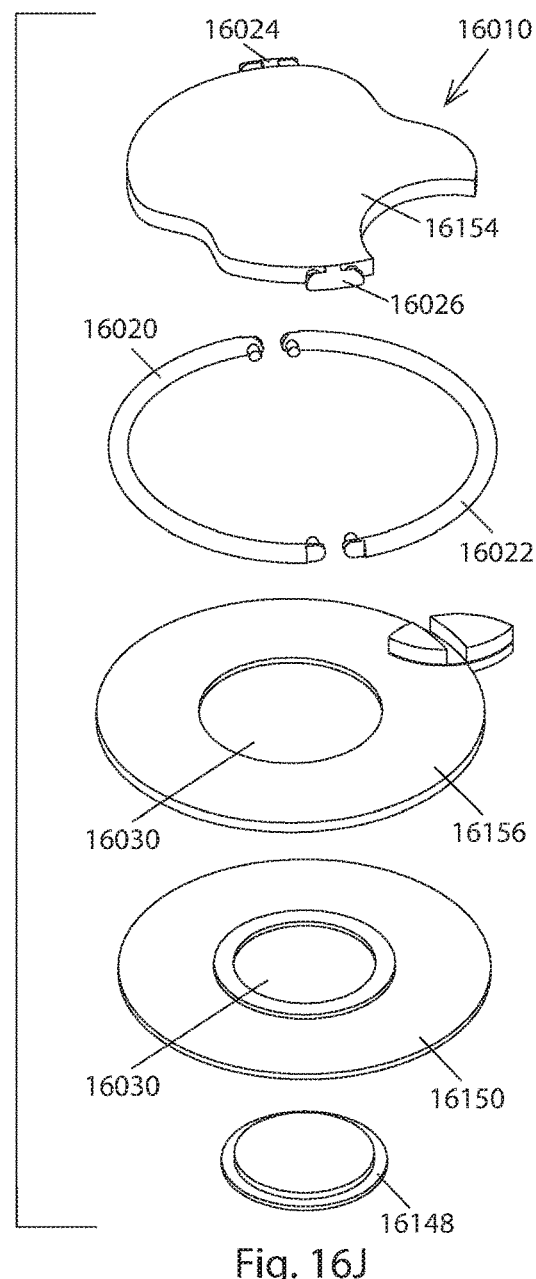
Fig. 16G
Fig. 16J
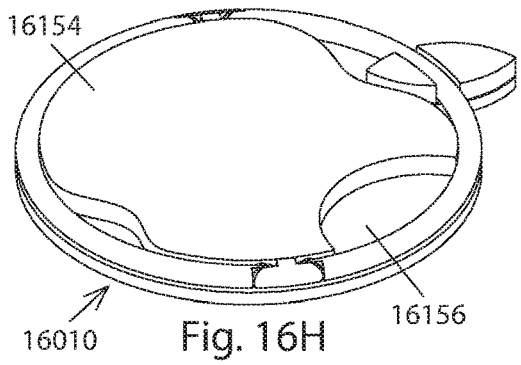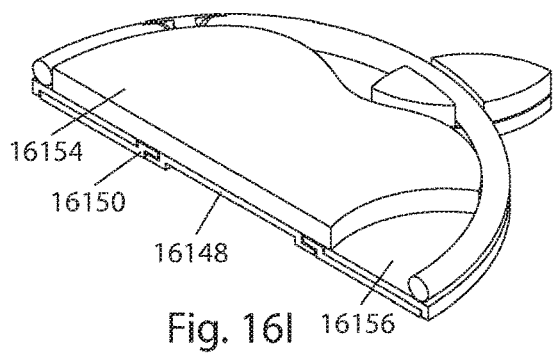
Fig. 16H
Fig. 16I

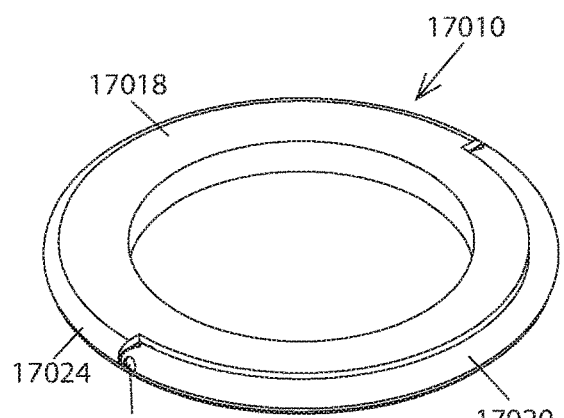
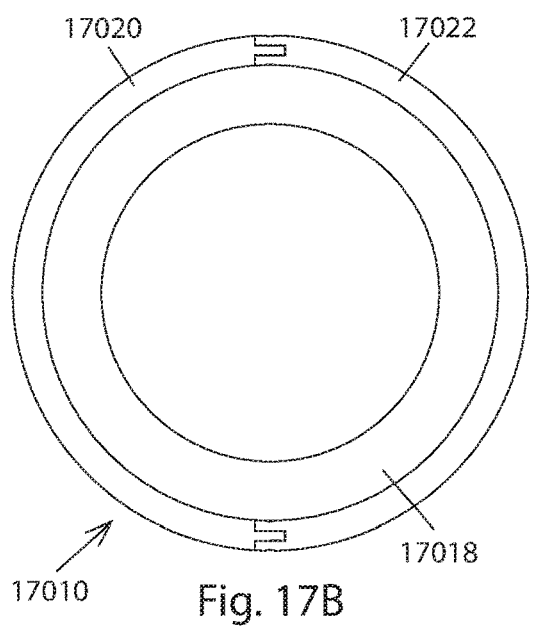
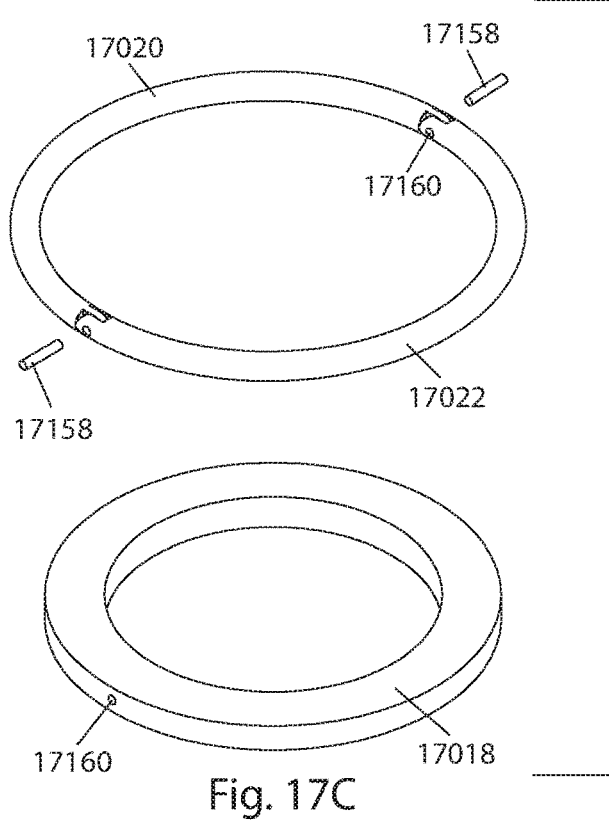

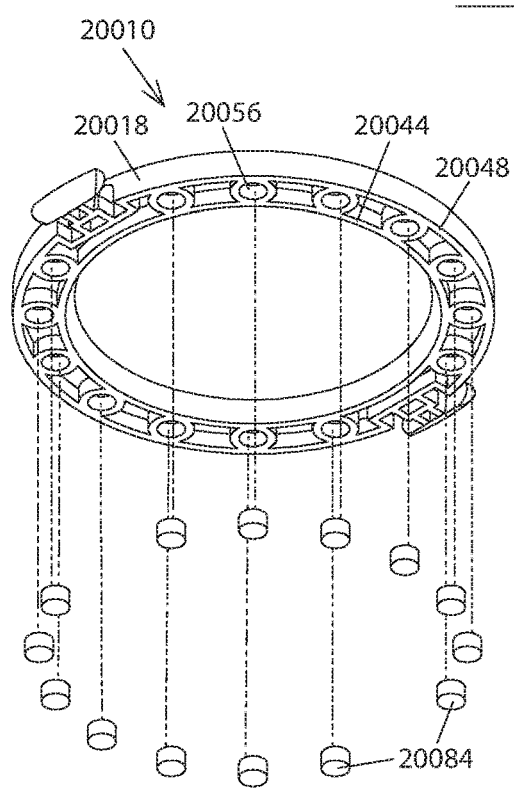
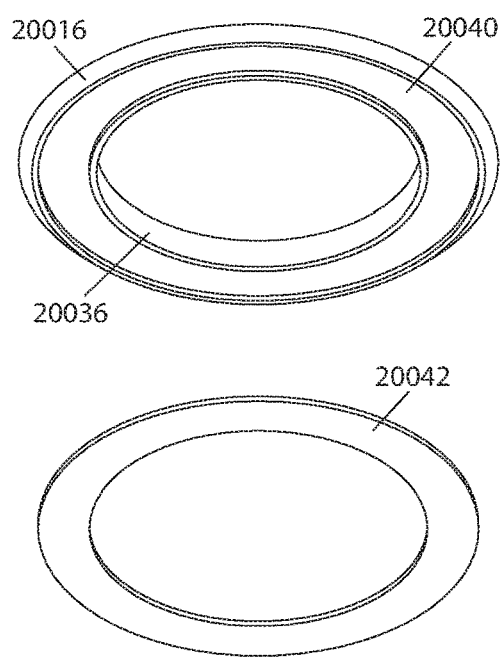
Fig. 20A
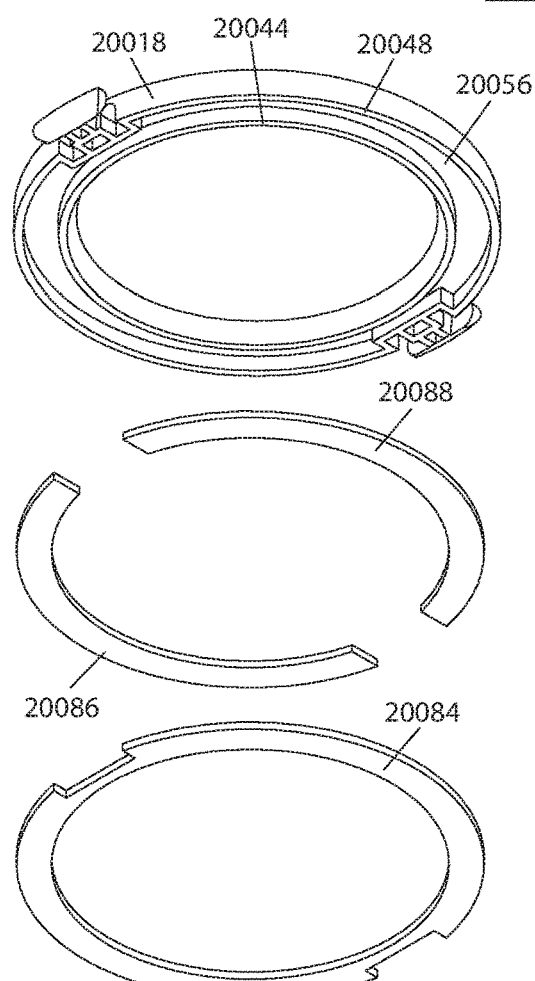
Fig. 20B
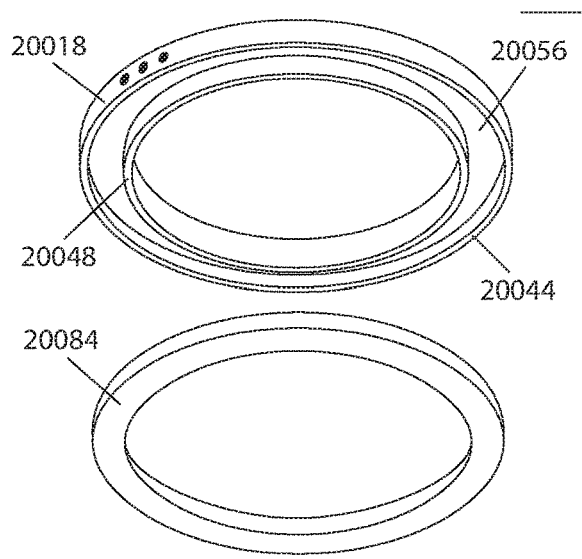
Fig. 20C

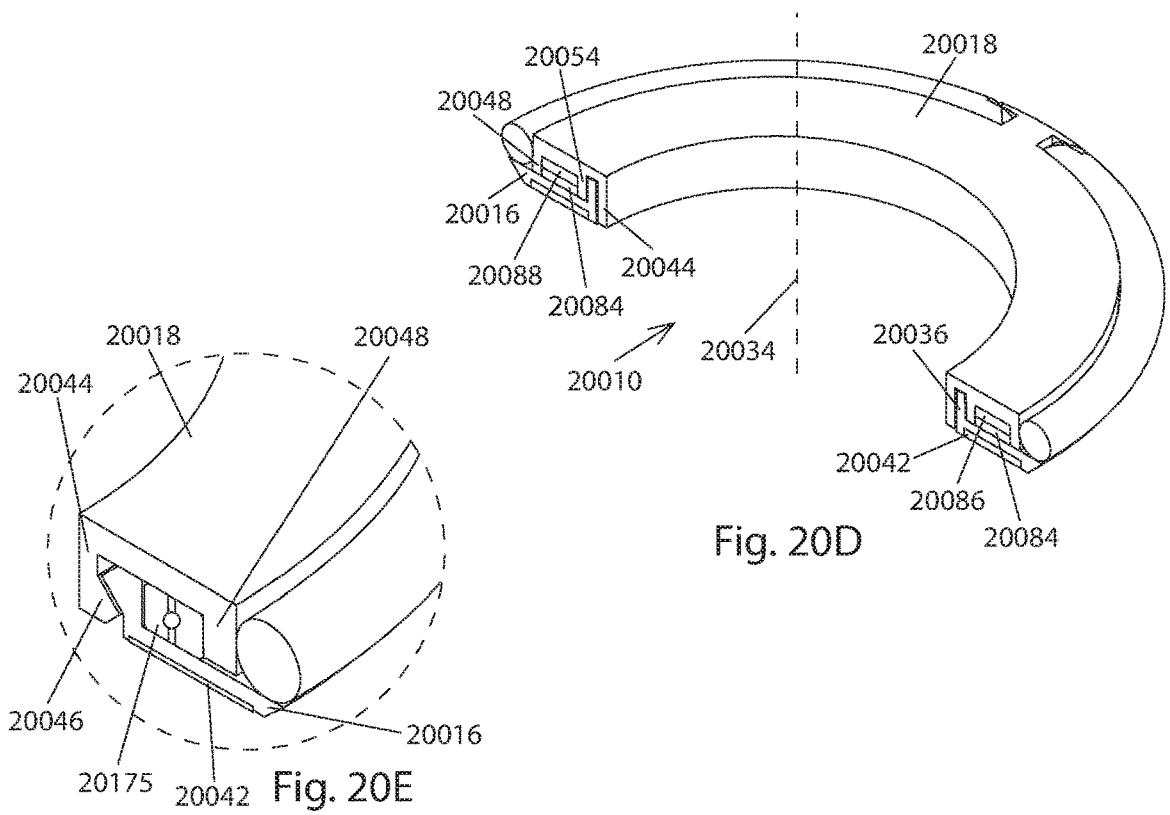
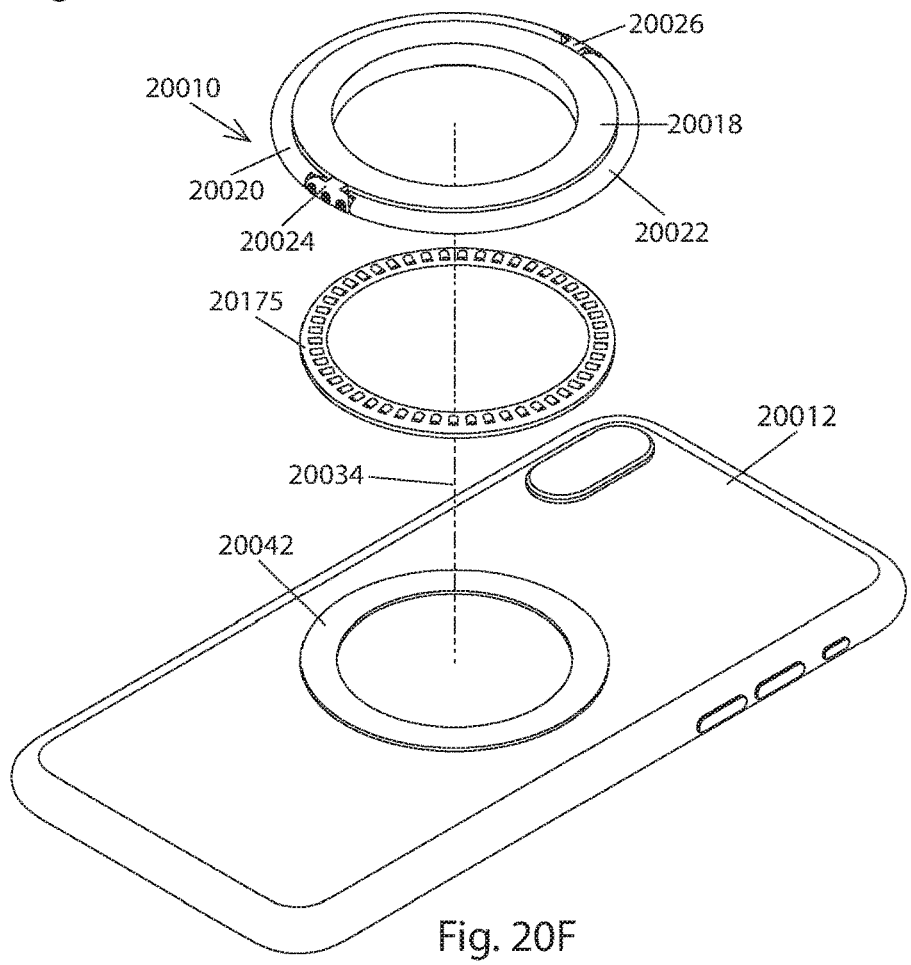

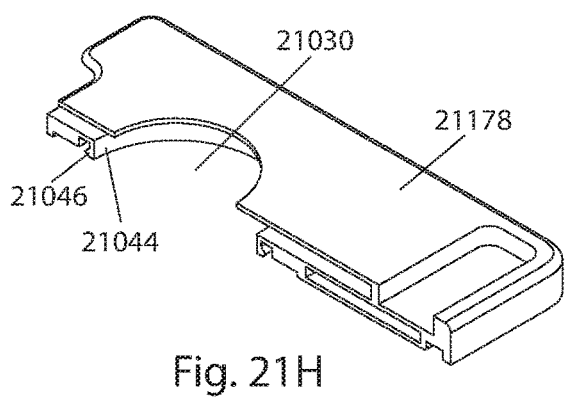
Fig. 21H
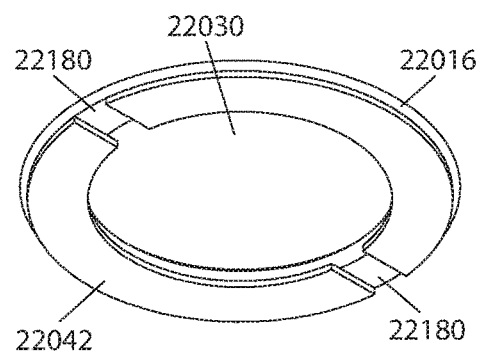
Fig. 22B
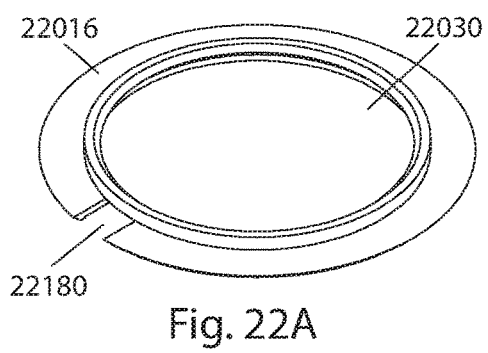
Fig. 22A
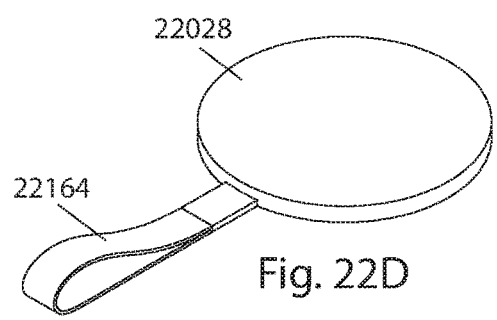
Fig. 22D
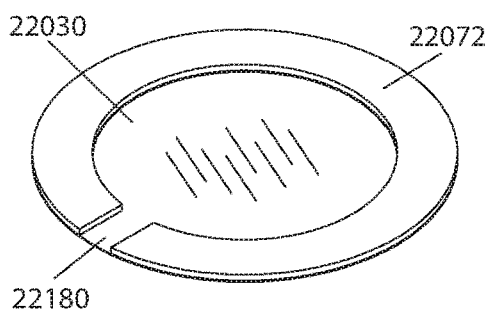
Fig. 22C
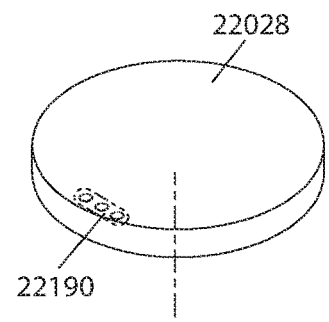
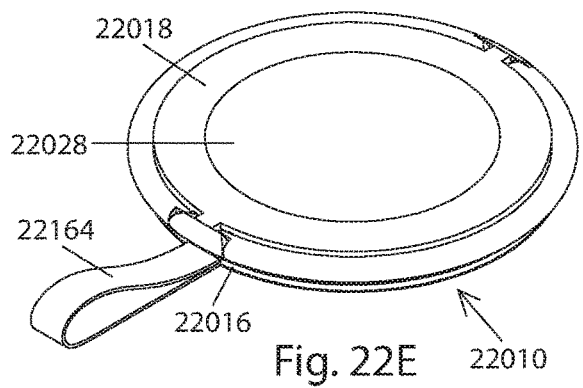
Fig. 22E
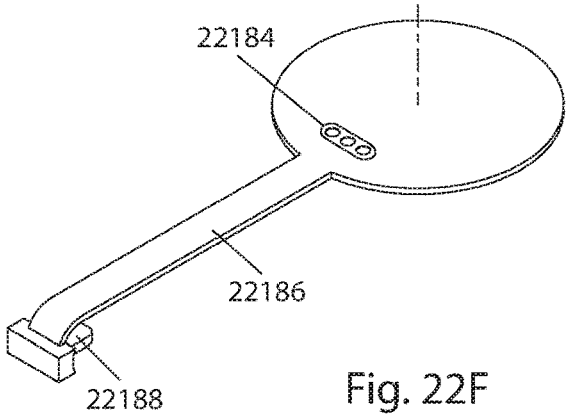
Fig. 22F

Fig. 23H
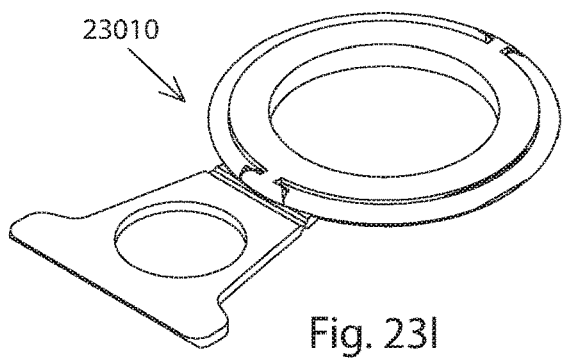
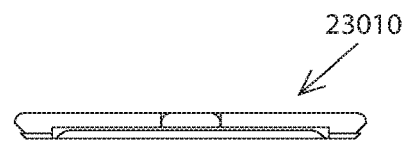
Fig. 23J
Fig. 23I
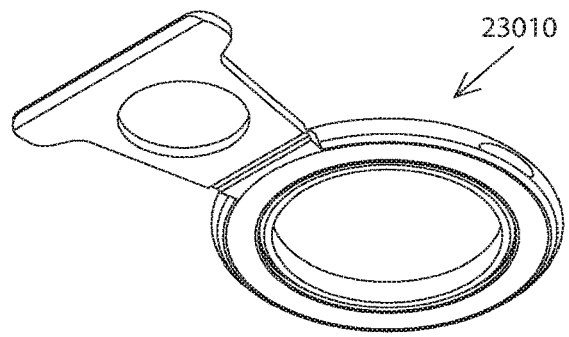
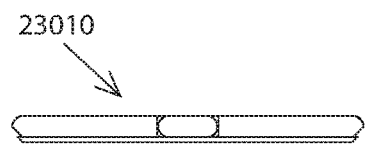
Fig. 23K
Fig. 23L
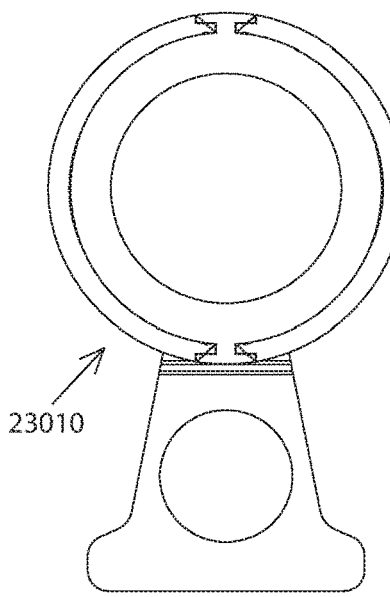
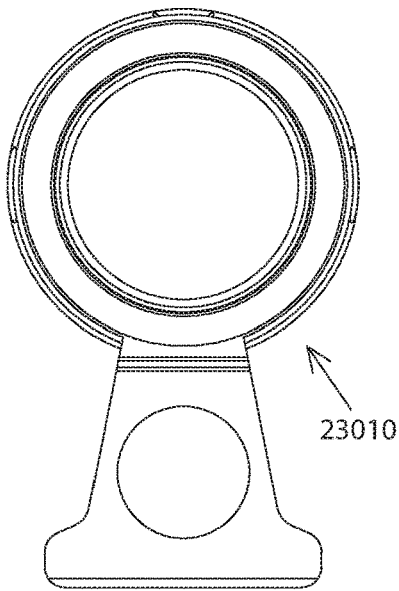
Fig. 23M
Fig. 23N

ADAPTIVE SUPPORT ACCESSORY FOR MOBILE DEVICES

BACKGROUND

The use of mobile devices has become nearly ubiquitous in modern society. Owing largely to their usefulness, mobile devices have become so indispensable to modern life that it is not unusual for users to keep some type of mobile device with them at all times. Although mobile devices come in a variety of shapes and sizes, most devices are ostensibly designed to be held in a user's hand with the device resting in a user's palm and supported by the fingers, leaving the user's thumb free to manipulate the device. With the exception of certain use-case scenarios where two-handed interaction may be more expedient or secure, a user may frequently find one-handed operation of their mobile device preferable, particularly insofar as it leaves their other hand free to engage in different tasks. In practice, however, the size and shape of modern mobile devices makes them difficult to hold and operate single-handedly.

Consequently, a variety of accessories for mobile devices have been proposed. While ostensibly aimed at addressing the need for improved handling and operation of mobile devices, in practice, many of these accessories only exacerbate unwanted issues hindering usability. When attached to a surface of the mobile device many of these accessories protrude so significantly that they cause undesirable complications for users, such as when trying the user tries to insert or remove the mobile device from their pocket, operate the device when positioned on a flat surface, or attempts to inductively charge the device's battery. While there are many different types of accessories that include some type of gripping or holding apparatus, many of these accessories necessitate fixing a user's fingers or hand in one position relative to the mobile device, restricting the flexion of a user's fingers and wrist and making it difficult for users to easily and securely adjust their grip in order to effectively interface with the outer portions of the device's display. Moreover, many of these types of accessories utilize components that are susceptible to premature wear or failure, which can result in unwanted expense and increased potential risk of damage to the mobile device. Still other types of mobile accessories are a one-size fits all type of apparatus, frequently designed for accommodating no more than one of a user's fingers and often resulting in a fit that presents users with a trade-off between comfort and security. Furthermore, many of these accessories require the use of two hands to deploy or operate, thereby reducing the practical effectiveness and utility for improved single-handed use they were intended to provide.

In addition to usability issues, the size and frangibility of mobile devices can make personal concurrent conveyance of other common everyday carry items challenging. While the technological capabilities included in many modern mobile devices may have reduced the need for user's to convey certain types of everyday items like cameras or flashlights, the sheer size of modern mobile devices can leave little room in one's pocket for accommodating items that a user might frequently find useful or desirable. Moreover, because the surface displays of modern mobile devices such as mobile phones are so susceptible to damage and expensive to repair, conveying other types of everyday carry items in close proximity with these types of devices can pose a substantial and costly risk to users.

In many instances, a user may even find that hands-free use of a mobile device is more appropriate and preferable. Unfortunately, most mobile devices don't provide any incorporated mechanism for supporting hands-free use. As a result, users are often required to purchase complicated or expensive equipment typically designed to support just one limited hands-free use case scenario, such as mounting a mobile device to the dashboard of a vehicle or propping a mobile device up on a flat support surface.

Due to the lack of versatility present in most modern mobile accessories, a user may feel compelled to purchase a variety of different accessories in order to fully accommodate the wide range of different hands-free use case scenarios that are now commonplace. Upon examination, none of the prior art can be shown to satisfy the requirements for sufficiently enabling effective single-handed operation of modern mobile devices, accommodating concomitant transport of everyday carry items, and providing for the variety of different hands-free use case scenarios common among modern mobile device users.

SUMMARY OF THE INVENTION

The inventions described and claimed herein address the aforementioned problems by providing an adaptive support accessory that is attached to a surface of a mobile device and enables effective and secure single-handed operation of the mobile device, supports a variety of common hands-free use case scenarios, adjusts to fit a variety of different users, accommodates concomitant transport of everyday carry items, provides users with kinetic amusement, and is adaptable to a wide variety of different holding, transporting, positioning and mounting configurations. These and other features and advantages of one or more aspects will be apparent from a consideration of the drawings and ensuing detailed description.

Implementations described and claimed herein provide an adaptive support accessory including a base attachable to a mobile device, a cap coupled to the base, one or more supports attached to the cap, and a detachably attachable plug.

Implementations described and claimed herein further provide a method of using an adaptive support accessory comprising attaching a base to a surface of a mobile device via a removable attachment interface; attaching a cap and one or more supports to the base; extending one or more supports from a retained position to a deployed position using one or more fingers of a user's hand; rotating the cap and/or one or more supports around the base; engaging one or more fingers of a user's hand with one or more of the cap, base, plug, and one or more supports; rotating one or both of the base and mobile device around the cap and/or one or more supports; and retracting one or more supports from a deployed position to a retained position using one or more fingers of a user's hand.

Additional methods of using the adaptive support accessory further comprise attaching one or both of a plug and an attachment element to the adaptive support accessory; attaching one or more of the cap, base, and plug to one or both of a compatible mount and mounting structure, engaging one or more fingers of a user's hand with one or both of an interior and exterior perimetric face of the adaptive support accessory; attaching one or more of the cap, base, plug and one or more extended supports to one or both of a compatible mount and mounting structure; rotating one or both of the base and mobile device around the cap and/or one or more supports; positioning one or more supports on a support surface to dispose the mobile device in a preferred orientation; and rotating the cap and/or one or more supports around the base to change the orientation of the mobile device.

Implementations described and claimed herein still further provide an adaptive support accessory comprising an intermediate mounting pad for configuring a mobile device for attachment to the attachment interface, a plug removal feature for detaching one or more attachable plugs, attachment features and attachment elements disposed in one or more components of the accessory and configured for attaching different accessory components together and/or attaching the accessory to a mount or mounting structure, and a mount and mounting structure configured for attachment to one another and/or the accessory.

Other implementations are also described and recited herein. This Summary is provided to introduce a section of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTION OF THE DRAWINGS

FIG. 4A illustrates a top perspective view of an example adaptive support accessory with two supports retracted in a retained position.

FIG. 4B illustrates a sectional view of the example adaptive support accessory of FIG. 4A FIG. 4C illustrates an enlarged sectional view of FIG. 4B.

FIG. 4D illustrates a top exploded perspective view of an example adaptive support accessory with a base, two supports, a cap, and a plug.

FIG. 4E illustrates a bottom exploded perspective view of an example adaptive support accessory with a base, two supports, a cap, and a plug.

FIG. 4F illustrates a top perspective sectional view of an example adaptive support accessory.

FIG. 4G illustrates a top view of an example adaptive support accessory.

FIG. 4H illustrates a bottom view of an example adaptive support accessory.

FIG. 4I illustrates a top perspective view of an example adaptive support accessory.

FIG. 4J illustrates a bottom perspective view of an example adaptive support accessory.

FIG. 4K illustrates a front view of an example adaptive support accessory.

FIG. 4L illustrates a side view of an example adaptive support accessory.

FIG. 12A illustrates a top perspective view of a plug configured with a twist lock attachment feature and an attachment element.

FIG. 12B illustrates a top perspective view of a plug with an attachment feature configured for attachment to an expandable grip.

FIG. 12C illustrates a top view of a plug and a cap with an alignment indicator disposed on a top surface.

FIG. 12D illustrates a top perspective view of a plug with a selectively rotatable center portion with different attachment elements disposed on opposite faces thereof.

FIG. 12E illustrates a top perspective sectional view of a plug with a selectively attachable and reversible center portion with different attachment elements disposed on opposite faces thereof.

FIG. 12F illustrates a top perspective view of a plug with a magnetic attachment element configured with a plug removal feature.

FIG. 12G illustrates a top perspective view of a plug with two selectively rotatable attachment features.

FIG. 12H illustrates a top perspective view of a plug with a rotatable center portion.

FIG. 12I illustrates a top perspective view of a plug with a threaded attachment feature and a flanged bottom.

FIG. 12J illustrates a top perspective view of a plug configured with an attachment hole and a plug removal feature and disposed in a plug receptacle.

FIG. 13A illustrates a top perspective view of a plug configured with an extendable and retractable knife and bottle opener.

FIG. 13B illustrates a top perspective view of a plug configured with a rotatably extendable bottle opener and box cutter.

FIG. 13C illustrates a top perspective view of a plug container configured with a hinged lid and a magnetic closure.

FIG. 13D illustrates a top perspective view of a plug configured with a rotatably extendable key.

FIG. 16G illustrates a top perspective assembly view of an example accessory with two base components and an accessory cover attached to the top of a cap.

FIG. 16H illustrates a top perspective view of an example accessory with two base components and two cap components.

FIG. 16I illustrates a top perspective sectional view of FIG. 16H.

FIG. 16J illustrates a top perspective assembly view of FIG. 16H.

FIG. 17A illustrates a top perspective view of an example accessory with a support fastened to a cap.

FIG. 17B illustrates a top view of two supports connected together and fastened to a cap.

FIG. 17C illustrates a top perspective assembly view of FIG. 17B.

Figure 20G:
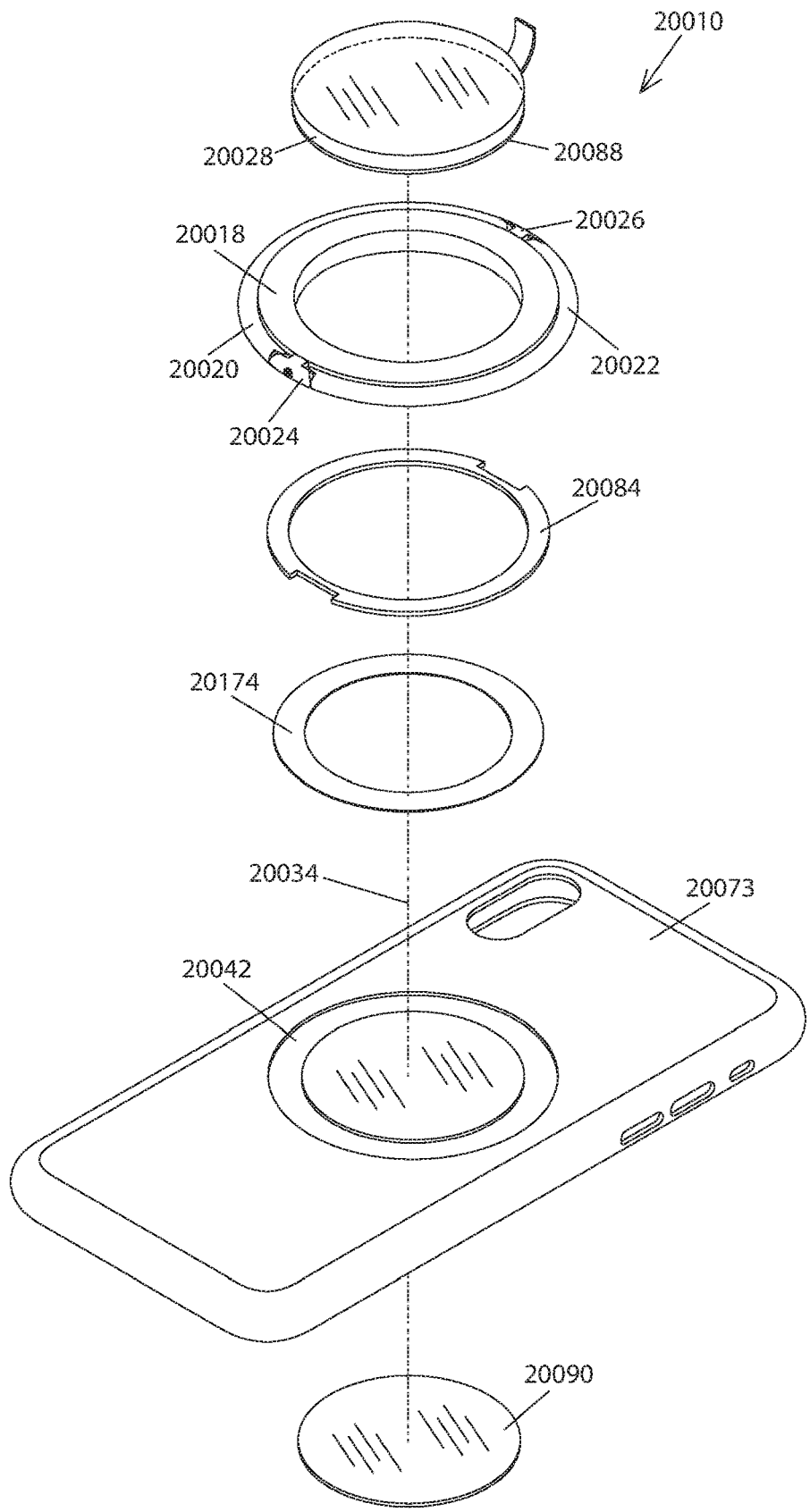
FIG. 20A illustrates a bottom perspective assembly view of an example accessory with multiple magnetic attachment elements disposed in a cap and configured to attach to a magnetic attachment interface disposed in the bottom of a base.
FIG. 20B illustrates a bottom perspective assembly view of multiple magnetic attachment elements combinable together in a continuous shape and disposed in a cap.
FIG. 20C illustrates a bottom perspective assembly view of cap with an annular attachment element disposed therein.
FIG. 20D illustrates a top perspective sectional view of an example accessory with multiple magnetic attachment elements disposed in a cap and configured to attach to a magnetic attachment interface disposed in the bottom of a base, the cap including multiple annular cap protrusions disposed adjacent to an annular base protrusion.
FIG. 20E illustrates an enlarged sectional view of an example accessory with a ball bearing attachment element disposed in between a cap and a base.
FIG. 20F illustrates a top perspective assembly view of an example accessory with a magnetic bearing attachment element disposed in a cap configured to rotatably couple to a magnetic attachment interface disposed on a surface of a mobile device.

FIG. 20G illustrates a top perspective assembly view of an example accessory including a cap with a magnetic attachment element disposed therein and configured to attach to a magnetic attachment interface disposed in the top of a mobile device case and a plug with a magnetic attachment element disposed on a bottom surface thereof configured to attach to another attachment element disposed in the bottom interior of the case.

Figure 20H:
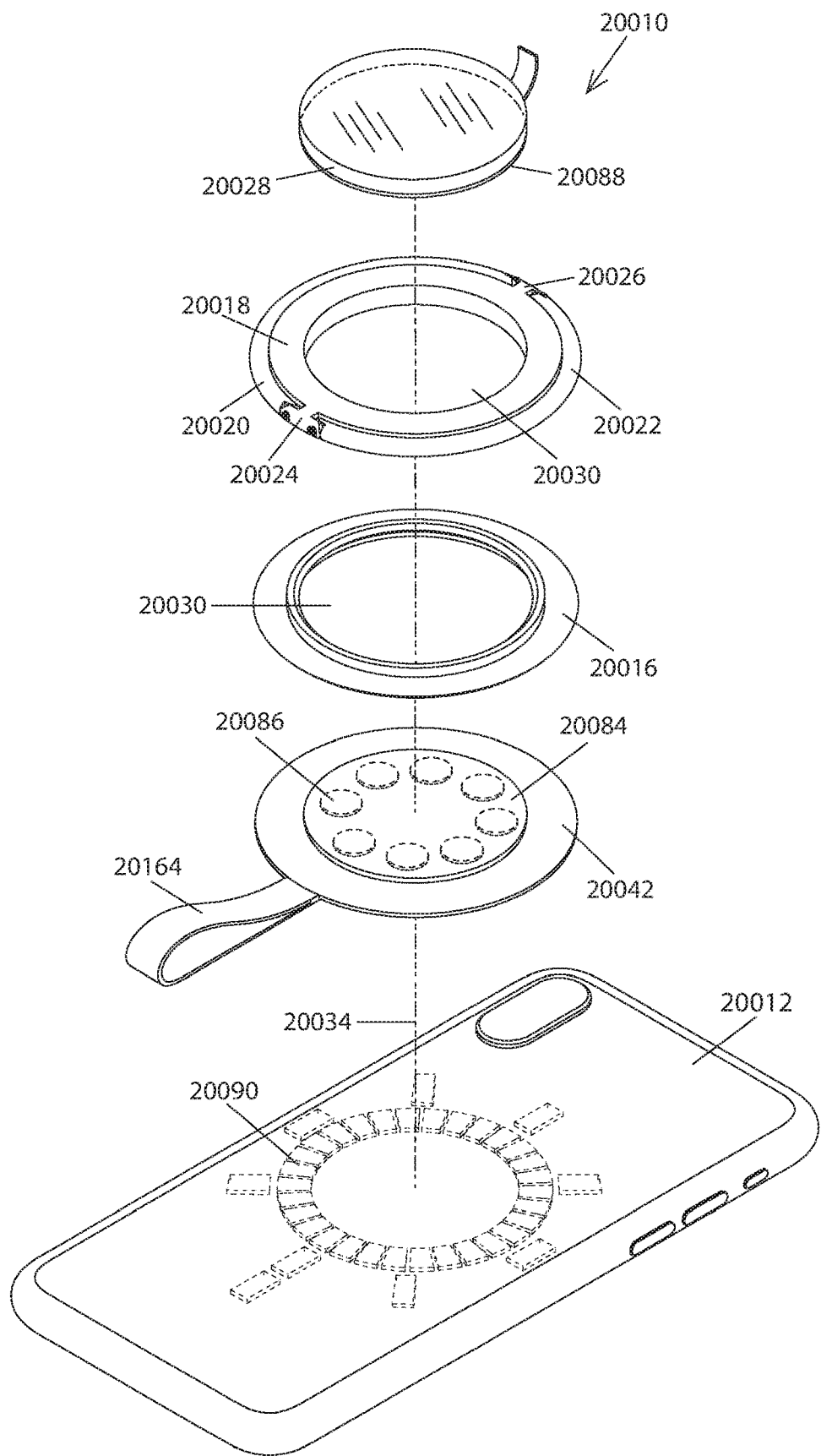

FIG. 20H illustrates top perspective assembly view of an example accessory with a cap rotatably coupled to a base attached to a magnetic attachment interface configured for attachment to a mobile device with multiple magnetic attachment elements disposed therein.

Figure 21A:
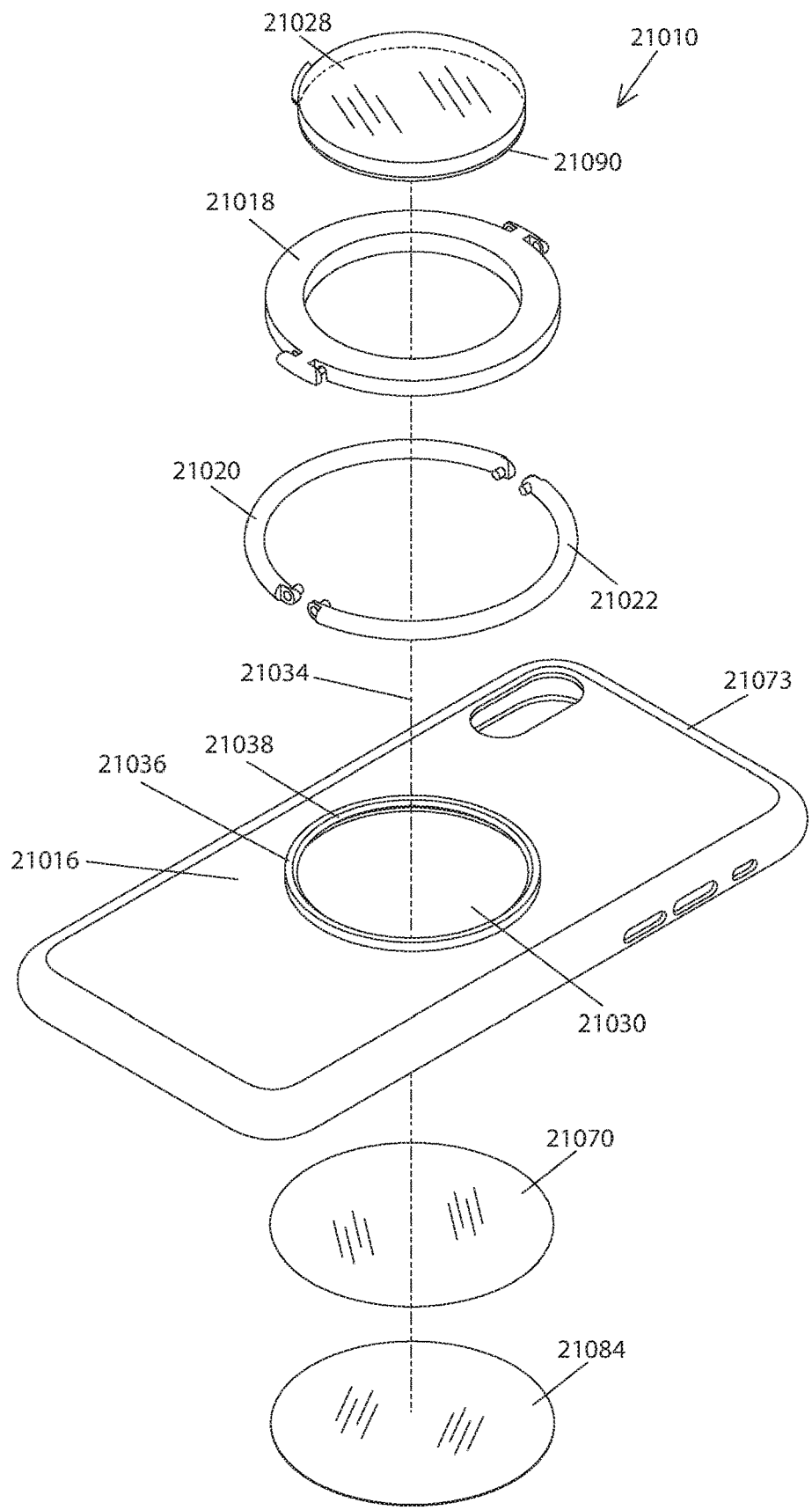

FIG. 21A illustrates a top perspective assembly view of an example accessory with a base substantially integrated into a surface of a mobile device case.

Figure 21B:
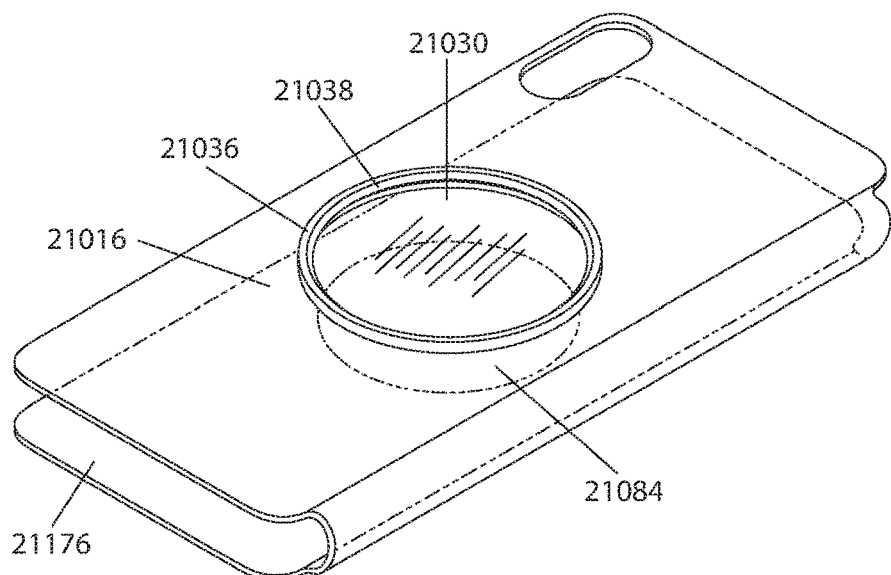

FIG. 21B illustrates a top perspective view of a base substantially integrated into a mobile device cover.

Figure 21C:
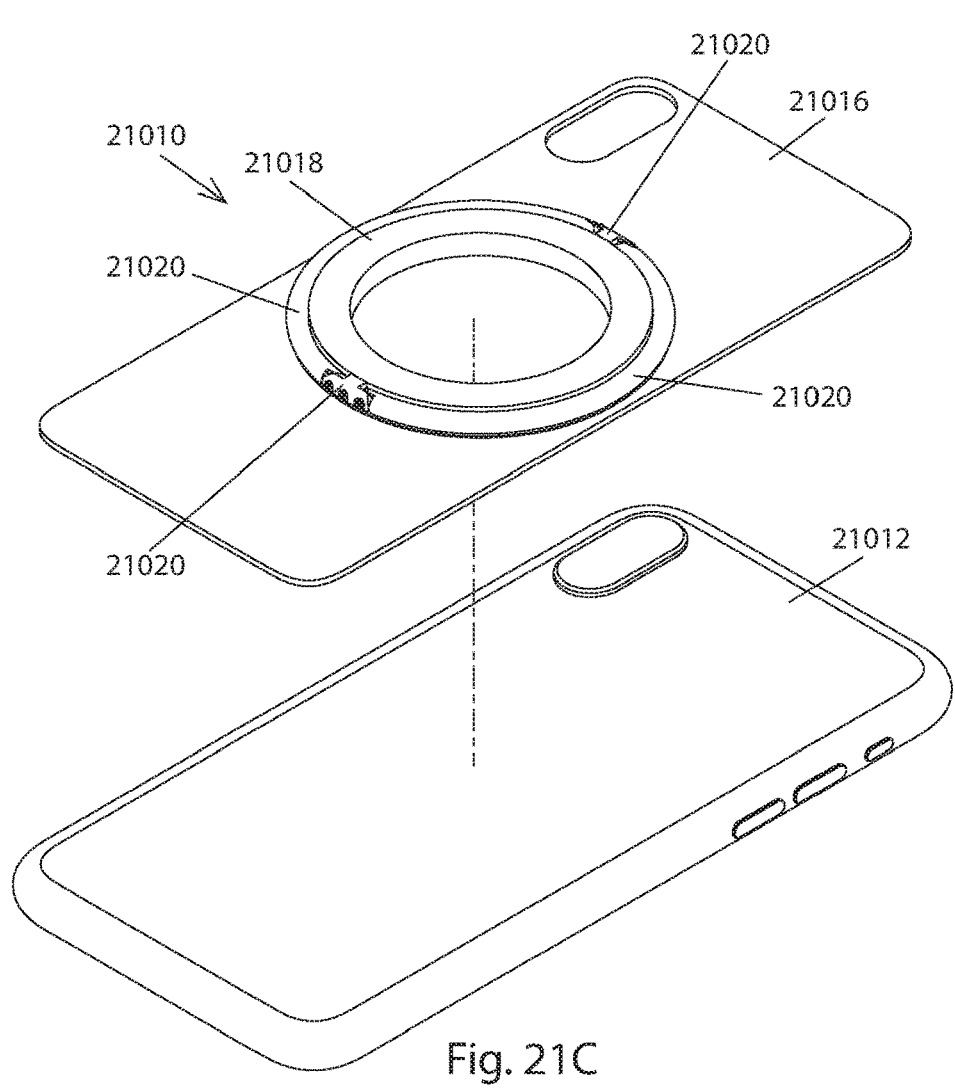

FIG. 21C illustrates a top perspective assembly view of an example accessory with a base of a shape and size generally conforming with and configured for attachment to a surface of a mobile device.

Figure 21D:
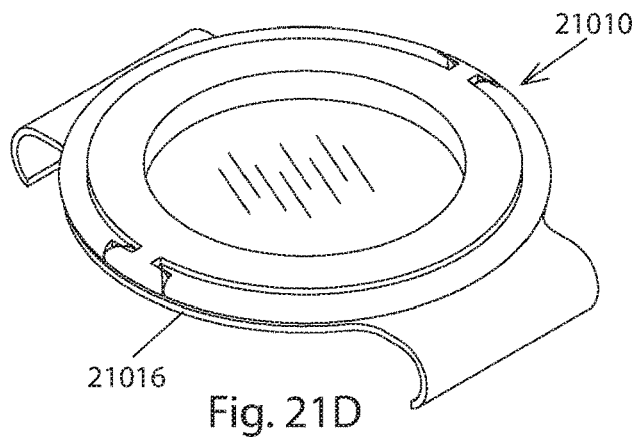

FIG. 21D illustrates a top perspective view of an example accessory with a base configured for attachment to two sides of a mobile device.

Figure 21E:
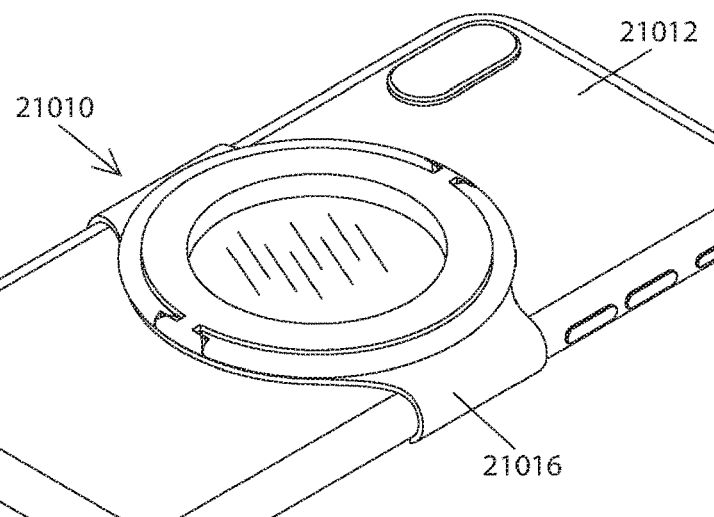

FIG. 21E illustrates a top perspective view of an example accessory with a base attached around two sides of the mobile device.

Figure 21F:
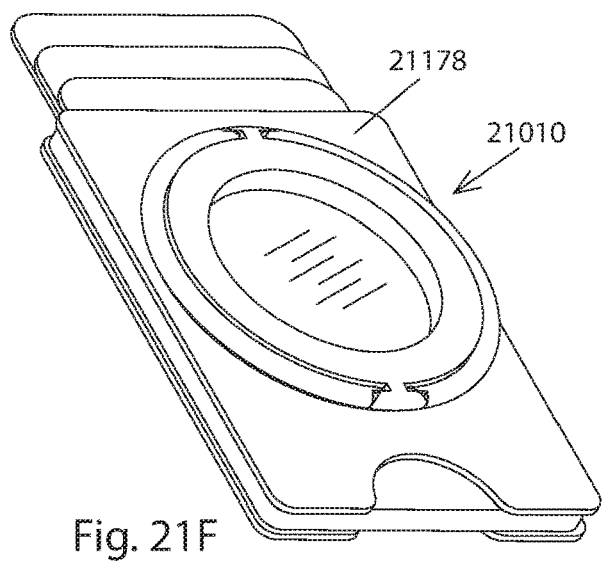

FIG. 21F illustrates a top perspective view of an example accessory disposed on top of an example second mobile accessory.

Figure 21G:
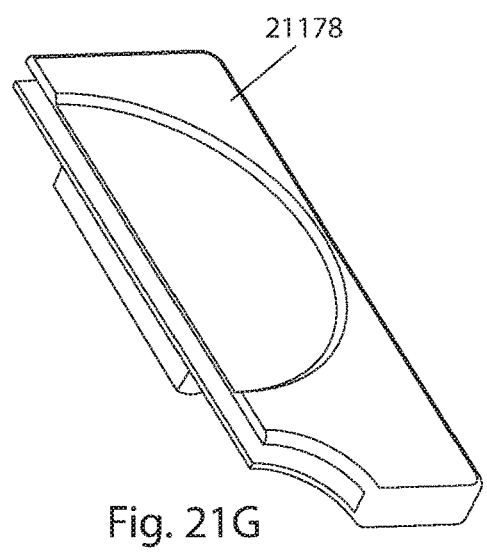

FIG. 21G illustrates a top perspective sectional view of an example second mobile accessory with a recess formed in the top configured for receiving a portion of a base.

FIG. 21H illustrates a top perspective sectional view of an example second mobile accessory configured to attach to a base.

FIG. 22A illustrates a top perspective view of a base with an opening formed in the bottom and extending through an exterior perimetric face thereof.

FIG. 22B illustrates a bottom perspective view of an attachment interface with two openings formed in the bottom surface thereof and attached to the bottom of a base.

FIG. 22C illustrates a top perspective view of an intermediate mounting pad with an opening formed in the top surface thereof.

FIG. 22D illustrates a top perspective view of a plug configured with a flexible support disposed in one end.

FIG. 22E illustrates a top perspective view of a plug disposed in a cap and configured with a flexible support extending outward through an opening formed in the bottom of a base.

FIG. 22F illustrates a top perspective assembly view of an electronic port connected to an electronic connector via a flexible cable and configured for connection with a second electronic port disposed in a plug.

Figure 22G:
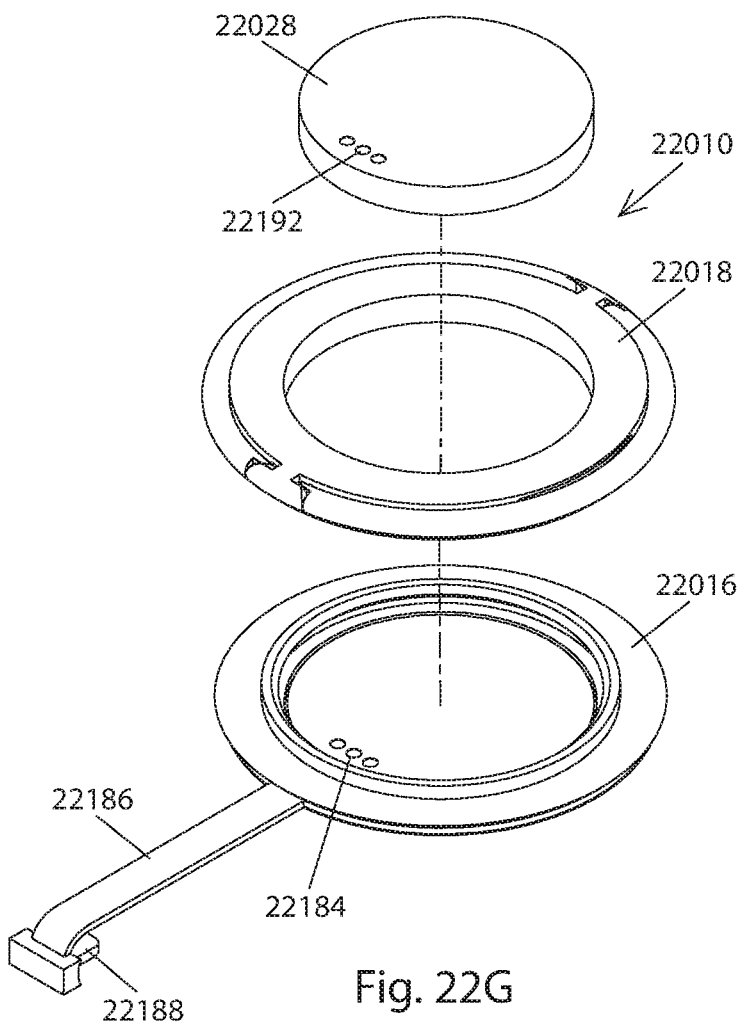

FIG. 22G illustrates a top perspective assembly view of an example accessory with an electronic port disposed in a base and configured for connection with a second electronic port disposed in a plug.

Figure 22H:
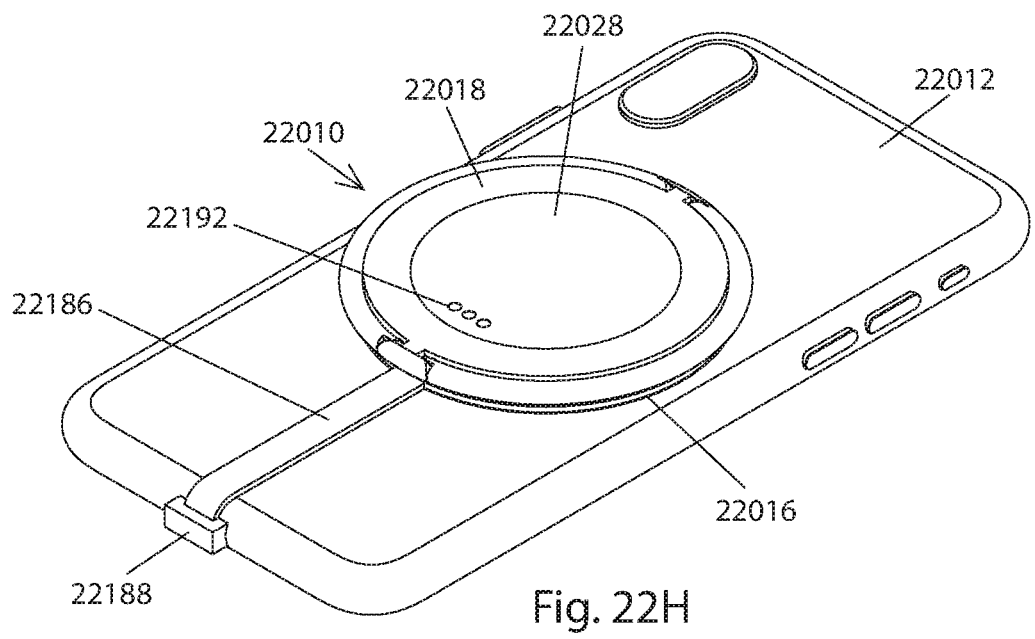

FIG. 22H illustrates a top perspective view of an example accessory with an electronic connector attached to a mobile device and an electronic port configured for attachment to another electronic port disposed in a plug.

Figure 23A:
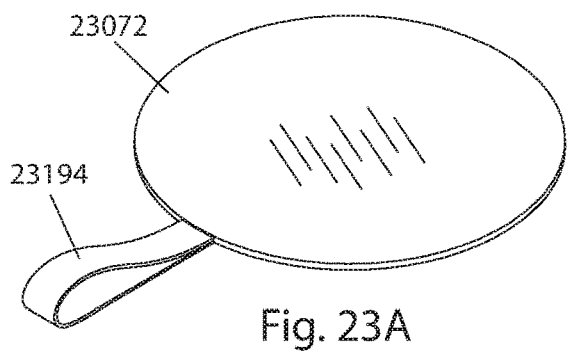

FIG. 23A illustrates a top perspective view of a flexible support disposed in one end of an intermediate mounting pad.

Figure 23B:
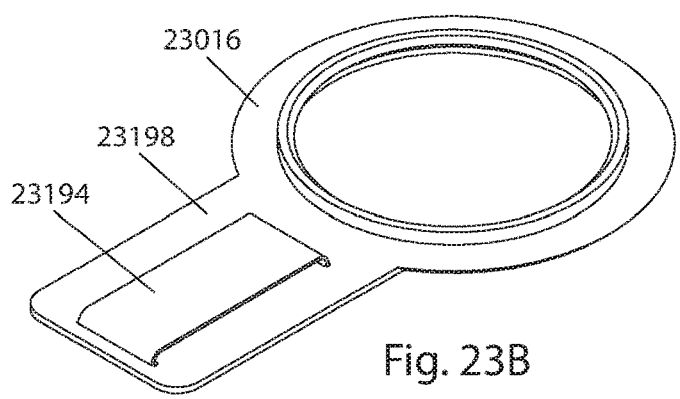

FIG. 23B illustrates a top perspective view of a flexible support disposed in a lateral projection of a base.

Figure 23C:
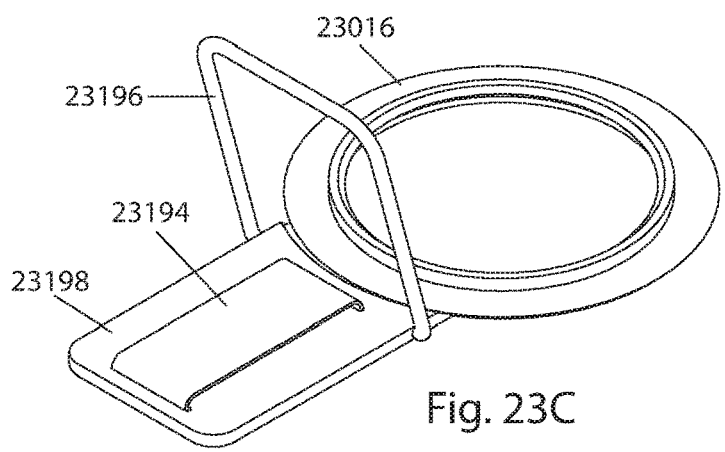

FIG. 23C illustrates a top perspective view of a flexible support and a rotatable rigid support disposed in a lateral projection of a base.

Figure 23D:
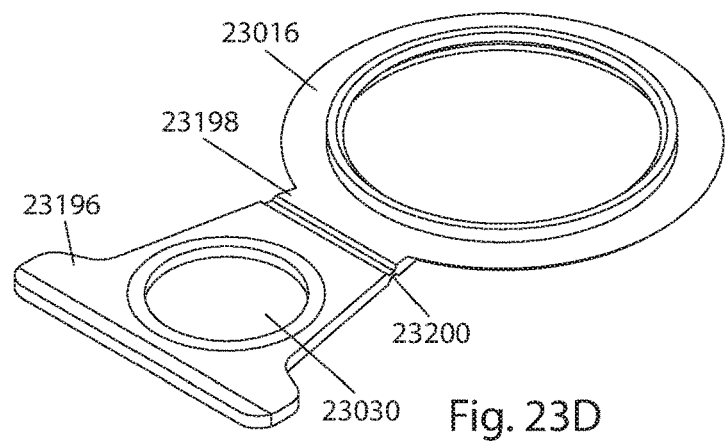

FIG. 23D illustrates a top perspective view of a rotatable rigid support disposed in a lateral projection of a base.

Figure 23E:
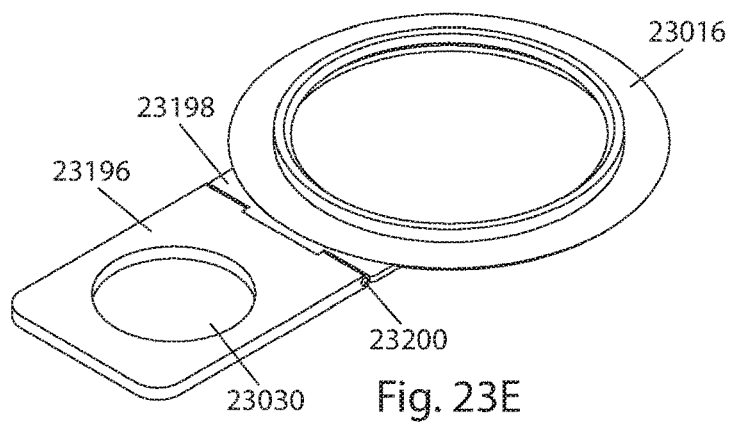

FIG. 23E illustrates a top perspective view of a rotatable rigid support attached to a lateral projection of a base.

Figure 23F:
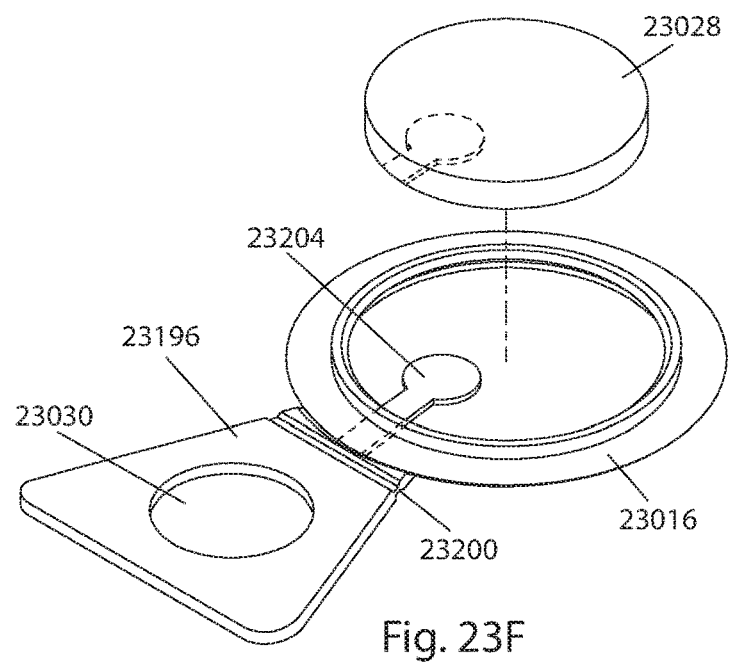

FIG. 23F illustrates a top perspective view of a rotatable rigid support disposed in the bottom of a base with a stop extending from the support through an opening disposed in the bottom of the base.

Figure 23G:
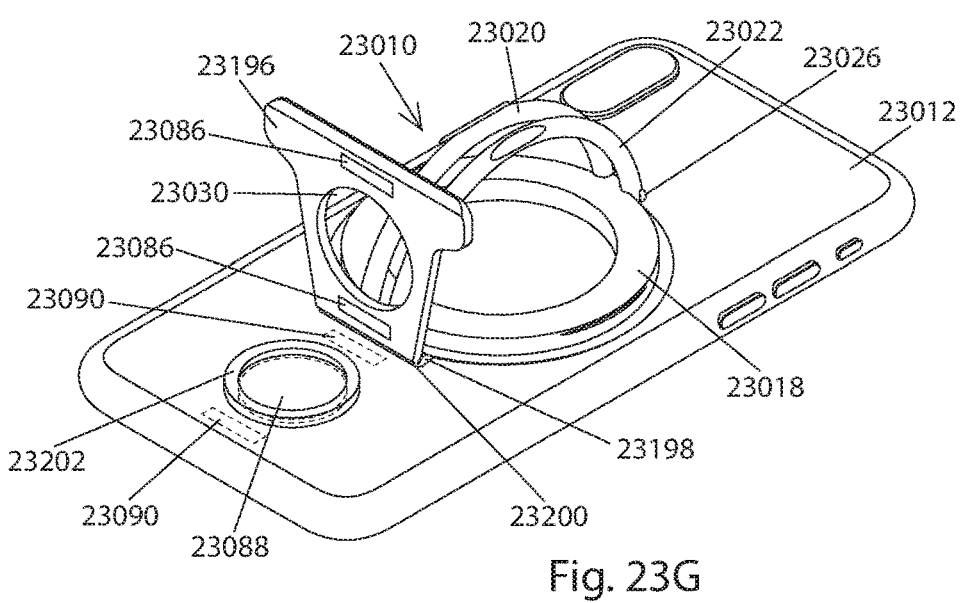

FIG. 23G illustrates a top perspective view of an example accessory and support retainer attached to a mobile device, the accessory including three rotatable rigid supports extended in a deployed position.

FIG. 23H illustrates a side view of an example accessory with three rotatable rigid supports retracted in a retained position.

FIG. 23I illustrates a top perspective view of an example accessory with three rotatable rigid supports retracted in a retained position.

FIG. 23J illustrates a front view of an example accessory with three rotatable rigid supports retracted in a retained position.

FIG. 23K illustrates a back view of an example accessory with three rotatable rigid supports retracted in a retained position.

FIG. 23L illustrates a bottom perspective view of an example accessory with three rotatable rigid supports retracted in a retained position.

FIG. 23M illustrates a top view of an example accessory with three rotatable rigid supports retracted in a retained position.

FIG. 23N illustrates a bottom view of an example accessory with three rotatable rigid supports retracted in a retained position.

Figure 24:
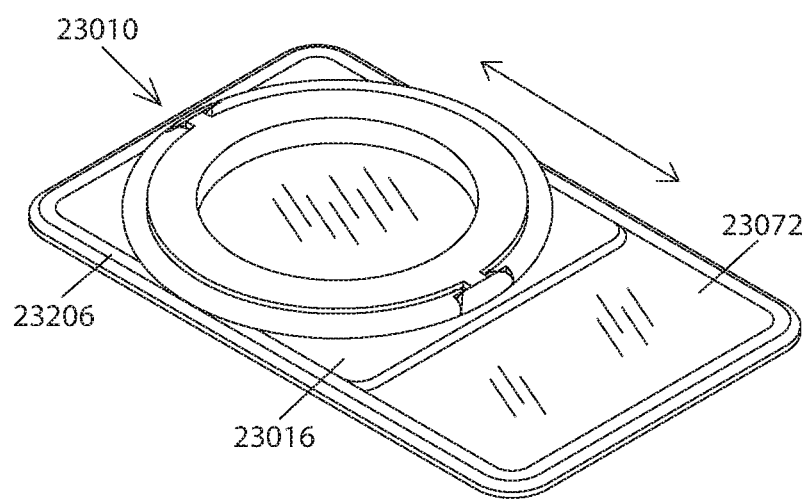

FIG. 24 illustrates a top perspective view of an example accessory with a base slidably disposed inside a base track.

DETAILED DESCRIPTIONS

The following disclosure is directed to accessories for mobile devices that improve a user's ability to hold, operate, mount, and position a mobile device. Variations of an adaptive support accessory are further directed to mobile device accessories that improve the usability and versatility of a mobile device. The accessory may be adaptive to the wide variety of common mobile device use-case scenarios and provides improved single-handed and hands-free use of a mobile device. In addition, multiple options for adapting and augmenting the utility of the mobile device are provided. The disclosed adaptable support accessory implementations are intended to address some or all of the foregoing problems with prior mobile device accessories, as well as additional problems with prior mobile device accessories not specifically identified herein.

Figure 1:
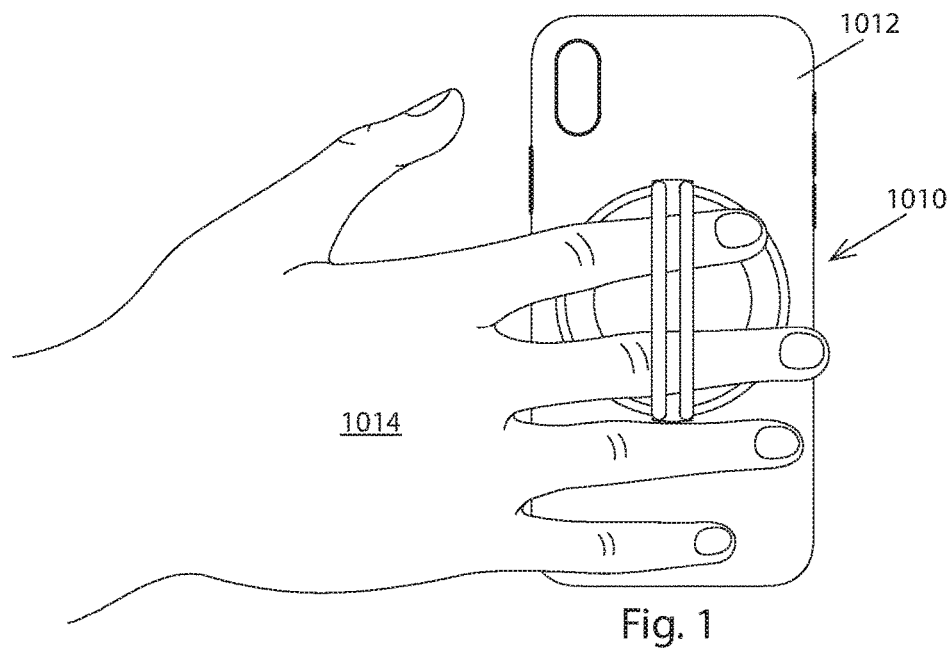
FIG. 1 illustrates a top view of an example adaptive support accessory shown affixed to a mobile device and held in a user's hand, in accordance with an aspect of the present invention.

FIG. 1 is a top view illustrating an example adaptive support accessory indicated generally at 1010 shown affixed to an exterior surface of an example mobile device 1012, such as a cellular phone or tablet, and held in a user's hand 1014. The adaptive support accessory 1010 (hereinafter referred to as "accessory") enables the user to securely hold and operate the mobile device 1012 single-handedly by providing multiple engagement options for one or more fingers of the user's hand 1014.

Figure 2:
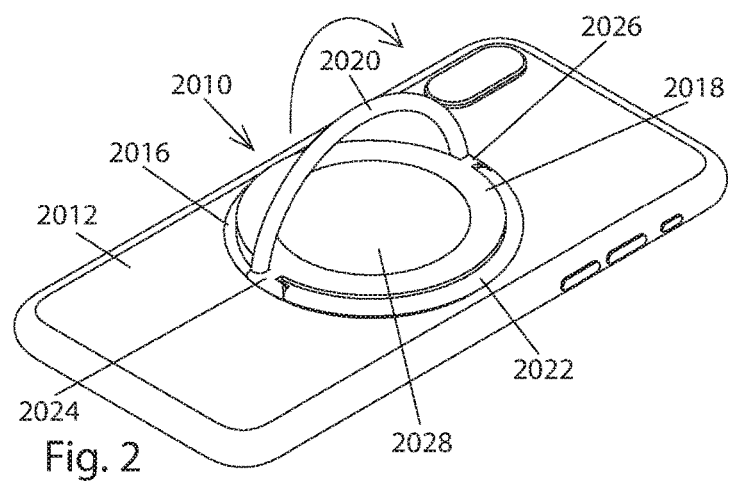
FIG. 2 illustrates a top perspective view of an example adaptive support accessory affixed to a mobile device, with a first support extended in a deployed position, a second support retracted in a retained position, and a plug disposed in the center of the accessory.

FIG. 2 is a top perspective view illustrating an example accessory 2010 affixed to an exterior surface of a mobile device 2012. The accessory 2010 includes a base 2016 configured for attachment to a surface of the mobile device 2012 via one or more of an attachment interface (not shown, e.g., see 5042 in FIG. 5C) and an intermediate mounting pad (not shown, e.g., see 5072 in FIGS. 5D-5E), a cap 2018 rotatably coupled to the base 2016 and centered around an axis of rotation (not shown, e.g., see axis 3034 in FIG. 3), one or more detachably attachable plugs 2028, and one or more supports 2020, 2022 attached to one or more of the cap 2018, base 2016, and plug 2028.

One or more supports 2020, 2022 attached to the cap 2018 may be retracted to a retained position (e.g., support 2022 in FIG. 2) and/or extended to a deployed position (e.g., support 2020 in FIG. 2). The supports 2020, 2022 provide an engagement feature by which the accessory 2010 can be held in a user's hand (e.g., see FIGS. 1 and 8A-8D), attached to a mount or mounting structure (e.g., see FIGS. 7B-7C), and positioned to support the mobile device 2012 in a preferred orientation on a support surface such as a table (e.g., see FIGS. 9A-9E). In various implementations, one or more projections 2024, 2026 laterally disposed on opposite ends of the exterior perimeter of the cap 2018 are configured to limit the movement of one or more supports 2020, 2022 by at least one degree of freedom, restricting the supports from being extended beyond a predetermined position with respect to the cap 2018. In some implementations, the cap 2018, supports 2020, 2022, projections 2024, 2026, and plug 2028 substantially surround and conceal the base 2016.

Figure 3:
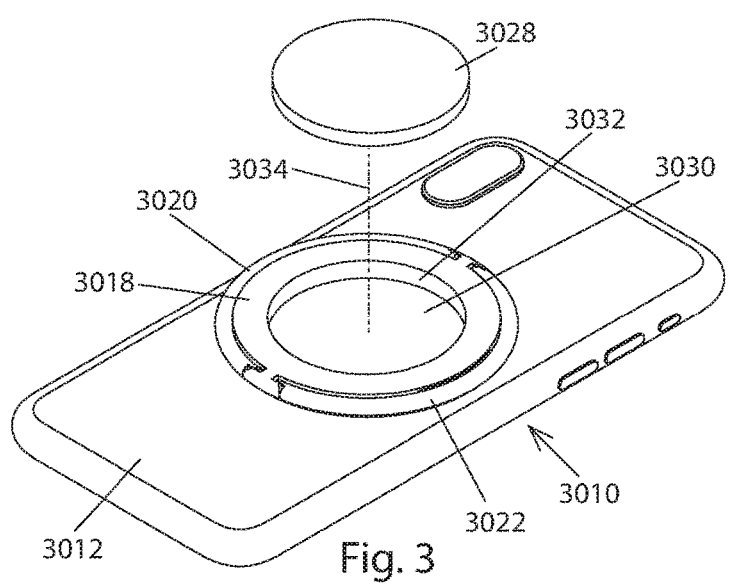
FIG. 3 illustrates a top perspective projected view of an example adaptive support accessory affixed to a mobile device with two supports retracted in a retained position and a detachably attachable plug configured for attachment to the accessory.

FIG. 3 is a top perspective view illustrating an example accessory 3010 affixed to an exterior surface of a mobile device 3012. A base (e.g., see base 4016 in FIGS. 4D-4E) and a cap 3018 are rotatably coupled and centered about an axis of rotation 3034. One or more supports 3020, 3022 attached to the cap 3018 may be retracted to a retained position wherein the accessory 3010 is able to maintain a low profile with respect to the mobile device 3012, facilitating conveyance and storage of the accessory 3010 and affixed mobile device 3012. One or more plugs 2028 may be permanently or detachably attached to the accessory 3010 to adapt and/or augment one or both of the accessory 3010 and the mobile device 3012. In various implementations, the plug 2028 augments the utility, functionality, and ornamentation of the accessory 3010. The plug 3028 may have an exterior perimeter generally conforming to an aperture 3030 disposed in the center of accessory 3010 and formed in one or both of the base and the cap 3018. An interior perimetric face 3032 of the accessory 3010 circumscribing the aperture 3030 may provide an engagement for one or more of a user's fingers, a plug 3028, a mount (e.g., see 7092 in FIG. 7B), and a mounting structure (e.g., see 7094 in FIG. 7B).

FIG. 4A is a top perspective view illustrating an example accessory 4010 with a cap 4018 rotationally coupled to a base 4016 and centered about an axis of rotation 4034, with two supports 4020, 4022 attached to the cap 4018 and retracted in a retained position. FIG. 4B is a top sectional perspective view of FIG. 4A. FIG. 4C is an enlarged detail view of FIG. 4B. FIG. 4D is a top exploded perspective view of an example accessory 4010. FIG. 4E is a bottom exploded perspective view of an example accessory 4010. FIG. 4F is a top perspective sectional view of an example adaptive support accessory. FIG. 4G is a top view of an example adaptive support accessory 4010. FIG. 4H illustrates a bottom view of an example adaptive support accessory 4010. FIG. 4I is a top perspective view of an example adaptive support accessory 4010. FIG. 4J is a bottom perspective view of an example adaptive support accessory 4010. FIG. 4K is a front view of an example adaptive support accessory 4010. FIG. 4L is a side view of an example adaptive support accessory 4010.

Referring to FIGS. 4A-4E, in various implementations, a base (e.g., base 4016) includes a first annular base protrusion (e.g., see protrusion 4036 in FIG. 4C) extending longitudinally from the base 4016 and centered about an axis of rotation 4034. The interior and exterior perimetric faces of the first annular base protrusion 4036 may be symmetrical or asymmetrical with respect to one another. The base 4016 may extend radially inward and/or outward from the first annular base protrusion 4036, as shown in FIG. 4C.

A first base engagement feature (e.g., see feature 4038 in FIG. 4C) may extend radially inward and/or outward from the first annular base protrusion 4036. The first base engagement feature 4038 may have a profile and shape configured to engage with a corresponding feature of another component of the accessory 4010 such as a plug 4028 or a cap (e.g., cap 4018). In various implementations, the first base engagement feature 4038 is one of a type of mechanical joint or snap type connector and may operate by an interference fit or friction fit with another component of the accessory 4010. In some implementations, the first base engagement feature 4038 is configured to engage with a corresponding engagement feature disposed in the cap 4018 (e.g., see feature 4046 in FIG. 4C). In various implementations, the first base engagement feature 4038 is annular. In some implementations, the first base engagement feature 4038 is a permanent or removable annular snap. In other implementations, the first base engagement feature is a torsional or cantilevered snap. In other implementations, the first base engagement feature is a removable snap ring disposed in an annular recess formed in one of an interior and exterior perimetric face of the first annular base protrusion 4036. In other implementations, the first base engagement feature includes one or more pins or fasteners attached to the base 4016 and laterally disposed through one or both of the interior and exterior perimetric faces of the first annular base protrusion 4036.

The bottom of the base 4016 may have a profile generally conforming to a portion of one or more exterior surfaces of a mobile device (e.g., see device 3012 in FIG. 3). In various implementations, an aperture 4030 formed in the center of the accessory 4010 may also be formed in the center of the base 4016 and may extend therethrough. In various implementations, the first annular base protrusion 4036 circumscribes the aperture 4030 formed in the base, defining an interior perimetric face 4032 of one or both of the base 4016 and the accessory 4010. A first exterior base recess 4040 may be formed in the bottom of the base 4016 and may be configured to receive an attachment interface 4042 for attaching the base 4016 to one of a housing, case, and cover for the mobile device. In some implementations, the bottom of the base 4016 or a portion thereof is formed separately from the base 4016 and may be permanently or detachably attached.

The base 4016 may be substantially rigid or substantially flexible. The base 4016 may have a shape that is generally annular or circular. In various implementations, the base 4016 has a profile generally conforming to the shape and profile of the cap 4018 and/or one or more supports 4020, 4022. A portion of one or both of an interior and exterior perimeter of the base 4016 may have a squared, rounded, or chamfered profile, and may be configured for facilitating removal of the base 4016 from the mobile device. In addition, indicia, such as a name, logo, slogan, trademark, or service mark representing one or more of a business, product, or person may be disposed on, across, or around one or more surfaces of the base 4016.

In various implementations, the cap (e.g., cap 4018) is rotatably coupled to the base 4016 about the axis of rotation 4034. The cap 4018 may be permanently or detachably coupled to the base 4016. As shown in FIG. 4C, the cap 4018 may include a first annular cap protrusion 4044 extending longitudinally from the cap 4018, centered about the axis of rotation 4034, and disposed adjacent to the first annular base protrusion 4036 extending longitudinally from the base 4016. The interior and exterior perimetric faces of the first annular cap protrusion 4044 may be symmetrical or asymmetrical with respect to one another. The cap 4018 may extend radially inward and/or outward from the first annular cap protrusion 4044.

In various implementations, the aperture 4030 formed in the center of the accessory is also formed in the center of the cap 4018 and may extend therethrough. The aperture 4030 formed in the cap 4018 may be axially aligned with and generally correspond to the aperture 4030 formed in the base 4016, each aperture 4030 being either slightly larger or smaller in diameter with respect to the one another. In various implementations, the first annular cap protrusion 4044 circumscribes the aperture 4030, defining an interior perimetric face 4032 of one or both of the cap 4018 and the accessory 4010. In some implementations, the shape of the aperture 4030 may be circular or round. In other implementations, the shape of the aperture may be triangular, square, rectangular, or polygonal. One or both of the aperture 4030 and the interior perimetric face 4032 of the accessory 4010 may be configured to receive and engage one or more of a user's finger (e.g., see FIG. 8A), a mount (e.g., see mount 7092 in FIG. 7B), and a mounting structure (e.g., see mounting structure 7094 in FIGS. 7B-7C).

As shown in FIG. 4C, the first annular cap protrusion 4044 may include one or more first cap engagement features 4046 extending radially inward and/or outward from the first annular cap protrusion 4044. The first cap engagement feature 4046 may have a shape and profile configured to engage with a corresponding feature disposed in another component of the support accessory 4010 such as the plug 4028 or the base 4016. The first cap engagement feature 4046 may be one of a type of mechanical joint or connector and may operate by an interference fit or friction fit with another component of the accessory 4010. The first cap engagement feature 4046 may be configured to engage with a corresponding engagement feature disposed in the base 4016, such as the first base engagement feature 4038. In various implementations, the first cap engagement feature 4046 is annular. In some implementations, the first cap engagement feature 4046 is a permanent or removable annular snap. In other implementations, the first cap engagement feature is a torsional or cantilevered snap. In other implementations, the first cap engagement feature is a removable snap ring disposed in an annular recess formed in one of the interior and exterior perimetric faces of the first annular cap protrusion 4044. In other implementations, the first cap engagement feature includes one or more pins or fasteners attached to the cap 4018 and laterally disposed through one or both of the interior and exterior perimetric faces of the first annular cap protrusion 4044.

A second annular cap protrusion 4048 may extend longitudinally from the cap 4018 and define an exterior perimetric face 4050 of the cap 4018. The exterior perimetric face 4050 of the cap 4018 may provide an engagement for one or more of a user's fingers, a mount, and a mounting structure. In some implementations, a third annular cap protrusion 4054 extends longitudinally from the cap 4018 and is disposed between the first and second annular cap protrusions 4044, 4048. The third annular cap protrusion 4054 may be configured to provide structural reinforcement to the cap 4018 and aid in maintaining concentricity and engagement between the cap 4018 and the base 4016.

As shown in FIG. 4C, a first interior cap recess 4052 may be formed in the bottom of the cap 4018 adjacent to the first annular cap protrusion 4044 and configured to receive at least a portion of one or both of the first annular base protrusion 4036 and the first base engagement feature 4038. A second interior cap recess 4056 may be formed in the bottom of the cap 4018 adjacent to the second annular cap protrusion 4048. In some implementations, one or both of the first and second interior cap recesses 4052, 4056 formed in the cap 4018 may be configured to receive and retain one or more ferrous or magnetic elements. In other implementations, one or more of the first, second, and third annular cap protrusions 4044, 4048, 4054 include one or more radially extending continuous or segmented engagement features arranged around the protrusion and configured to retain one or more ferrous or magnetic elements within the cap 4018. In other implementations, third annular cap protrusion 4054 and second interior cap recess 4056 are omitted and the first annular base protrusion 4036 and first base engagement feature 4038 are disposed in the first interior cap recess 4052 between the first and second annular cap protrusions 4044, 4048, as shown in FIG. 4F. In some implementations, a low-friction washer, spacer, or element made of a material such as PTFE or Teflon is disposed between the base 4016 and the cap 4018 in order to reduce friction between the components. In other implementations, one or more attachment elements such as bearing, selected from the group of bearings including, ball bearings, roller bearings, thin section bearings, race bearings, needle roller bearings, thrust bearings, or turntable type bearings, may be disposed in between or attached to one or both of the base 4016 and the cap 4018 to facilitate smooth and continuous rotation between the components (e.g., see bearing 20084 in FIG. 20D).

The cap 4018 may be substantially rigid or substantially flexible. The cap 4018 may have a shape or profile that is substantially annular or circular. In other implementations, the cap has a shape that is substantially square, rectangular, oblong, or polygonal, as shown in FIGS. 14E-14J. Indicia, such as a name, logo, slogan, trademark, or service mark representing one or more of a business, product, or person may be disposed on, across, or around one or more surfaces of the cap 4018 or another component attached thereto, as shown in FIGS. 11C-11D. In some implementations, a portion of the interior perimetric face 4032 of the cap 4018 may be over-molded, separately formed from, or detachably attached to the cap 4018. In other implementations, one or more exterior portions of the cap may be extendable and collapsible. In other implementations, an expandable grip or knob may be disposed in or attached to the cap 4018. One or both of the interior and exterior perimeters of the cap 4018 may have a squared, rounded, or chamfered profile. In some implementations, the top surface of the cap is sloped or angled. In other implementations, one or both of the top and bottom surfaces of the cap 4018 are substantially planar and flat.

Figure 7A:
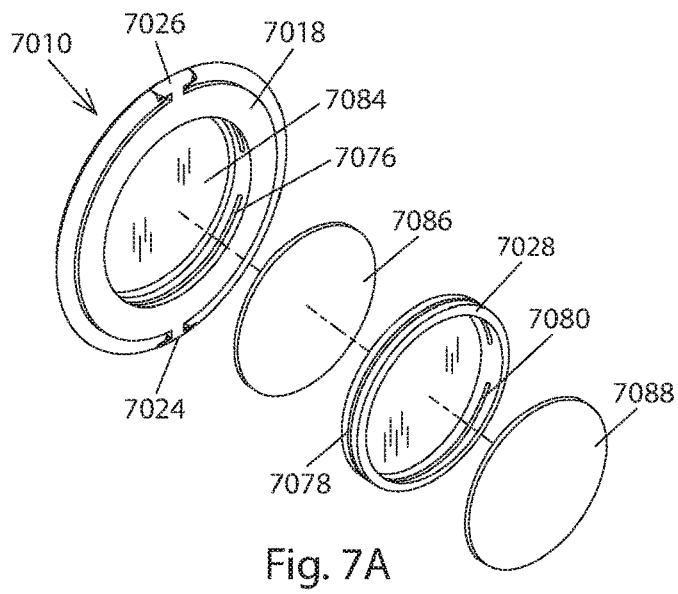
FIG. 7A illustrates a top exploded perspective view of an example adaptive support accessory with a detachably attachable plug, and multiple attachment elements and attachment features.
Figure 7C:
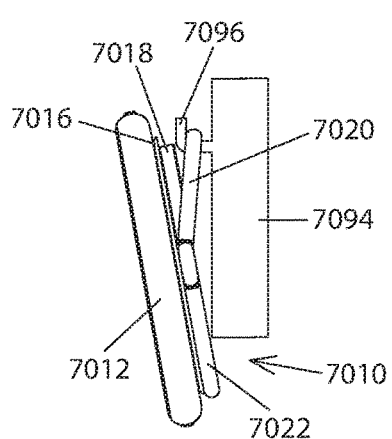
FIG. 7C illustrates a side view of an example adaptive support accessory affixed to a mobile device with a support attached to a hook-shaped accessory engagement feature disposed in a mounting structure.

In various implementations, one or more supports (e.g., supports 4020, 4022) are permanently or detachably attached to one or more components of the accessory 4010 and configured to engage with one or more of a user's fingers (e.g., see FIGS. 8A-8D), a mount (e.g., see FIG. 7B), and a mounting structure (e.g., see FIG. 7C). One or more supports may be disposed in or attached to one or more of the base 4016, the cap 4018, and the plug 4028. In some implementations, the supports 4020, 4022 are attached to the cap 4018 at their opposing distal ends. A portion of an interior perimetric face of one or more supports 4020, 4022 may be disposed adjacent to the exterior perimetric face 4050 of the cap 4018 when retracted in a retained position. In some implementations, one or more supports 4020, 4022 may have an interior profile generally conforming to at least a portion of the exterior profile of the cap 4018.

In some implementations, one or more supports (e.g., supports 4020, 4022) are substantially rigid. One or more supports 4020, 4022 may be arc-shaped or ring-shaped. In other implementations, one or more supports may be flexible and in the general form of a strap, loop, band, ribbon, or cord (e.g., see supports 19164 in FIGS. 19G-19I). One or more supports 4020, 4022 may have a profile that is substantially cylindrical or oval. In other implementations, one or more supports have an exterior profile that is sloped downward and outward at an angle. In some implementations, an exterior portion of one or more supports 4020, 4022 is flat, beveled, or chamfered and configured to maximize surface contact with a substantially flat support surface upon which they may be disposed (e.g., see support 4022 FIGS. 4H-4K).

In other implementations, two or more proximally disposed projections (not shown) spaced apart and extending outward from the exterior the supports are configured to provide additional contact points for improved stability when placed on a flat support surface. In other implementations, one or both of the top and bottom of the supports are substantially flat (e.g., see FIGS. 14E-14H). In other implementations, one or more supports include a projecting portion that is permanently or detachably attached (e.g., see supports 14020, 14022 in FIG. 14L). In some implementations, the supports include an interior or exterior portion that is over-molded and configured for providing improved contact between the supports and one or more of a user's fingers and/or a support surface, (e.g., see inside portion of supports 19020, 19022 in FIG. 19C and bottom edge and circumscribing aperture 23030 of support 23196 in FIG. 23D). In other implementations, two supports are connected together at their distal ends by a flexible tether configured for preventing the supports from rotating beyond a predetermined position with respect to the cap 4018. In other implementations, a proximal interior portion of the supports is spaced apart from the exterior perimetric face of the cap 4018 and configured to accommodate a user's fingers of larger diameter. In various implementations, the movement of one or more supports (e.g., supports 4020, 4022) attached to one of the base 4016 and the cap 4018 is restricted by at least one degree of freedom.

As shown in FIGS. 4D-4E), a support arbor 4068 may be disposed in and extend laterally inward and/or outward from each distal end of the supports (e.g., supports 4020, 4022), about which the supports 4020, 4022 may pivot with respect to the cap 4018. The support arbors 4068 may have a substantially cylindrical shape and round profile. In other implementations, one or more support arbors have a substantially semi-circular, square, or rectangular profile. In various implementations, one or more pairs of exterior cap recesses 4058 formed in opposite sides of the exterior of the cap 4018 are configured to receive a portion of a corresponding pair of support arbors 4068 and wherein the movement of the arbors 4068 and attached support may be restricted by at least one degree of freedom.

In other implementations, one side of the support arbors are flat and configured to engage with corresponding portions of the exterior cap recesses whereby rotation of the support arbors and attached support may be limited at a predetermined position. In other implementations, the support arbors have enlarged distal ends disposed in the exterior cap recesses and configured to engage with a portion of the exterior cap recesses, whereby the lateral movement of one or more supports is limited with respect to the cap. In other implementations, the supports include partial spherical projections disposed on an interior perimetric face of the supports and configured for engaging with the top of the cap and/or corresponding partial spherical recesses disposed in the exterior perimetric face of the cap, the partial spherical projections providing a mechanism for indexing the supports in one or both of a retained and deployed position. In other implementations, one or more longitudinally extending recesses disposed on the exterior perimetric face of the cap above one or more exterior cap recesses are configured to receive an interior portion of one or more supports, releasably indexing the supports in a deployed position. In other implementations, a recess disposed in the exterior perimetric face of the cap and extending radially inward is configured to receive and engage an interior portion of one or more supports, releasably indexing the supports in a retained position. In other implementations, one or more supports is attached to the cap via one or more fasteners (e.g., see FIGS. 18B-18C). In other implementations, two supports are connected to the cap and each other via one or more fasteners (e.g., see FIGS. 17A-17C). In other implementations, one continuous support arbor connects each distal end of one or more supports.

As shown in FIGS. 4A-4H, in various implementations, one or more projections (e.g., projections 4024, 4026) are disposed in the exterior of the cap 4018 at opposite ends and configured to limit the movement of one or more supports (e.g., supports 4020, 4022) by at least one degree of freedom. The projections 4024, 4026 may limit extension of one or more supports 4020, 4022 away from the accessory 4010 at a predetermined angle, as shown in FIGS. 1-2. In some implementations, the projections 4024, 4026 include one or more features configured to limit the movement of one or more supports 4020, 4022 by a second degree of freedom. A pair of projection openings (e.g., see openings 4064 in FIG. 4D) may be disposed in one or more sides of one or more projections 4024, 4026 and configured to receive a portion of the distal ends of one or more supports 4020, 4022, the projections restricting lateral movement of the supports away from the accessory 4010. One or more projections may be permanently or detachably attached to the cap 4018 (e.g., see projections 18024, 18026 in FIG. 18A). In some implementations, one or more supports may be detachably attached to one or more projections via fasteners, (e.g., see projections 18024, 18026 and supports 18020, 18022 in FIGS. 18E-18F).

In some implementations, one or more projections 4024, 4026 may be arc-shaped or T-shaped and have a substantially rounded or tapered exterior profile. In some implementations, the projections 4024, 4026 have an exterior profile generally matching the exterior profile of one or more supports (e.g., supports 4020, 4022). In other implementations, one or more projections have a shape or profile that is substantially square, rectangular, circular, triangular, or trapezoidal.

As shown in FIGS. 4D-4E, the projections 4024, 4026 may include one or more proud or recessed partial spherical projection detents 4060 disposed on an interior faces thereof and configured to engage with a corresponding proud or recessed support detent 4062 disposed on an exterior face of a distal end of one or more supports (e.g., supports 4020, 4022). The projection detents 4060 and support detents 4062 may be configured for keeping one or more support arbors 4068 centrally aligned in one or more exterior cap recesses 4058. In some implementations, a portion of one or more support arbors extends laterally outward from an exterior face of the distal ends of one or more supports and may be received and engaged in one or more recesses disposed in a bottom interior face of one or more projections.

As shown in FIGS. 4A-4E, one or more retaining protrusions 4066 extending radially outward from the exterior perimeter of the cap 4018 may be configured to selectively engage and retain one or more supports (e.g., supports 4020, 4022) in a retracted position. The retaining protrusions 4066 may be permanently or detachably attached to the cap 4018. In some implementations, one or more retaining protrusions may be attached to the cap 4018 via one or more fasteners. One or more retaining protrusions 4066 may be substantially annular or arc-shaped. One or more retaining protrusions 4066 may have a rounded or tapered profile. The protrusions 4066 may provide a snap feature by which an interior portion of the supports 4020, 4022 may be engaged and the supports retained in a retracted position until they are selectively disengaged from the retaining protrusions 4066 by the user. In other implementations, one or more retaining protrusions 4066 are configured to engage with one or more recesses disposed in the interior face of one or more supports.

One or more components of the accessory 4010 such as the base 4016, cap 4018, plug 4028, supports 4020, 4022, and projections 4024, 4026, may be constructed of a thermoplastic such as nylon or polypropylene, but other plastics such as PETG, ABS, Polyethylene, Polycarbonate, TPU, TPE, or some combination of one or more plastics or formable materials may also be used. In other implementations, one or more components of the accessory 4010 may be constructed of wood, metal, fiberglass, carbon fiber, Kevlar, composite materials, or from some combination of different materials. One or more components of the accessory 4010 may be made by injection molding, rotational molding, thermoforming, extruding, casting, machining, and additive or subtractive manufacturing such as 3d printing. In some implementations where the accessory includes one or more flexible supports, the supports may be made of silicone, rubber, synthetic fabric, nylon, polyester, leather, a composite fabric, or from some combination thereof.

Figure 5A:
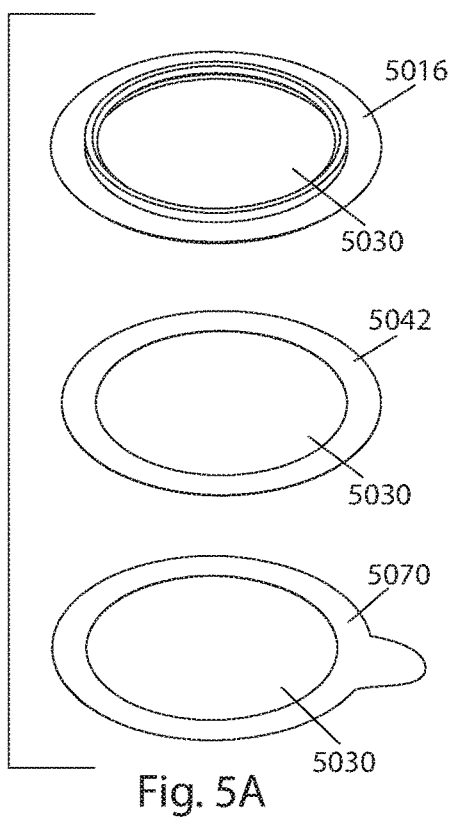
FIG. 5A illustrates a top exploded perspective view of a base, an attachment interface, and a protective cover.
Figure 5B:
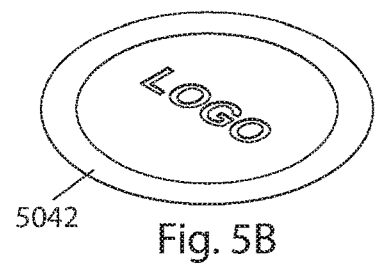
FIG. 5B illustrates a top perspective view of an attachment interface.
Figure 5C:
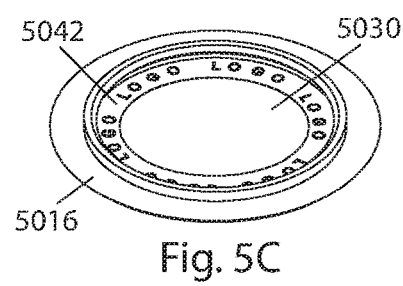
FIG. 5C illustrates a top perspective view of a base attached to an attachment interface.
Figure 5D:
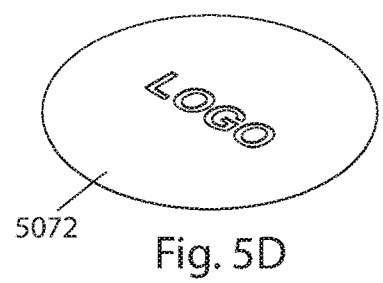
FIG. 5D illustrates a top perspective view of an intermediate mounting pad.
Figure 5E:
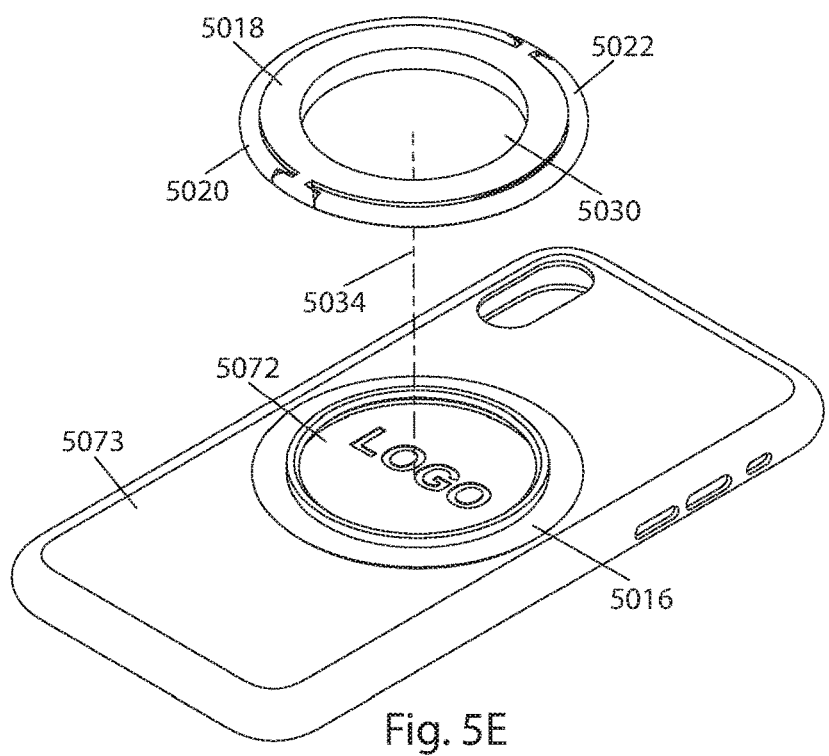
FIG. 5E illustrates a top perspective projected view of a base attached to an intermediate mounting pad affixed to a mobile device and two supports attached to a cap axially aligned with and attachable to the base.

FIG. 5A is top perspective projected view illustrating a base 5016, an annular-shaped attachment interface 5042 and a protective cover 5070. FIG. 5B is a top perspective view illustrating a disc-shaped attachment interface 5042 with a protective interior portion. FIG. 5C is a top perspective view illustrating a base 5016 attached to an annular-shaped attachment interface 5042 with a protective interior portion. FIG. 5D is a top perspective view illustrating a disc-shaped intermediate mounting pad 5072. FIG. 5E is a top perspective projected view illustrating a base 5016 attached to an intermediate mounting pad 5072 affixed to an exterior surface of a mobile device case 5073, with two supports 5020 and 5022 disposed in a cap 5018 axially aligned with and attachable to the base 5016.

Figure 6A:
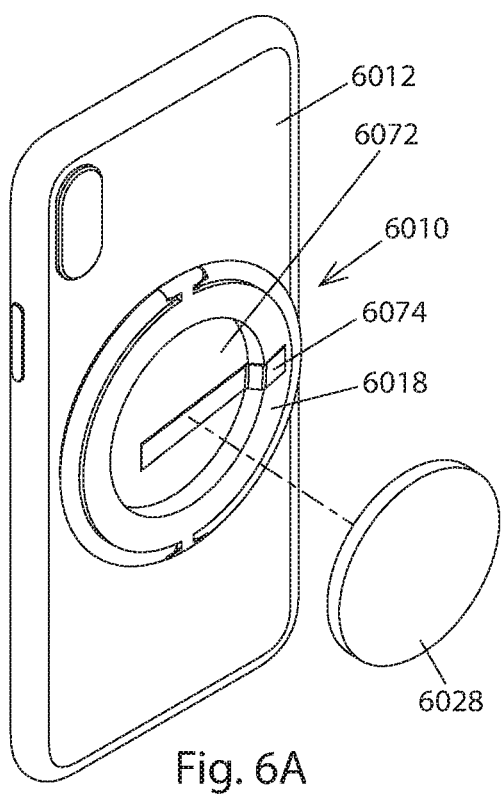
FIG. 6A illustrates a top perspective projected view of an example adaptive support accessory affixed to a mobile device with a flexible plug removal feature disposed in the center of the accessory and a detachably attachable plug.

Referring to FIGS. 5A-5E, in various implementations, an attachment interface 5042 is configured for permanently or detachably attaching one or both of a base 5016 and a cap 5018 to one of a housing, case 5073, and cover for a mobile device (e.g., see mobile device 6012 in FIG. 6A). The attachment interface 5042 may be permanently or detachably attached to or disposed in or on a surface of one of the base 5016, the cap 5018, and the mobile device housing, case 5073, or cover thereof. In some implementations, the attachment interface 5042 includes one or more attachment elements, such as a single or double-sided adhesive layer, film, liquid, sticky gel, or nano-suction pad, or hook-and-loop fastener. The top and bottom of the attachment interface 5042 may have different mechanisms for attachment disposed thereon. The attachment interface 5042 may be pliable, or configured with a pliable substrate, such as a thin foam layer, enabling the attachment interface 5042 to conform to one or more curvatures in the surface of the mobile device, housing, case 5073, or cover thereof. In some implementations, the attachment interface 5042 is magnetic and/or includes one or more magnetic attachment elements attached to or disposed in or on a surface thereof and is configured to attach to one or more ferrous or magnetic attachment elements attached to or disposed in or on a surface of one or more of the cap 5018, the base 5016, the intermediate mounting pad (e.g., see 5072 in FIG. 5D), a plug, and the mobile device housing, case 5073, and cover thereof, as shown in FIGS. 20F-20H. In some implementations, the attachment interface 5042 includes two or more attachment elements of the same or different type, such as a ferrous ring disposed between two layers of adhesive, or a polyurethane sticky gel pad disposed on the bottom of a magnetic disc, or a magnetic ring disposed between a hook-and-loop-fastener and an adhesive layer. In other implementations, two attachment elements may be configured to attach to one another, such as when one attachment element is attached to the bottom of one of the base 5016 and the cap 5018 and another attachment element is attached to the surface of the mobile device housing, case 5073, or cover thereof. In some implementations, the attachment interface 5042 includes one or more elements made of plastic, metal, magnets, carbon fiber, PTFE, Teflon, Kevlar, wood, or other composite material. In other implementations, a low friction washer, spacer, or element is attached to or disposed in or on one of the attachment interface 5042, the base 5016, and the cap 5018 to reduce friction between one or more components. In other implementations, a bearing type attachment element may be disposed in or attached to one of the attachment interface 5042, base 5016, and cap 5018 to facilitate continuous rotation between one or more components, as shown in FIGS. 20D-20E.

In various implementations, the attachment interface 5042 is attached to and substantially disposed in or on the bottom of the base 5016. In some implementations, the attachment interface 5042 is partially or substantially disposed in a first exterior base recess (e.g., see recess 4040 in FIG. 4C) formed in the bottom of the base 5016. In other implementations, the attachment interface 5042 is embedded in or partially or substantially disposed in a surface of the mobile device housing, case 5073, or cover thereof. The attachment interface 5042 may have a profile generally conforming to the profile of the mobile device housing, case 5073, or cover thereof. The attachment interface 5042 may be annular, circular, or have a shape generally conforming to one of the base 5016, cap 5018, and supports 5020, 5022. An aperture 5030 may be formed in the center of the attachment interface 5042, generally corresponding to an aperture 5030 formed in one of the base 5016 and the cap 5018, and may be relatively larger or smaller in diameter. A protective film, backing, or cover 5070 detachably attached to an exterior surface of the attachment interface 5042, may protect the attachment interface 5042 from unwanted adhesion or attachment prior to user installation. The protective cover 5070 may have an interior and exterior perimeter generally matching an interior and exterior perimeter of the attachment interface 5042 and may include a tabbed portion configured to be grasped between a user's finger and thumb in order to facilitate its removal from the attachment interface 5042, as shown in FIG. 5A.

As shown in FIGS. 5B-5C, in some implementations, the attachment interface 5042 has an interior portion extending radially inward beyond the interior perimeter of the base 5016 and configured to protect the surface of one of the mobile device housing, case 5073, or cover thereof from contact with one or both of a first annular cap protrusion and first cap engagement feature (e.g., see cap protrusion 4044 and cap engagement feature 4046 in FIG. 4C). One or more portions of the attachment interface 5042 may have a mirrored, reflective, or glow-in-the-dark surface. Indicia, such as a name, logo, slogan, trademark, or service mark representing one or more of a business, product, or person may be disposed on, across, or around one or more surfaces of the attachment interface 5042, as shown in FIGS. 5B-5C.

As shown in FIGS. 5D-5E, in some implementations, an intermediate mounting pad (e.g., mounting pad 5072) is attached to a surface of the mobile device housing, case 5073, or cover thereof. In some implementations, the intermediate mounting pad 5072 is disposed between the attachment interface and the mobile device housing, case 5073, or cover thereof, the mounting pad 5072 configured to provide an improved attachment between the attachment interface 5042 and the mobile device housing, case 5073, or cover thereof. The intermediate mounting pad 5072 may be annular, circular, or have a shape generally matching the shape of either the base 5016 and/or a surface of the mobile device, housing, case 5073, or cover thereof upon which the base 5016 may be attached. The intermediate mounting pad 5072 may have a profile generally conforming to the profile of a surface of the mobile device housing, case 5073, or cover thereof. In some implementations, an aperture may be disposed in the center of the intermediate mounting pad 5072 and may extend therethrough.

The intermediate mounting pad 5072 may have a top surface configured for optimizing attachment to the attachment interface 5042 and a bottom surface configured for optimizing attachment to the mobile device, housing, case 5073, or cover thereof, the bottom of the intermediate mounting pad 5072 configured with an adhesive formulated for bonding to adhesion-resistant material surfaces such as those containing silicone, textured surfaces, or surfaces coated with an oleophobic coating. In some implementations, the intermediate mounting pad 5072 may be pliable, or configured with a pliable substrate, such as a thin foam layer, enabling the intermediate mounting pad 5072 to conform to one or more curvatures in the surface of the mobile device, housing, case 5073, or cover thereof. In other implementations, the intermediate mounting pad 5072 is magnetic or includes one or more attachment elements attached to or disposed in a surface thereof. One or more portions of the intermediate mounting pad 5072 may have a mirrored, reflective, or glow-in-the-dark surface. In some implementations, the intermediate mounting pad 5072 includes a low-friction layer or coating disposed on the top surface thereof. In other implementations, the intermediate mounting pad 5072 includes a thermal insulating layer disposed on a top or bottom surface thereof. Indicia such as a name, logo, slogan, trademark, or service mark representing one or more of a business, product, or person may be disposed on, across, or around one or more surfaces of the mounting pad 5072 as shown in FIGS. 5D-5E.

Figure 6B:
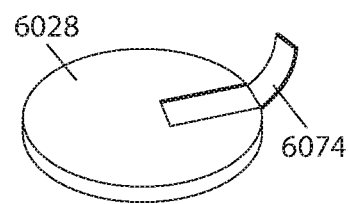
FIG. 6B illustrates a top perspective view of a plug configured with a flexible plug removal feature.
Figure 6C:
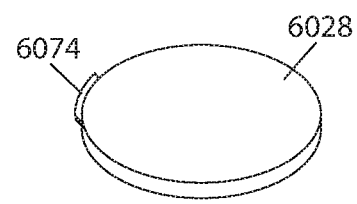
FIG. 6C illustrates a top perspective view of a plug configured with a rigid plug removal feature.
Figure 6D:
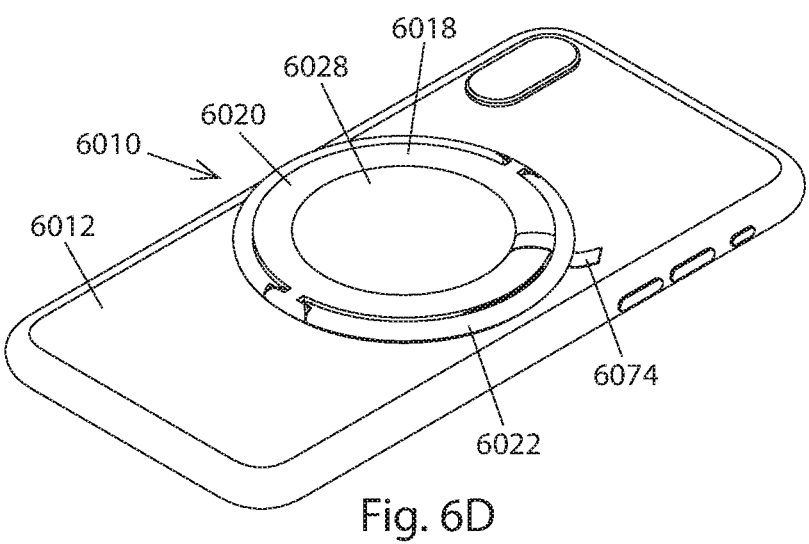
FIG. 6D illustrates a top perspective view of an example adaptive support accessory affixed to a mobile device with a flexible plug removal feature extending over a cap and retained between the cap and a support.

FIG. 6A is a top exploded perspective view illustrating the example accessory 6010 attached to an exterior surface of a mobile device 6012 and a plug removal feature 6074 disposed in the center of the accessory 6010. FIG. 6B is a top perspective view illustrating a plug 6028 configured with a flexible plug removal feature 6074. FIG. 6C is a top perspective view illustrating a plug 6028 configured with a rigid plug removal feature 6074. FIG. 6D is a top perspective view illustrating an example accessory 6010 attached to an exterior surface of a mobile device 6012 and a flexible plug removal feature 6074 retained between a cap 6018 and a support 6022.

Referring to FIGS. 6A-6D, in various implementations, the accessory 6010 includes one or more plugs (e.g., plug 6028). The plug 6028 may be permanently or detachably attached to one or more components of the accessory 6010 and/or to a mobile device 6012 housing, case, or cover thereof. In various implementations, the plug 6028 augments the utility, functionality, and ornamentation of the accessory 6010. In some implementations, the plug 6028 is used to attach different accessories or tools to the accessory 6010. In other implementations, the plug 6028 is used to mount the accessory 6010 to one or both of a mount (not shown, e.g., see 7092 in FIG. 7B), and a mounting structure (not shown, e.g., see 7094 in FIG. 7B).

In various implementations, the plug 6028 has a shape generally conforming to an aperture 6030 disposed in the center of the accessory 6010 and an exterior profile generally matching an interior profile of the accessory 6010. In some implementations, the plug 6028 has an exterior profile that is substantially circular. The plug 6028 may be disc-shaped or ring-shaped. In other implementations, the plug has an exterior profile that is triangular, square, rectangular, or polygonal. One or more apertures or recesses may be formed in the plug 6028 and may extend therethrough, (e.g., see plugs 14028 in FIGS. 14B-14C). In some implementations, the plug 6028 is magnetic or includes one or more attachment elements disposed therein or on a surface thereof. In other implementations, the plug is substantially thin and flat. In some implementations, the top surface of the plug 6028 is substantially co-planar with the top surface of a cap 6018 when the plug 6028 is attached to the accessory 6010. In other implementations, the top surface of the attached plug is recessed or proud with respect to the top of the cap 6018. In other implementations, the top of the plug is rounded. In other implementations, a portion of the top of the plug extends over a portion of the top of the cap 6018. In other implementations, a portion of the plug is configured for engagement with the first annular cap protrusion (e.g., see protrusion 4044 in FIG. 4C). In other implementations, one or more parts of the plug is extendable, collapsible, rotatable, or reversible (e.g., see FIGS. 12D-12E and 12G).

The plug 6028 may be permanently or detachably attached to one or more of an intermediate mounting pad 6072, an attachment interface (e.g., see 5042 in FIGS. 5A-5C), a base 6016, the cap 6018, and a mobile device 6012 housing, case, or cover thereof. The plug 6028 may be attached to the cap 6018 from a top or bottom side of the accessory 6010 and may be attached prior to or after attaching the base 6016 to the mobile device 6012 and/or attaching the cap 6018 to the base 6016. The plug 6028 may be detachably attached to one or both of the base 6016 and the cap 6018 and retained therein by a friction fit or interference fit. In some implementations, one or more recesses or projections disposed in the interior perimetric face of one of the base 6016 and the cap 6018 are configured for engaging one or more corresponding recesses or protrusions disposed in the exterior perimetric face of the plug 6028 whereby the plug 6028 may be securely attached to the accessory 6010 and/or prevented from rotating independently from one of the base 6016 and the cap 6018. In some implementations, the plug 6028 is configured for attachment to another plug. In other implementations, the plug 6028 is configured to attach to an accessory cover (e.g., see cover 11130 in FIG. 11G). In other implementations, the plug includes an adjustment mechanism by which the diameter of the plug may be increased or decreased in order to adjust the fit of the plug within one or more components of the accessory, such as the base 6016, cap 6018.

As shown in FIGS. 6A-6D, the accessory 6010 may include a plug removal feature 6074 for detaching one or more plugs 6028 from the accessory 6010. The plug removal feature 6074 may be substantially rigid or substantially flexible. The plug removal feature 6074 may be in the general form of a strap, loop, band, ribbon, or cord. In some implementations, the plug removal feature 6074 is integrally formed in one of the intermediate mounting pad 6072, the attachment interface, the base 6016, the cap 6018, plug 6028, and the mobile 6012 device housing, case, or cover thereof. In other implementations, the plug removal feature 6074 is permanently or detachably attached to a surface of one of the intermediary mounting pad 6072, the attachment interface, the base 6016, the cap 6018, the plug 6028, and the mobile device 6012 housing, case, or cover thereof by welding or an adhesive. In other implementations, one end of the plug removal feature 6074 is fixed in a recess formed in a bottom portion of one of the intermediate mounting pad 6072, the attachment interface, the base 6016, the cap 6018, and the mobile device 6012 housing, case, or cover thereof, and the other unfixed end of the plug removal feature 6074 passes through a slot formed in the component and extends back across the top surface thereof. In some implementations, one or both of the top and bottom of the plug removal feature 6074 is substantially co-planar with one or both of the top and bottom of one or more of the intermediate mounting pad 6072, the attachment interface, the base 6016, the cap 6018, the plug 6028, and the mobile device 6012 housing, case, or cover thereof.

In some implementations, the plug removal feature 6074 is substantially thin, flat and rectangular. In other implementations, the plug removal feature has a profile generally conforming to the interior perimeter of one of the base 6016 and the cap 6018. In some implementations, the plug removal feature 6074 includes a flexible portion configured to extend over the top of the cap 6018. In other implementations, a recess formed in the interior perimetric face of one of the base, the cap, and an accessory cover (e.g., see cover 11130 in FIG. 11G) is configured for receiving a portion of the plug removal feature 6074.

As shown in FIG. 6A, the plug removal feature 6074 may be disposed in the center of the accessory 6010 and may extend over a portion of the cap 6018. In other implementations, the plug removal feature 6074 is flexible and disposed in an exterior surface of the plug 6028, a recess formed in an exterior surface of the plug 6028, or in one or more slots formed in the plug 6028, as shown in FIG. 6B. In other implementations, the plug removal feature is embedded or insert-molded in the plug 6028. In some implementations, the plug removal feature 6074 is a rigid projection extending outward laterally and/or longitudinally from an exterior surface of the plug 6028, as shown in FIG. 6C. In other implementations, the plug removal feature is an undercut formed in the top surface or outer perimetric face of the plug 6028. In some implementations, the plug removal feature 6074 extends over the top of the cap 6018 and under one or more supports 6020, 6022 and may be retained therebetween, as shown in FIG. 6D. In other implementations, the plug removal feature is a torsional or cantilevered snap disposed in the interior perimeter of the accessory 6010 and configured to engage a portion of or engagement feature disposed on the exterior perimeter of the plug 6028. In other implementations, the plug removal feature is a torsional or cantilevered snap disposed in the exterior perimeter of the plug 6028 and configured to engage a portion of or engagement feature disposed in the interior perimeter of the accessory 6010. In other implementations, the plug removal feature includes a mechanism such as a wedge-shaped ejector release structure disposed beneath the plug 6028 and connected to a spring assisted push button operator disposed on an exterior of the accessory 6010.

Figure 7B:
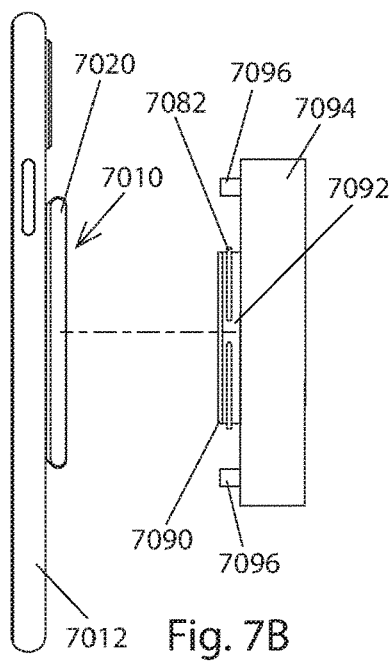
FIG. 7B illustrates a side projected view of an example adaptive support accessory affixed to a mobile device, with a mount configured with an attachment feature and an attachment element and affixed to a mounting structure configured with two accessory engagement features.

FIG. 7A is a top exploded perspective view illustrating the example accessory 7010 configured with multiple attachment features 7076, 7078, 7080 and multiple attachment elements 7084, 7086, 7088. FIG. 7B is a side projected view illustrating a mobile device 7012 and affixed example accessory 7010 detachably attachable to a mount 7092 and a mounting structure 7094, the mount 7092 including an attachment feature 7082 and attachment element 7090, and the mounting structure 7094 including two accessory engagement features 7096, with the mobile device 7012 rotatably positioned to attach in a portrait orientation. FIG. 7C is a side view illustrating a mobile device 7012 and affixed example accessory 7010 attached to a mounting structure 7094 configured with a hook-shaped accessory engagement feature 7096 whereto the accessory 7010 is attached by a support 7020 and the mobile device 7012 is rotatably positioned in a landscape orientation.

As illustrated in FIGS. 7A-7B, the accessory 7010 may include one or more permanently or detachably attached attachment features (e.g., 7076, 7078, 7080, 7082) for attaching various components of the accessory 7010 together and/or for attaching the accessory 7010 to another object, such as a mount 7092 or mounting structure 7094. One or more attachment features (e.g., 7076, 7078, 7080, 7082) may be disposed in or attached to or disposed in or on an exterior or interior perimeter or surface of one or more of an intermediate mounting pad (e.g., see mounting pad 5072 in FIG. 5D), an attachment interface (e.g., see attachment interface 5042 in FIG. 5A), a base 7016, a cap 7018, an accessory cover (e.g., see feature 11076 in cover 11130 of FIG. 11F), a mobile device 7012 housing, case, or cover thereof, a plug 7028, and a mount 7092, as shown in FIGS. 7A-7B. The attachment features (e.g., 7076, 7078, 7080, 7082) may be proud or recessed with respect to the surface in which they are disposed (e.g., see attachment feature 7082 in FIG. 7B). One or more attachment features (e.g., 7076, 7078, 7080, 7082) may be separately formed from or substantially integrated into one or more components of the accessory 7010.

In some implementations, the attachment features (e.g., 7076, 7078, 7080, 7082) comprise an annular, torsional, or cantilevered snap. The attachment features (e.g., 7076, 7078, 7080, 7082) may be continuous or segmented. The attachment features (e.g., 7076, 7078, 7080, 7082) may include one or more openings or recesses configured for receiving a portion of another attachment feature or a plug removal feature (e.g., see feature 6074 in FIG. 6B), as shown in FIG. 7A. The attachment features (e.g., 7076, 7078, 7080, 7082) may include one or more detents configured to limit the movement of one or more other attachment features. The attachment features (e.g., 7076, 7078, 7080, 7082) may be configured to laterally or longitudinally constrain one or more other attachment features. In other implementations, the attachment features (e.g., 7076, 7078, 7080, 7082) comprise one or more fasteners, such as a ball-and-socket snap, a twist lock, a key slot, a slide lock, a spring clip, a hook, a suction cup, or threaded fasteners, and may operate by friction fit, interference fit, snap fit, suction, rotation, or other mechanical advantage.

One or more attachment features (e.g., 7076, 7078, 7080, 7082) may be configured for attachment to one or more other attachment features. For example, a first attachment feature 7076 may be configured for attachment to one or more of a second, third, and fourth attachment feature 7078, 7080, 7082. The second attachment feature 7078 may be configured for attachment to one or more of the first, third, and fourth attachment features 7076, 7080, 7082. The third attachment feature 7080 may be configured for attachment to one or more of the first, second, and fourth attachment features 7076, 7078, 7082. The fourth attachment feature 7082 may be configured for attachment to one or more of the first, second, and third attachment features 7076, 7078, 7080.

In various implementations, the accessory 7010 further includes one or more permanently or detachably attached attachment elements (e.g., 7084, 7086, 7088 7090) for attaching various components of the accessory 7010 together and/or for attaching the accessory 7010 to another object. One or more attachment elements (e.g., 7084, 7086, 7088 7090) may include one or more attachment features (e.g., 7076, 7078, 7080, 7082). One or more attachment elements (e.g., 7084, 7086, 7088 7090) may be attached to or disposed in or on an interior or exterior perimeter or surface of one or more of the intermediate mounting pad, the attachment interface, the base 7016, the cap 7018, the accessory cover, a mobile device 7012 housing, case, or cover thereof, the plug 7028, and the mount 7092, as shown in FIGS. 7A-7B.

One or more attachment elements (e.g., 7084, 7086, 7088 7090) may be magnetic. One or more surfaces of one or more attachment elements (e.g., 7084, 7086, 7088 7090) may be configured with a single or double-sided fastener, such as an adhesive tape, reusable adhesive, sticky gel pad, nano-suction pad, two-part interlocking fastener, or hook-and-loop fastener. In some implementations, one or more attachment elements (e.g., 7084, 7086, 7088 7090) are embedded in or substantially integrated in one of the intermediate mounting pad, the attachment interface, the base 7016, the cap 7018, the accessory cover, the mobile device 7012 housing, case, or cover thereof, the plug 7028, and the mount 7092.

The attachment elements (e.g., 7084, 7086, 7088 7090) may be substantially rigid or substantially flexible. The attachment elements (e.g., 7084, 7086, 7088 7090) may have an annular, circular, triangular, square, rectangular, or polygonal shape and may be in the general form of a disc, ring, cap, or flanged insert. One or more attachment elements (e.g., 7084, 7086, 7088 7090) may have a shape or profile generally matching the shape or profile of one or more of the intermediate mounting pad, the attachment interface, the base 7016, the cap 7018, the accessory cover, the plug 7028, or the mount 7092. In other implementations, one or more attachment elements (e.g., 7084, 7086, 7088 7090) has a profile generally matching an interior or exterior profile of one or more attachment features (e.g., 7076, 7078, 7080, 7082).

One or more attachment elements (e.g., 7084, 7086, 7088 7090) may be configured for attachment to one or more other attachment elements. For example, a first attachment element 7084 may be configured for attachment to one or more of a second, third, and fourth attachment element 7086, 7088, 7090. The second attachment element 7086 may be configured for attachment to one or more of the first, third, and fourth attachment elements 7084, 7088, 7090. The third attachment element 7088 may be configured for attachment to one or more of the first, second, and fourth attachment elements 7084, 7086, 7090. The fourth attachment element 7090 may be configured for attachment to one or more of the first, second, and third attachment elements 7084, 7086, 7088. In some implementations, multiple attachment elements (e.g., 7084, 7086, 7088 7090) are disposed in one or more components of the accessory 7010, such as the cap 7018 (e.g., see FIGS. 20A-20B).

In some implementations, one or more attachment features (e.g., 7076, 7078, 7080, 7082) are configured for engaging and retaining one or more attachment elements (e.g., elements 7084, 7086, 7088, 7090). A portion of one or more attachment features (e.g., 7076, 7078, 7080, 7082) may be configured to engage with and constrain the movement one or more attachment elements (e.g., 7084, 7086, 7088 7090) by at least one degree of freedom. One or more attachment elements (e.g., 7084, 7086, 7088 7090) may be permanently or detachably attached to one or more components of the accessory 7010 by magnets, friction fit, compression fit, interference fit, snap fit, rotational engagement, twist lock, slide lock, threaded fasteners, two-part interlocking fasteners, hook-and-loop fasteners, suction, or adhesive. In some implementations, one or more attachment features (e.g., 7076, 7078, 7080, 7082) and attachment elements (e.g., 7084, 7086, 7088 7090) include an opening or recess configured to receive a portion of a plug removal feature (e.g., see 6074 in FIGS. 6A-6D). In other implementations, indicia such as a name, logo, slogan, trademark, or service mark representing one or more of a business, product, or person may be disposed on, across, or around one or more surfaces of one or more attachment elements 7084, 7086, 7088, 7090.

As illustrated in FIGS. 7B-7C, the accessory 7010 is used for attaching the mobile device 7012 to one or both of the mount 7092 and mounting structure 7094. The mount 7092 may be permanently or detachably attached to the mounting structure 7094. The mount 7092 may be attached to the mounting structure 7094 by magnets, friction fit, compression fit, interference fit, snap fit, rotational engagement, twist lock, slide lock, threaded fasteners, two-part interlocking fasteners, hook-and-loop fasteners, suction, or adhesive. In some implementations, the mount 7092 swivels or rotates in one or more directions with respect to the mounting structure 7094. In other implementations, the mount 7092 is extendable or retractable with respect to the mounting structure 7094. In other implementations, the mount 7092 is repositionable or slidable with respect to the mounting structure 7094. In some implementations, one or more accessory engagement features 7096 are disposed in one or both of the mount 7092 and mounting structure 7094 and configured to engage with one or more of the cap 7018, projections 7024, 7026, and supports 7020, 7022, as shown in FIGS. 7B-7C.

The accessory 7010 may detachably attach to one or both of the mount 7092 and mounting structure 7094 by magnets, friction fit, compression fit, interference fit, snap fit, rotational engagement, twist lock, slide lock, threaded fasteners, two-part interlocking fasteners, hook-and-loop fasteners, suction, or adhesive. In some implementations, one or more plugs 7028 configured for attachment to the accessory 7010 may be attached to the mounting structure 7094 and may function as the mount 7092. In some implementations, one or more plugs 7028 include more than one type of attachment feature and/or attachment element, enabling the user to selectively attach one or both of the plug 7028 and the accessory 7010 to different types of mounting structures 7094 (e.g., see FIGS. 12A-12F).

As illustrated in FIG. 7C, in some implementations, one or more accessory engagement features 7096 disposed in one or both of the mount 7092 and mounting structure 7094 are configured for engaging one or more supports 7020, 7022. In some implementations, one or more engagement features 7096 disposed in the mounting structure 7094 are hook-shaped or include a clip or recess with a profile generally matching the profile of one or more supports 7020, 7022, as shown in FIG. 7C. In other implementations, the accessory 7010 is attached to one or both of the mount 7092 and mounting structure 7094 by one or more attachment features (e.g., 7076, 7078, 7080 7082) and/or attachment elements (e.g., 7084, 7086, 7088, 7090). In other implementations, one or more supports 7020, 7022 may be engaged in one or more accessory engagement features 7096 disposed in one of mount 7092 and mounting structure 7094. In some implementations, a low friction washer or spacer is disposed between the mount 7092 and mounting structure 7094 to reduce friction between the two. In other implementations, a bearing, such as a race, roller, ultra thin, and ball bearing is disposed in between the mount 7092 and mounting structure 7094 to facilitate continuous rotation between the two.

Figure 8A:
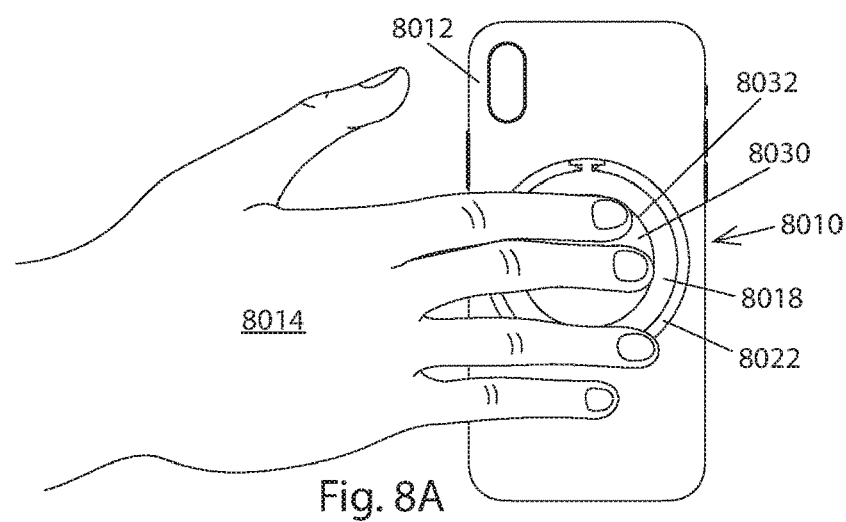
FIG. 8A illustrates a side view of an example adaptive support accessory affixed to a mobile device and held in a user's hand, with a first and second finger of a user's hand engaged with an interior perimetric face of the accessory and a third finger engaged with an exterior perimetric face of a support.
Figure 8B:
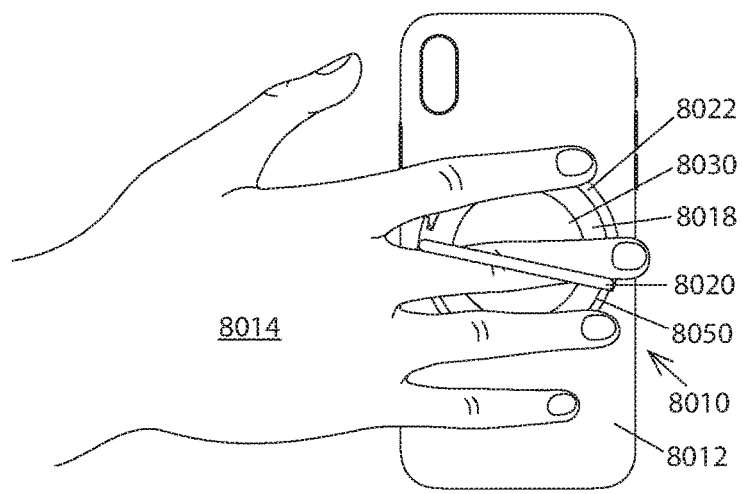
FIG. 8B illustrates a top view of an example adaptive support accessory affixed to a mobile device and held in a user's hand, with a first finger of a user's hand engaged through a first support, a second finger engaged with an exterior perimetric face of a second support, and a third finger engaged with an exterior perimetric face of a cap.
Figure 8C:
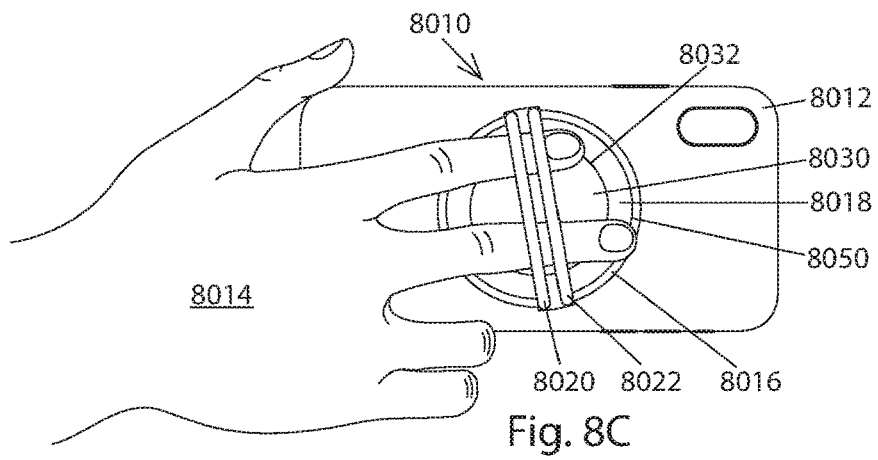
FIG. 8C illustrates a top view of an example adaptive support accessory affixed to a mobile device and held in a user's hand, with a first and second finger of a user's hand engaged through two supports.
Figure 8D:
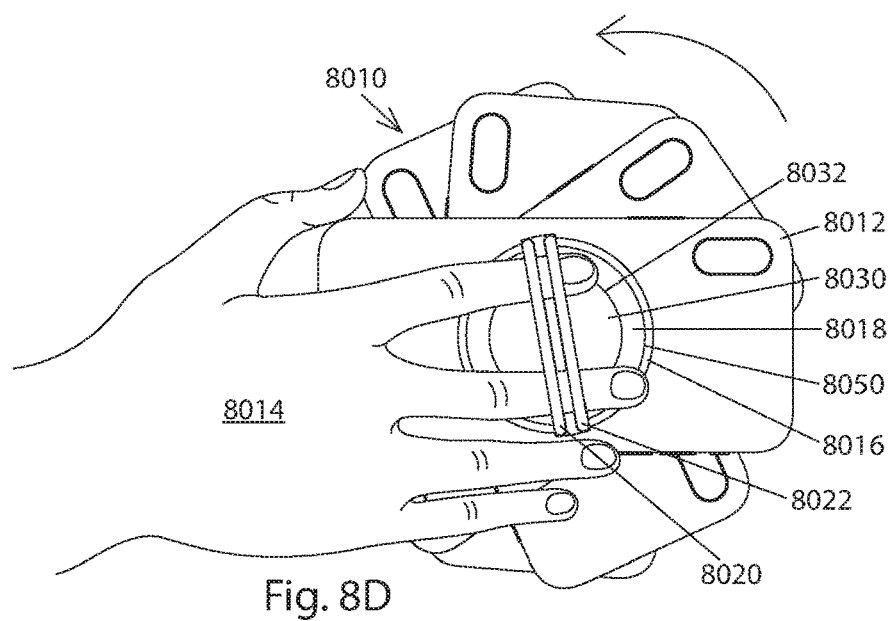
FIG. 8D illustrates a top view of an example adaptive support accessory affixed to a mobile device and held in a user's hand, with a first and second finger of the user's hand engaged through two supports and the user's thumb rotating the mobile device and base affixed thereto about an axis of rotation.

FIG. 8A is a top view illustrating an example accessory 8010 affixed to an exterior surface of a mobile device 8012 with a first and second finger of a user's hand 8014 placed inside the aperture 8030 and engaged with an interior perimetric face 8032 of a cap 8018, and a third finger of a user's hand 8014 engaged with the exterior perimetric face of a support 8022. FIG. 8B is a top view illustrating an example accessory 8010 affixed to an exterior surface of a mobile device 8012 with a first finger of a user's hand 8014 inserted through and engaged with a support 8020, a second finger of a user's hand 8014 engaged with an exterior perimetric face of a support 8022, and a third finger of a user's hand 8014 engaged with an exterior perimetric face 8050 of a cap 8018. FIG. 8C is a top view illustrating an example accessory 8010 affixed to an exterior surface of a mobile device 8012 with a first and second finger of a user's hand 8014 inserted through and engaged with supports 8020, 8022 and partially disposed on a top surface of a cap 8018, the first finger further engaged with an interior perimetric face 8032 of the cap 8018 and the second finger further engaged with an exterior perimetric face 8050 of the cap 8018. FIG. 8D is a top view illustrating an example accessory 8010 affixed to an exterior surface of a mobile device 8012 with a first and second finger of a user's hand 8014 inserted through and engaged with supports 8020, 8022 and partially disposed on a top surface of a cap 8018, the first finger further engaged with an interior perimetric face 8032 of the cap 8018 and the second finger further engaged with an exterior perimetric face 8050 of the cap 8018, the user's thumb disposed on an exterior side of the mobile device 8012 and used to rotate the mobile device 8012 and affixed base 8016 with respect to the cap 8018 and supports 8020, 8022 which are held in a fixed position by the first and second fingers of the user's hand 8014.

As shown in FIGS. 8A-8D, in various implementations, one or more components of the accessory 8010 such as a base 8016, a cap 8018, a plug, and one or more supports 8020, 8022 provide a mechanism for engaging one or more fingers of a user's hand 8014, a mount, a mounting structure, and an accessory engagement feature (e.g., see FIG. 7B). One or more supports 8020, 8022 may be extended, retracted, and rotated to accommodate a variety of user preferences, interactive modalities, and use-case scenarios. Various components of the accessory 8010 are configured to work in conjunction to provide the user with an improved mechanism for mounting, holding, manipulating, and interacting with a mobile device 8012, as further detailed in the example operations of FIG. 10.

Figure 9B:
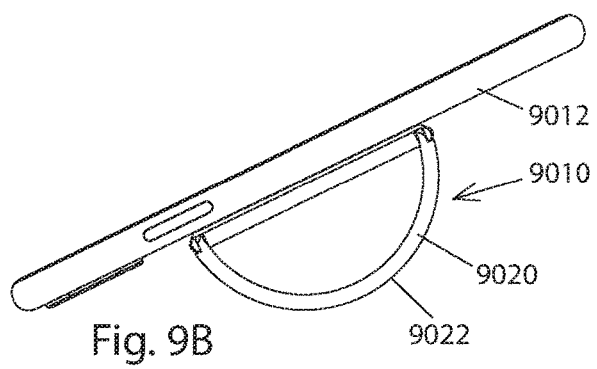
FIG. 9B illustrates a side view of an example adaptive support accessory affixed to a mobile device, with two supports extended in a deployed position and supporting the mobile device in a second example portrait orientation.
Figure 9A:
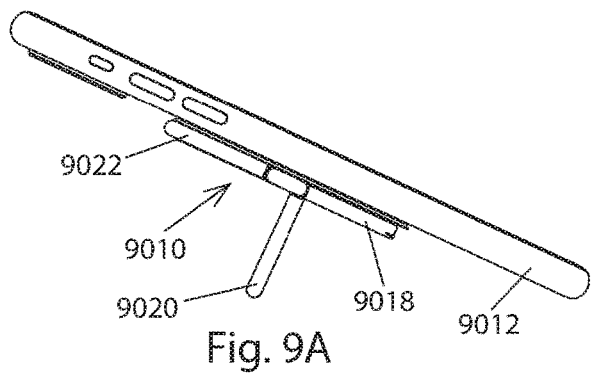
FIG. 9A illustrates a side view of an example adaptive support accessory affixed to a mobile device, with a support extended in a deployed position and supporting the mobile device in a first example portrait orientation.
Figure 9C:
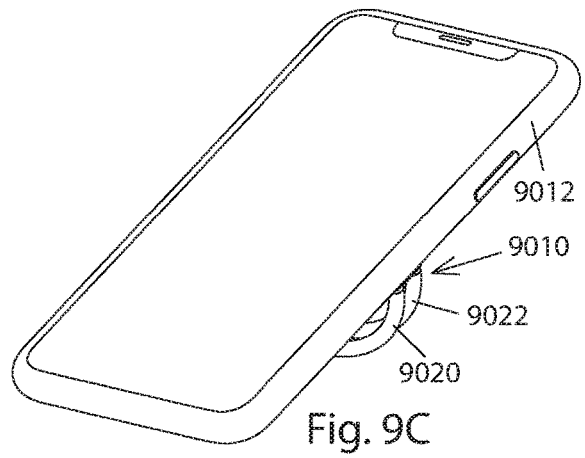
FIG. 9C illustrates a bottom perspective view of an example adaptive support accessory affixed to a mobile device, with two supports extended in a deployed position and supporting the mobile device in a first example portrait orientation.
Figure 9D:
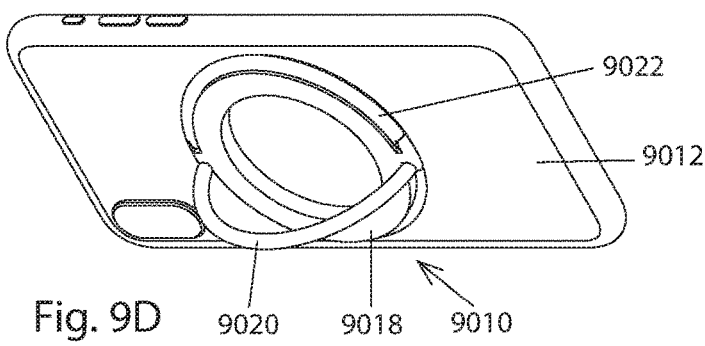
FIG. 9D illustrates a top perspective view of an example adaptive support accessory affixed to a mobile device, with a support extended in a deployed position and orienting the mobile device in a first example landscape orientation.
Figure 9E:
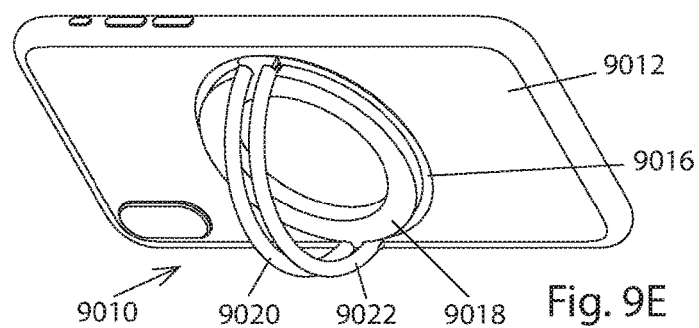
FIG. 9E illustrates a bottom perspective view of an example adaptive support accessory affixed to a mobile device, with two supports extended in a deployed position and orienting the mobile device in a second example landscape orientation.

FIG. 9A is a right side view illustrating an example accessory 9010 affixed to an exterior surface of a mobile device 9012 with a front edge of the mobile device 9012 disposed on a support surface (for example, a table) and a first support 9020 of the accessory 9010 extended and disposed on the support surface to position the mobile device 9012 in a first portrait orientation. FIG. 9B is a left side view illustrating an example accessory 9010 affixed to an exterior surface of the mobile device 9012 with a back edge of the mobile device 9012 disposed on a support surface and a first and second support 9020, 9022 (second support 9022 hidden from view) of the accessory 9010 extended and disposed on the support surface to position the mobile device 9012 in a second portrait orientation. FIG. 9C is a bottom perspective view illustrating an example accessory 9010 affixed to an exterior surface of a mobile device 9012 with the front edge of the mobile device 9012 positioned on a support surface and a first and second support 9020, 9022 of the accessory 9010 extended and disposed on the support surface to position the mobile device 9012 in a first portrait orientation. FIG. 9D is a top perspective view illustrating an example accessory 9010 affixed to an exterior surface of a mobile device 9012 positioned on a support surface with a first support 9020 extended and positioned to support the mobile device 9012 in a first landscape orientation. FIG. 9E is a top perspective view illustrating an example accessory 9010 affixed to an exterior surface of a mobile device 9012 and positioned on a support surface with a first and second support 9020, 9022 extended and positioned to support the mobile device 9012 in a second landscape orientation.

One or more supports 9020, 9022 may be extended and disposed on a substantially flat support surface to position a mobile device 9102 in one or more display orientations to optimize one or both of a user's viewing angle and interaction with the mobile device 9012. The supports 9020, 9022 may be rotated around an axis of rotation (e.g., see 3034 in FIG. 3) in conjunction with one of a cap 9018 and a base 9016 in order to change or adjust the display orientation of the mobile device 9012. Furthermore, different portions of one or more supports 9020, 9022 may be disposed on the support surface in order to achieve different display orientations.

Figure 10:
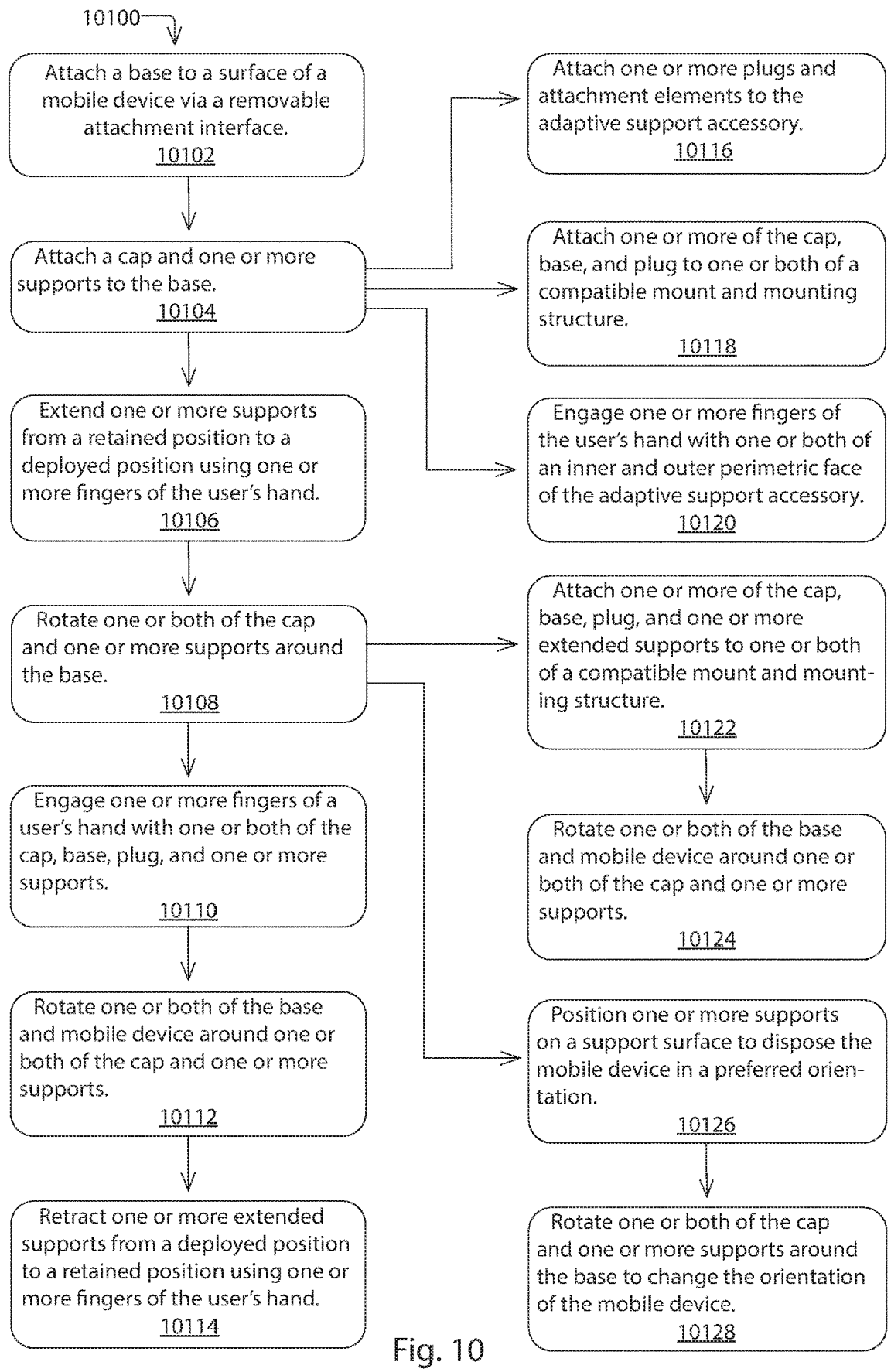
FIG. 10 illustrates example operations for using an example adaptive support accessory.

FIG. 10 illustrates example operations 10100 for using an adaptive support accessory. The example operations are, in part, supported by the illustrations of FIGS. 7A-9E. The example accessory 10100 accommodates a wide range of different interactive modalities and, therefore, a variety of different possible example operations. A description of common sequentially linked interactive modalities will be set forth along with descriptions of some other optional modalities, which together provide a non-exhaustive representation of some example operations for using the accessory 10100. The operations making up the embodiments of the invention described herein may be performed in any order, adding or omitting operations as desired, unless explicitly claimed otherwise or a specific order is inherently necessitated by the claim language. In a first example attaching operation 10102, a user attaches a base to a surface of a mobile device housing, case, or cover thereof via a removable attachment interface. If the attachment interface includes an adhesive covered by a protective cover, the user may first remove the protective adhesive cover before attaching the base and attachment interface to the mobile device. In some implementations, such as if one or more surfaces of the mobile device is not suitable for attachment by the attachment interface, the user may attach an intermediate mounting pad to the mobile device prior to attaching the attachment interface and base. In other implementations where the base is pre-disposed or substantially incorporated in one of the mobile device case or cover thereof, a user may attach one of the case and cover to the mobile device.

In a second example attaching operation 10104, a cap with one or more supports attached thereto is attached to the base. The cap is axially aligned with and positioned over the base. The cap and base are then pressed together until one or more cap engagement features are engaged with one or more corresponding base engagement features, rotatably coupling the cap and one or more attached supports to the base. In some implementations the cap may be attached to the base prior to attaching one or more attachable supports to the cap.

In other implementations, one or more supports may be attached to the accessory by inserting one end of the support into an opening formed in the base and then securing it to the accessory by inserting a plug into an aperture formed in the center of the accessory.

Once the cap is rotatably coupled to the base, the user may decide to further adapt the accessory. In a third example attaching operation 10116, the user may attach one or more plugs and/or attachment elements to the accessory, as illustrated in FIG. 7A. One or more components of the accessory may be configured with one or more attachment features or attachment elements, as shown in FIG. 7A. In some cases, the plug provides an additional feature or function to the accessory. For example, the plug may include one or more tools or everyday carry items the user might normally carry in their pocket separately from their mobile device, as shown in FIGS. 13A-13D. In other cases, the plug may be configured with one or more attachment features or attachment elements for attaching one or both of the plug and the accessory to another object, as shown in FIGS. 12A-12I. For example, the plug may be configured with a twist lock attachment feature for attaching the accessory to a correspondingly configured twist lock mount. In some cases, the attached plug may provide both an additional feature or function for attaching the accessory to another object. For example, the plug may be a container configured with one or more magnetic attachment elements disposed therein and configured for attachment to a magnetic mounting structure. One or more indicators disposed on an exterior surface of one of the cap, the base, the plug, and one or more supports may visually or tactilely aid the user in orienting the plug to a position in which it may be most easily or optimally attached to the accessory, as shown in FIG. 12C. In other examples, an accessory cover may be attached to one of the cap and the base prior to or in lieu of attaching the plug and may provide for adapting one of the cap and the base to receive and/or engage the plug, as shown in FIGS. 11E-11G. Like the plug, the accessory cover may include one or more attachment features or attachment elements configured for attaching to or engaging with another attachment feature or attachment element disposed in one or more other accessory components, mount, or mounting structure.

There are a variety of scenarios in which a user may decide to use the accessory to attach the mobile device to another object. In a fourth example attaching operation 10118, the user may attach one or more of the cap, the base, and the plug to one or both of a compatible mount and mounting structure, as illustrated in FIG. 7B. For example, in some scenarios where one or more of the base, the cap, and the plug include one or more magnetic attachment elements and/or are configured for magnetic attachment to the mount, the user may mount the accessory and the attached mobile device by simply aligning the center of the accessory with the center of the mount. In other example scenarios where an aperture is disposed in the center of the accessory, the user may simply align the aperture in the accessory with the center of the correspondingly shaped mount and presses the accessory and the attached mobile device onto the mount. Depending on the configuration of the mount, the accessory may attach to the mount by engagement between one or more attachment features disposed in the accessory and one or more other attachment features disposed in one or both of the mount and mounting structure. In other scenarios, the accessory may be attached to the mount and/or mounting structure by engagement between one or more attachment elements disposed in the accessory with one or more other attachment elements disposed in one or both of the mount and mounting structure.

In some examples, one or more attachment features and attachment elements disposed in one of the intermediate mounting pad, the attachment interface, the base, the cap, the plug, and the mobile device housing, case, and cover thereof, may be selectively or rotatably engaged with one or more other attachment features and/or attachment elements disposed in one or both of the mount and the mounting structure. In some implementations, such as when the accessory is attached to one or both of the mount and the mounting structure by twist lock or correlated magnetic force (as may be imparted through one or more correlated magnets disposed in one or more components of the accessory and one or both of the mount and mounting structure), the user may selectively rotate one or more of the accessory, the mobile device, or the mount to disengage the accessory from the mount or the mounting structure. In other implementations, the user may rotate one or more of the accessory, the mobile device, or the mount in order to securely latch or engage one or more attachment features and/or attachment elements disposed in the mount with one or more attachment features and/or attachment elements disposed in the accessory. In other implementations, the user may attach the accessory to one of the mount and the mounting structure by aligning the accessory between one or more accessory engagement features disposed in one of the mount and the mounting structure and pressing the accessory into and/or between the accessory engagement features, as illustrated in FIG. 7B.

There are a variety of examples in which the user may use the accessory to attach the mobile device to one or both of the mount and the mounting structure in order to enhance the usability of the mobile device. In one example, the mount and/or the mounting structure may be connected to a dash of a vehicle, to which the user may attach the accessory and the mobile device, enabling the mobile device to be used as a navigational aid. In other examples, the mount and/or the mounting structure may be connected to the handlebars of a bicycle or a flexible band configured for attachment to a part of the user's body in order to provide more accessible navigational information or fitness tracking information to the user. In another example, the mount and/or the mounting structure may be configured with an inductive charger which may be incorporated into a display stand in order to charge a battery disposed in the mobile device and/or position the mobile device in a preferred display orientation.

There are also a variety of situations in which the user may desire to improve their handling or operation of the mobile device. The accessory supports different types of user engagements and is adaptable to different situationally based user preferences. In some situations, such as when the user expects to interact with the mobile device for a brief period of time, the user may prefer a more expedient type of support engagement, without having to deploy one or more supports. In a fifth example engaging operation 10120, a user may engage one or more fingers of a user's hand with one or both of an interior and exterior perimetric face of the accessory. For example, the user may place one or more fingers of the user's hand inside the aperture formed in the center of the accessory and against the interior perimetric face of one of the base and the cap. In another example, the user may position one finger of the user's hand adjacent to the exterior perimetric face of a first retained support and position another finger of the user's hand on an opposite side of the accessory adjacent to the exterior perimetric face of a second retained support, gripping the accessory between the first and second fingers. In another example, the user may engage one or more fingers of the user's hand with the interior perimetric face of one of the base and the cap and engage one or more other fingers with the exterior perimetric face of one or more retained supports, as illustrated in FIG. 8A.

In other situations, such as when the user expects to interact with the mobile device for a longer period of time, the user may prefer a more secure type of support engagement with one or more extended supports, in which case the user may need to extend one or more of the supports prior to engagement. In a sixth example extending operation 10106, the user may extend one or more supports from a retained position to a deployed position using one or more fingers of the user's hand. In an example single-handed extending operation, the user may deploy one or more supports using one or more fingers of the user's hand while holding the mobile device between the user's thumb and one or more other fingers of the user's hand. Alternatively, the user may hold the mobile device in one of the user's hands and use one or more fingers of the user's other hand to deploy one or more of the supports. In some example extending operations, such as where one or more rigid arc-shaped supports are connected to the cap and retained in a retracted position by engagement with one or more retaining protrusions disposed on the outer perimetric face of the cap, the user may place the tip of one or more fingers of the user's hand adjacent to the bottom exterior perimeter of one or more of the supports and apply inward or upward pressure against the supports in order to release them from a retained position before extending them to a deployed position. In some implementations, one or more features disposed on an exterior surface of the cap and/or one or more of the supports may visually or tactilely aid the user in orienting the accessory to a position in which one or more of the supports may be most easily or optimally deployed. In other implementations, the accessory may include a mechanism activated by either a push button or a pull tab by which one or more of the supports may be extended and/or retracted separately or simultaneously by the user.

In some implementations, one or more of the supports may be extended beyond a predetermined angle defined by a portion of one or more projections laterally disposed on the exterior of the cap in order to cause one or more the supports and/or support arbors to be forcibly detached from the accessory. Thus, in some implementations, one or more of the supports may be interchangeable without requiring the user to detachably separate the cap from the base. In some implementations, however, a user may also detach the cap from the base by extending one or more of the supports to a deployed position, engaging one or more fingers of the user's hand through one or more of the supports, and applying a pulling force against one or more of the supports in the direction away from the mobile device while simultaneously keeping the mobile device in a fixed position. In order to reattach the cap to the base, the user may axially align the cap over the base and apply downward pressure to the top of the cap until the first cap engagement feature fully engages with the first base engagement feature and the cap and base are rotatably coupled, as described in the first example attaching operation (e.g., see operation 10102).

In a seventh example rotating operation 10108, the user may rotate the cap and/or one or more of the supports around the base. This rotation may aid the user in orienting one or more of the supports to an optimal position wherein one or more of the user's fingers may be most easily engaged with one or more of the extended supports. In other situations, one or more of the supports may need to be rotated prior to engaging the accessory with one or both of the mount and the mounting structure. In one example rotating operation, the user may rotate one or more of the extended supports to a particular position prior to engaging them with one or more accessory engagement features disposed in one of the mount and/or the mounting structure.

In an eighth example attaching operation 10122, a user may attach one or more of the cap, the base, the plug, and one or more of the extended supports to one or both of the mount and the mounting structure. In one example attaching operation, one or more of the extended supports may be engaged with one or more compatible engagement features disposed in one or both of the mount and the mounting structure, such as the hook-shaped accessory engagement feature shown in FIG. 7C. In some implementations, multiple components of the accessory may be simultaneously attached to one or both of the mount and the mounting structure. For example, the cap may be attached to the mount while one or more of the supports are simultaneously attached to one or more accessory engagement features disposed in the mounting structure.

Once the accessory has been attached to one or both of the mount and/or the mounting structure, the user may desire to change the orientation of the mobile device with respect to one or both of the mount and/or the mounting structure. For example, the user might want to change the mobile device display orientation from portrait orientation to a landscape orientation. Thus, in a ninth example rotating operation 10124, the user may rotate one or both of the base and the mobile device around the cap and/or one or more of the supports. In another example rotating operation, the user may rotate one or both of the mount and the mobile device in order to change the orientation of the mobile device.

In addition to providing improved handling, operation, and mounting of the mobile device, the accessory may also be used to position the mobile device in a preferred orientation for hands-free use as illustrated in FIGS. 9A-9E. In a tenth positioning operation 10126, the user may position one or more extended supports on a support surface to dispose the mobile device in a preferred orientation. For example, the user may want to position the mobile device in a portrait orientation on a desk in order to better interact with the mobile device's graphical user interface. In another example positioning operation, the user may want to position the mobile device on a table in a landscape orientation optimized for watching a video on the mobile device.

To adjust the user's viewing angle with respect to the mobile device's display orientation, in an eleventh rotating operation 10128, the user may rotate the cap and/or one or more of the supports around the base to change the display orientation of the mobile device. For example, a user may rotate one or more of the extended supports supporting the mobile device on a support surface in a portrait orientation as shown in FIGS. 9A-9C to change the orientation of the mobile device to a landscape orientation, as shown in FIGS. 9D-9E. In another example rotating operation, the user may rotate one or more of the supports supporting the mobile device in a landscape orientation approximately ninety degrees in order to increase or decrease the viewing angle of the mobile device display as shown in FIGS. 9D-9E. Different mobile device orientations may be obtained depending on the size and shape of the supports, how many of the supports are extended, how the supports are oriented with respect to the mobile device, and the support surface upon which the supports are disposed.

In a twelfth engaging operation 10110, the user may engage one or more fingers of the user's hand with one or more of the cap, the base, the plug, and one or more of the supports, as shown in FIGS. 8B-8C. The user may choose to dispose one or more of the supports in a variety of positions relative to one or more of the user's fingers, such as positioning an engaging portion of one or more of the supports closer or further away from the distal end of one or more fingers of the user's hand. This flexibility with regard to support placement provides for different comfort fits depending on the user's preferences and preferred methods of engagement and allows for greater reach with respect to the user's thumb in relation to the mobile device's display. Moreover, because the cap and one or more of the supports may rotate with respect to one or both of the base and the mobile device, the user's grip may easily be adjusted in order to optimize the user's interaction with the mobile device.

For example, in one example engaging operation, the user may place one or more fingers of the user's hand underneath and adjacent to one or more fully extended supports, using the support as a kind of shelf to support the mobile device in one of the user's hands. In another example main engaging operation, the user may place one side of the mobile device in the palm of the user's hand, and grip around the exterior of the support disposed on the opposite side of the mobile device with one or more fingers of the user's hand. In another example engaging operation, the user may squeeze one or more of the extended supports between two or more fingers of the user's hand.

In various example engaging operations, the user may engage one or more fingers of the user's hand through one or more of the extended supports, which may enable the user to more securely hold and operate the mobile device single-handedly. For example, in one example engaging operation, the user may engage one of the user's fingers through one of the extended supports and position each end of the support flush against opposite sides of the user's finger such that the fingers of the user's hand may be held together comfortably in close proximity to one another in a natural position, as shown in FIG. 8B. In another example engaging operation, the user may engage one or more fingers of the user's hand into one or more of the extended supports with the back of the user's fingers disposed adjacent to the top of the cap such that the mobile device is positioned toward the back of the user's hand. This type of engagement can be convenient insofar as it leaves the fingers of the user's hand substantially free to engage with other objects, such as holding a cup or carrying a bag, while simultaneously enabling the user to maintain a secure grip on the mobile device. In another example engaging operation, the user may engage one or more fingers of the user's hand through one or more of the extended supports and also simultaneously engage one or more fingers with one or both of an interior and exterior perimetric face of one or more of the cap, the base, and the mobile device, as shown in FIG. 8C. In this type of engagement, the user is able to maintain a secure hold of the mobile device while dynamically adjusting the position of the user's hand with respect to the mobile device, optimizing the distance the user's thumb is able to reach with respect to the exterior perimeters of the mobile device's display.

In a thirteenth rotating operation 10112, the user may rotate one or both of the base and the mobile device around the cap and/or one or more of the supports. For example, the user may engage one or more fingers of the user's hand through one or more of the supports and use another finger or thumb of the user's hand to rotate the mobile device around the axis of rotation with respect to one or both of the cap and the base, as shown in FIG. 8D. This type of engagement allows the user to easily and securely hold the mobile device single-handedly while dynamically manipulating its display orientation. The user may easily manipulate the mobile device between different display orientations by rotating the mobile device in either direction with one or more unengaged fingers. This flexibility provides the user with a high degree of operational dexterity to manipulate the mobile device while enabling the user to maintain a secure grip on the mobile device. For example, the user may have one or more fingers engaged through one or more of the supports with the mobile device positioned in a preferred portrait display orientation to interact with the mobile device's graphical user interface, then rotate the device to a preferred landscape display orientation using one or more fingers of the same or opposite hand to capture a picture or record a video using the mobile device's camera, before rotating the mobile device back to a preferred portrait orientation to further interact with the mobile device's graphical user interface. In another example rotating operation, the user may have one or more fingers of the user's hand engaged through one or more of the supports and then rotate the mobile device and the base around the cap and one or more of the supports using the thumb or one or more fingers of the same or opposite hand. In this way, the accessory may provide the user with kinetic amusement, as it enables the user to simultaneously hold and repeatedly rotate the mobile device around the axis of rotation with respect to the cap.

In a fourteenth retracting operation 10114, the user may retract one or more of the extended supports from a deployed position to a retained position using one or more fingers of the user's hand. In some implementations, the user may press one or more of the extended supports in the direction of retraction using one or more fingers of the user's hand until either the supports are engaged by one or more retaining protrusions disposed in the exterior perimetric face of the cap or until the support is no longer moveable with respect to one of the cap and the base. The user would typically perform this operation when preparing the mobile device and the attached accessory for transport or personal conveyance. In other scenarios, a user may retract one or more extended supports prior to attaching the accessory to one or both of the mount and the mounting structure or before placing the accessory flat on the support surface. In some implementations, such as where one or more of the supports are flexible, the user may apply pressure to the support in a direction opposite the direction of retraction and beyond the position normally arrested by one or more of the cap projections, imparting tension or spring forces in the support which, when released, may be sufficient to cause the support to move in the opposite direction and retract to a retained position. In other implementations, one or more of the supports may be retracted separately or simultaneously via a support retraction mechanism disposed in or attached to the accessory.

Figure 11A:
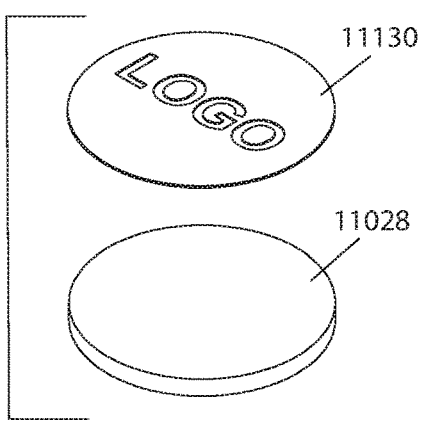
FIG. 11A illustrates a top perspective exploded view of a disc-shaped accessory cover attachable to the top of a plug.
Figure 11D:
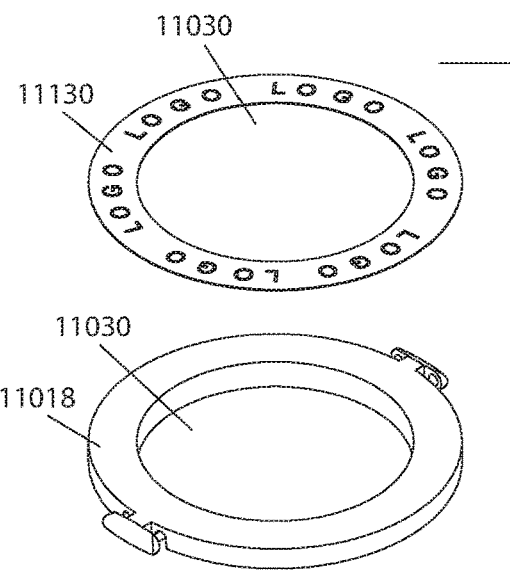
FIG. 11D illustrates a top perspective exploded view of a ring-shaped accessory cover attachable to the top of a cap.
Figure 11B:
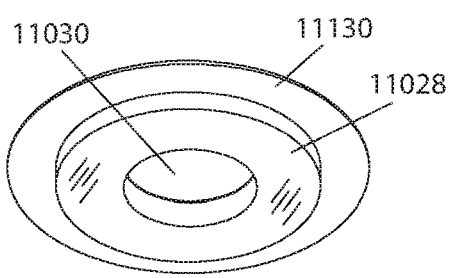
FIG. 11B illustrates a bottom perspective view of a disc-shaped accessory cover attached to the top of a plug.
Figure 11E:
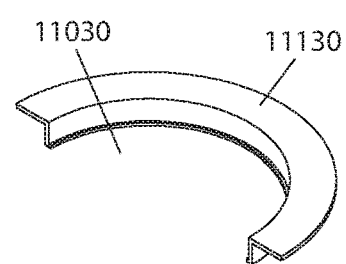
FIG. 11E illustrates a top perspective sectional view of a flanged accessory cover with an aperture disposed in the bottom and a partially enclosed bottom.
Figure 11C:
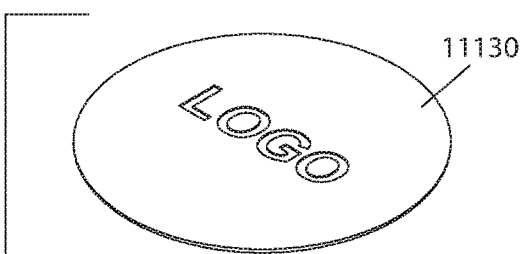
FIG. 11C illustrates a top perspective exploded view of a disc-shaped accessory cover attachable to the top of a cap.
Figure 11F:
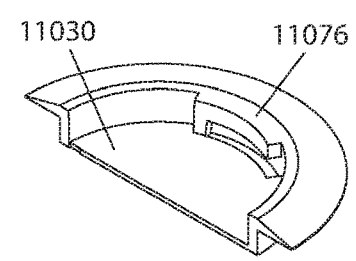
FIG. 11F illustrates a top perspective sectional view of a flanged accessory cover with an aperture disposed in the center and an enclosed bottom.
Figure 11G:
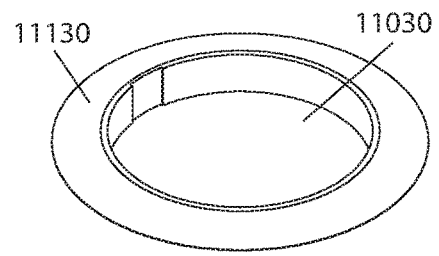
FIG. 11G illustrates a top perspective sectional view of a flanged accessory cover with an aperture disposed in the center and a recess disposed in an interior perimetric face.

FIG. 11A is a top perspective exploded view of a disc-shaped accessory cover 11130 attachable to the top of a plug 11028. FIG. 11B is a bottom perspective view of a disc-shaped accessory cover 11130 attached to the top of a plug 11028. FIG. 11C is a top perspective exploded view of a disc-shaped accessory cover 11130 attachable to the top of a cap 11018. FIG. 11D is a top perspective exploded view of a ring-shaped accessory cover 11130 attachable to the top of a cap 11018. FIG. 11E is a top perspective sectional view of a flanged accessory cover 11130 with an aperture disposed in the center and a partially enclosed bottom. FIG. 11F is a top perspective sectional view of a flanged accessory cover 11130 with an aperture disposed in the center and an enclosed bottom. FIG. 11G is a top perspective sectional view of a flanged accessory cover 11130 with an aperture disposed in the center and a recess disposed in an interior perimetric face.

As illustrated in FIGS. 11A-11G, in some implementations, an accessory cover 11130 may be permanently or detachably attached to an exterior surface of one or more of a cap 11018, a plug 11028, and a base (not shown, e.g., see base 4016 in FIG. 4D). The accessory cover 11130 may be substantially flat and thin. The top of the cover 11130 may be flat, as shown in FIG. 11E or sloped at an angle, as shown in FIG. 11F. The accessory cover 11130 may be disc or ring-shaped. The accessory cover 11130 may have an interior and exterior perimeter generally matching the interior and exterior perimeters of one or more of the cap 11018, the base 11016, and the plug 11028. In some implementations, the accessory cover 11130 extends beyond one or both of the interior or exterior perimetric face of one or more of the cap 11018, the base 11016, and the plug 11028, as shown in FIG. 11B. In other implementations, the accessory cover 11130 is flanged and is configured to cover at least a portion of both the top exterior surface of the cap 11018 and the interior perimetric face of one or both of the cap 11018 and the base 11016, as shown in FIGS. 11E-11G.

In some implementations, the top of one or both of the plug 11028 and the cap 11018 includes a recess configured for receiving and/or engaging a portion of the accessory cover 11130. In some implementations, an aperture 11030 is formed in the center of the accessory cover 11130 and may be of a dimension similar to an aperture 11030 formed in one of the cap 11018, the base 11016, and the plug 11028, as shown in FIGS. 11B and 11D. In some implementations, the aperture 11030 formed in the center of the accessory cover 11130 may extend therethrough. In other implementations, the bottom surface of the accessory cover 11130 is enclosed, as shown in FIG. 11F. In other implementations, the bottom surface of the accessory cover 11130 is partially enclosed, as shown in FIG. 11E. In some implementations, one or more continuous or segmented annular features are disposed around the interior perimetric face of the accessory cover 11130 circumscribing the aperture 11030 and may protect a surface of a mobile device (not shown) from contact with an attachable plug 11028. In other implementations, one or more attachment features and/or attachment elements are disposed in the accessory cover 11130, such as a twist lock first attachment feature 11076 disposed around the interior perimetric face of the accessory cover 11130, as shown in FIG. 11F. In other implementations, one or more recesses disposed in the interior perimetric face of the accessory cover 11130 may be configured to receive a portion of one or both of a lateral projection disposed in an outer surface of the plug 11028 and a plug removal feature (e.g. see 6074 in FIG. 6A).

In some implementations, the accessory cover 11130 has one of an adhesive or nano-suction pad disposed on one or more surfaces configured for attachment to one of the base 11016, the cap 11018, and the plug 11028. In other implementations, the accessory cover 11130 attaches to one of the cap 11018 and the base 11016 by a friction or interference fit. In some implementations, the accessory cover 11130 is magnetic and may attach to one of the plug 11028, the base 11016, and the cap 11028 magnetically. The accessory cover 11130 may be rigid or flexible. The accessory cover 11130 may be made of plastic, vinyl, paper, rubber, silicone, wood, metal, carbon fiber, or other composite material. In some implementations, the accessory cover 11130 includes one or more proud or recessed ornamental design features. In some implementations, the accessory cover is a sticker. Indicia, such as a name, logo, slogan, trademark, or service mark representing one or more of a business, product, or person may be disposed on, across, or around one or more surfaces of the accessory cover 11130.

FIG. 12A is a top perspective view of a plug 12028 configured with a twist lock attachment feature 12078 and an attachment element 12086 disposed in a top interior surface of the plug 12028. FIG. 12B is a top perspective view of a plug 12028 with an attachment feature 12078 configured for attachment to an expandable grip support. FIG. 12C is a top view of a plug 12028 and a cap 12018 with alignment indicators 12134 disposed on a top surface thereof for aligning an attachment features 12078 disposed in the plug with an attachment feature 12076 disposed in the cap 12018. FIG. 12D is a top perspective view of a plug 12028 with a selectively rotatable center portion configured with different attachment elements 12086, 12088 disposed on opposite faces thereof. FIG. 12E is a top perspective sectional view of a plug 12028 with a selectively attachable and reversible center portion configured with different attachment elements 12086, 12088 disposed on opposite faces thereof. FIG. 12F is a top perspective view of a plug 12028 with a magnetic attachment element 12086 configured with a plug removal feature 12074 and disposed in a recess formed in the bottom an attachment feature 12078. FIG. 12G is a top perspective view of a plug 12028 with two selectively rotatable attachment features 12078, 12080, showing the attachment features in both a retracted position and a retained position. FIG. 12H is a top perspective view of a plug 12028 with a rotatable center portion and an attachment element 12086 disposed therein. FIG. 12I is a top perspective view of a plug 12028 with a threaded attachment feature 12078 and a flanged bottom configured for attachment under a cap 12018. FIG. 12J is a top perspective view of a plug 12028 configured with an attachment hole 12137 and a plug removal feature 12074 and disposed in a plug receptacle 12136.

In various implementations, one or more attachment features (e.g., 12076, 12078, 12080) and/or attachment elements (e.g., 12086, 12088) may be attached to or disposed in or on an interior or exterior surface of one or more components of the accessory such as a plug (e.g., plug 12028) and a cap (e.g., cap 12018). In some implementations, one or more attachment features (e.g., feature 12078) or attachment elements (e.g., element 12086) operate by rotational engagement and may include one or more stops or detents for engaging and/or inhibiting the rotation of one or more other attachment features or attachment elements at one or more predetermined positions, as shown in FIG. 12A. In other implementations, one or more attachment features (e.g., feature 12078) or attachment elements (e.g., element 12088) may be configured for attachment to a second mobile accessory or support such an expandable grip or knob, as shown in FIG. 12B. In some implementations, the plug 12028 includes one or more recesses disposed in one or both of the top and bottom of the plug 12028 configured for receiving one or more attachment elements (e.g., elements 12086, 12088), as shown in FIGS. 12A-12B. In some implementations, one or more alignment indicators 12134 may be disposed on one or more surfaces of one or more of a base, the cap 12018, the plug 12028, a mount, and a mounting structure, and may aid the user in aligning one or more attachment features (e.g., feature 12078) with respect to one or more other attachment features (e.g., feature 12076), as shown in FIG. 12C.

In some implementations, two or more attachment features (e.g., features 12078, 12080) and/or attachment elements (e.g., elements 12086, 12088) are disposed in the plug 12028, as shown in FIGS. 12D and 12G. In some implementations, two or more attachment elements (e.g., 12086, 12088) are attached to the plug 12028 and may be disposed on the same side or on opposite sides of the plug 12028. As shown in FIGS. 12D-12E, the plug 12028 may include two or more attachment features and/or attachment elements (e.g., elements 12086, 12088) disposed on one or more faces of a detachably attachable or selectively rotatable center portion. This configuration provides the user with the ability to selectively attach the plug 12028 to different types of mounts and mounting structures. In other implementations, one or more attachment elements (e.g., element 12086) may include a substantially rigid or substantially flexible removal feature (e.g., feature 12074), which may enable the user to detach one or both of the attachment element 12086 and the plug 12028 from another accessory component, as shown in FIG. 12F.

As shown in FIG. 12G, in other implementations, one or more attachment features (e.g., features 12078, 12080) or attachment elements may articulate, rotate, or extend outward from a retracted position to a deployed position, providing a mechanism for attaching one or more accessory components such as the plug 12028 to another accessory component or to one or both of the mount and the mounting structure, such as a vehicle air vent. In other implementations, the plug 12028 includes a rotatable center portion with an attachment element (e.g., element 12086) disposed on a top surface thereof, the center portion of the plug 12028 configured to freely rotate with respect to a fixed outer plug portion and enabling a second mobile accessory or support attached to the rotatable attachment element 12086, such as an expandable grip, to freely rotate, as shown in FIG. 12H. In other implementations, one or more attachment features (e.g., feature 12078) or attachment elements may include one or more threaded fasteners, as shown in FIG. 12I. In some implementations, the plug 12028 includes a continuous or segmented flange extending radially outward from the bottom exterior perimeter of the plug 12028, as shown in FIG. 12I. The flange 12135 may be disposed underneath a portion of the cap 12018 such as a first annular cap protrusion, wherein movement of both the flange 12135 and the plug 12028 may be longitudinally restricted and whereby the plug 12028 may be secured to the cap 12028.

In other implementations, one or more plugs 12028 may be disposed in a plug receptacle (e.g., receptacle 12136), as shown in FIG. 12J. The top of the plug receptacle 12136 may include a recess configured for receiving the plug 12028 and removal feature 12074 attached thereto, and a bottom surface configured for attachment to a mobile device housing, case, or cover thereof. The plug receptacle 12136 and the accessory may be concurrently attached to a surface of the mobile device housing, case, or cover thereof. One or more plugs 12028 may be interchangeably attached and detached from the plug receptacle 12136 and the accessory, facilitating simultaneous attachment of multiple plugs to the mobile device housing, case, or cover thereof, and enabling a user to selectively adapt the accessory with the plug 12028 that best suits a particular application. One or more attachment holes 12137 disposed in one or both of the plug 12028 and the plug receptacle 12136 and extending therethrough may be configured for attachment to another object, such as a key ring or a lanyard.

FIG. 13A is a top perspective view of a plug 13028 configured with an extendable and retractable knife and bottle opener. FIG. 13B is a top perspective view of a plug 13028 configured with a rotatably extendable and retractable bottle opener and box cutter. FIG. 13C is a top perspective view of a plug 13028 container configured with a hinged lid and a magnetic closure. FIG. 13D is a top perspective view of a plug 13028 configured with a rotatably extendable and retractable key.

In various implementations, one or more plugs 13028 include one or more features or components for accessorizing a mobile device or for providing additional utility to a user. In some implementations, the plug 13028 includes an extendable or rotatable tool such as a knife or bottle opener as shown in FIGS. 13A-13B. In some implementations, the plug 13028 includes one or more features for locking one or more extendable plug components in an extended or retracted position. In other implementations, the plug 13028 comprises a container with a lid that is hinged, rotatable, or removable, the container including one or more recesses configured for receiving and retaining one or more objects a user may find desirable to convey with a mobile device such as hearing aid batteries, breath mints, a pair of earbuds, or lip balm, as shown in FIG. 13C. In some implementations, the plug 13028 includes other linearly or rotatably extendable and retractable implements or tools, such as a key, as shown in FIG. 13D.

The aforementioned plugs 13028 are just a representational sample of the types of accessories that may be included in one or more plugs 13028. Other examples of accessories that may be disposed in or attached to one or more plugs 13028 include, but are not limited to: tools such as knives, wrenches, screw drivers, pliers, tape measures, scissors, box cutters, wire strippers, letter openers, keys, smoking pipes, cigar cutters, lighters, fire starters, hand crank chargers, compasses, whistles, writing pads, writing instruments, personal care items such as makeup applicators, tweezers, nail files, mirrors, electronic accessories such as LED lights, laser pointers, flash storage devices, memory cards, hard drives, clocks, cameras, camera flashes, adapters, cable interfaces, connector interfaces, projectors, printers, identification tags, authorization devices, vaporizers, batteries, speakers, headphones, geo-spatial location tags, radios, microphones, Bluetooth devices, wi-fi enabled devices, cellular radio enabled devices, scanners, smart watches, smart watch connectors, hearing aids, augmented reality glasses, lamps, fans, control devices such as remote controls, game controllers, keyboards, robotic mechanisms, programmable function controllers, camera shutter controllers, computer input control devices, computer peripherals, headset control devices, sensors such as motion sensors, altimeters, barometers, wind direction sensors, weather sensors, spectrometers, chemical sensors, particulate sensors, oxygen monitors, pulse oximeters, glucose monitors, infrared fat monitors, pressure sensors, weight sensors, electrophysiology sensors, hygrometer, thermometer, electrocardiography sensors, health monitors, heart rate monitors, breathalyzers, breath monitors, vibrators, massage paddles, recording devices such as audio recording devices, video recording devices, image recording devices, optical devices such as camera lenses, magnifying glasses, monocles, bifocals, prisms, periscopes, containers for containing and dispensing things such as makeup, moisturizer, lip balm, liquid, perfume, hand sanitizer, viral testing kits, aromatherapy pods, cleaning pads, condoms, breath mints, gum, pills, earbuds, headphones, hearing aid batteries, dental floss, guitar picks, ball markers, toys and games such as tops, mazes, fidget toys, spinners, gyroscopes, drones, musical instruments, mounts such as surface attachment mechanisms, magnetic mounts, suction cup mounts, nano suction pad mounts, wall mounts, vehicle mounts, bike mounts, armband mounts, wristband mounts, headband mounts, and attachment supports such as straps, loops, bands, grips, extendable socket grips, kickstands, clips, tri-pods, extendable selfie sticks, lanyards, and keyrings, among many others.

Figure 14A:
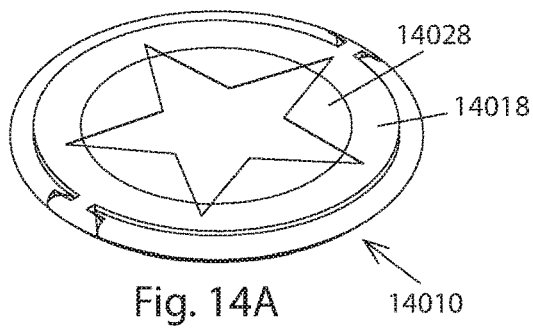
FIG. 14A illustrates a top perspective view of an example accessory with a plug and a cap each configured with corresponding design elements.
Figure 14B:
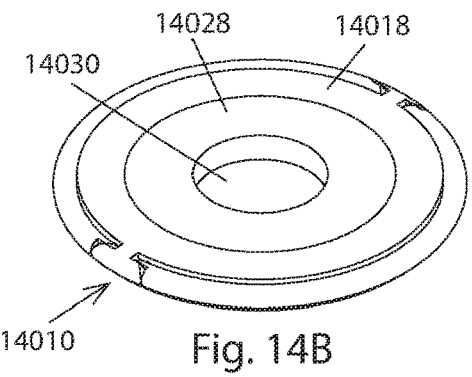
FIG. 14B illustrates a top perspective view of an example accessory with a circular aperture disposed in the center of a plug.
Figure 14C:
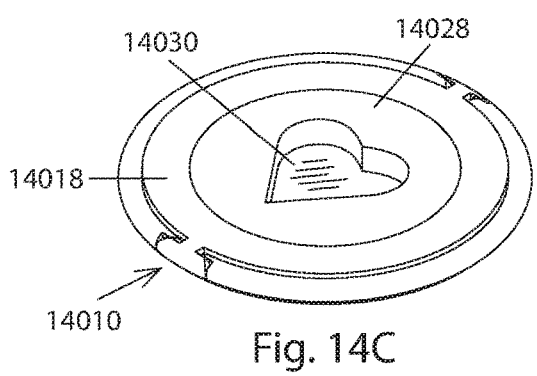
FIG. 14C illustrates a top perspective view of an example accessory with a heart-shaped aperture disposed in the center of a plug.
Figure 14D:
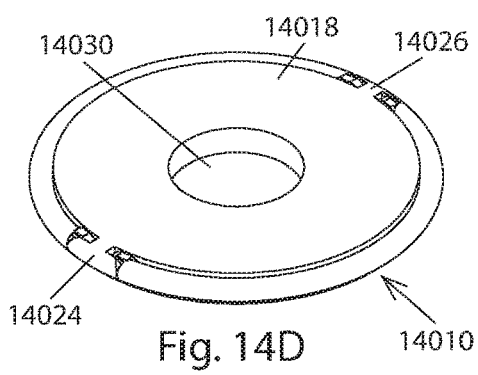
FIG. 14D illustrates a top perspective view of an annular-shaped example accessory with an aperture disposed in the center of the accessory.
Figure 14E:
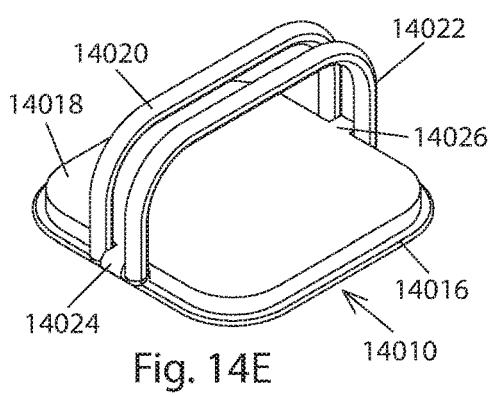
FIG. 14E illustrates a top perspective view of a substantially square-shaped example accessory.
Figure 14F:
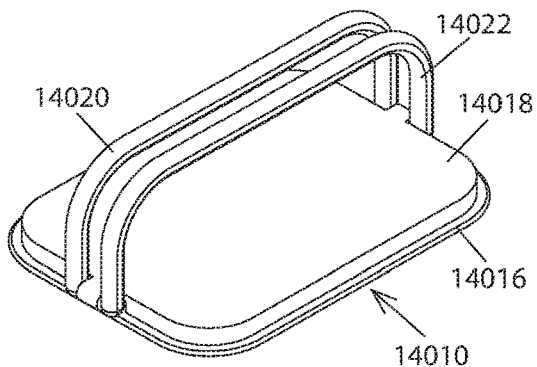
FIG. 14F illustrates a top perspective view of a substantially rectangular-shaped example accessory.
Figure 14G:
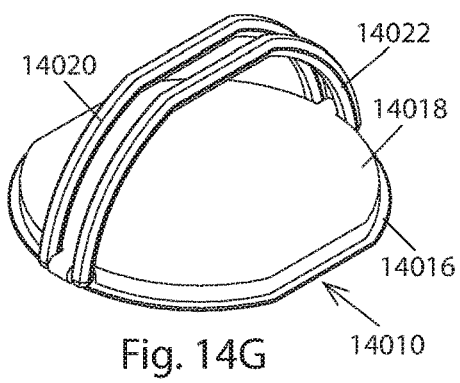
FIG. 14G illustrates a top perspective view of a substantially circular-shaped example accessory with two flat sides disposed opposite one another.
Figure 14H:
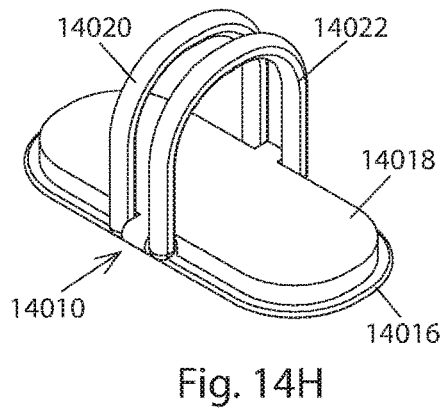
FIG. 14H illustrates a top perspective view of a substantially oblong-shaped example accessory.
Figure 14I:
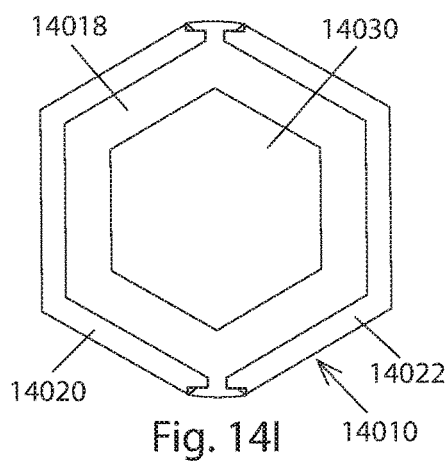
FIG. 14I illustrates a top perspective view of a substantially hexagonal-shaped example accessory.
Figure 14J:
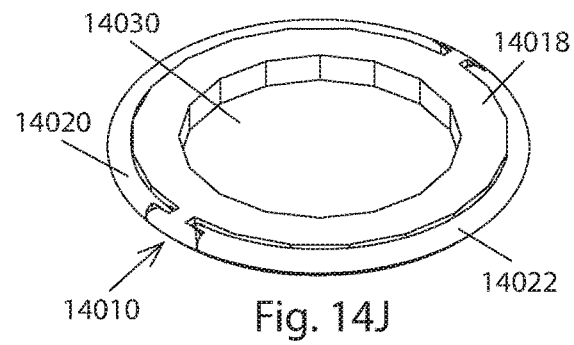
FIG. 14J illustrates a top perspective view of an example accessory including a substantially polygonal-shaped cap.
Figure 14K:
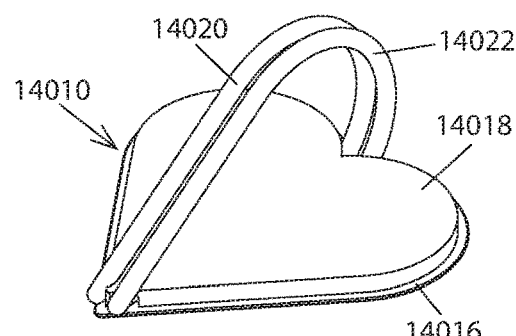
FIG. 14K illustrates a top perspective view of a substantially heart-shaped example accessory.
Figure 14L:
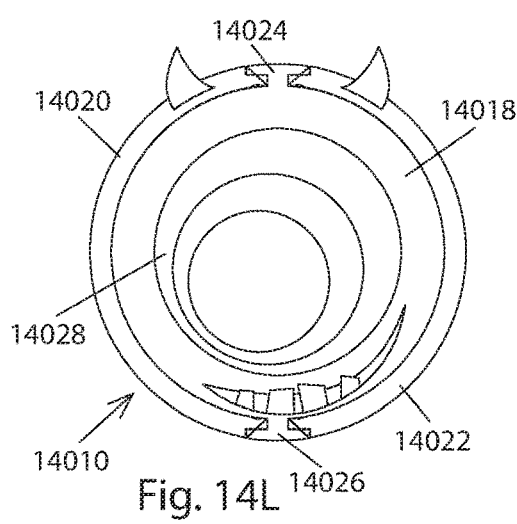
FIG. 14L illustrates a top view of an example accessory with a shape and ornamentation depicting a fictional creature.

FIG. 14A is a top perspective view of an example accessory 14010 including a plug 14028 and a cap 14018 configured with corresponding design elements. FIG. 14B is a top perspective view of an example accessory 14010 with a circular aperture 14030 disposed in the center of a plug 14028 and extending therethrough. FIG. 14C is a top perspective view of an example accessory 14010 with a heart-shaped aperture 14030 disposed in the center of a plug 14028. FIG. 14D is a top perspective view of an annular-shaped example accessory with an aperture 14030 disposed in the center of a cap 14028. FIG. 14E is a top perspective view of a substantially square-shaped example accessory 14010. FIG. 14F is a top perspective view of a substantially rectangular-shaped example accessory 14010. FIG. 14G is a top perspective view of a substantially circular-shaped example accessory 14010 with two flat sides disposed opposite one another. FIG. 14H is a top perspective view of a substantially oblong-shaped example accessory 14010. FIG. 14I is a top perspective view of a substantially hexagonal-shaped example accessory 14010. FIG. 14J is a top perspective view of an example accessory 14010 including a substantially polygonal-shaped cap 14018. FIG. 14K is a top perspective view of a substantially heart-shaped example accessory 14010. FIG. 14L is a top view of an example accessory 14010 with a shape and ornamentation depicting a fictional creature.

In some implementations, corresponding design elements may be disposed in one or both of an interior and exterior surface of a plug 14028 and a cap 14018, as shown in FIG. 14A. One or more apertures 14030 disposed in the accessory 14010 may be one of a variety of different shapes or symbols. For example, circles, stars, and hearts are just three of a variety of different shapes and symbols that may be formed in the accessory 14010, as shown in FIGS. 14A-14D. In some implementations, one or more apertures 14030 disposed in a surface of one or more of a base 14016, the cap 14018, and the plug 14028 may be fully or partially enclosed as shown in FIG. 14C or may extend therethrough, as shown in FIGS. 14B-14D. One or more shapes or symbols disposed in one or both of the plug 14028 and the cap 14018 may be proud or recessed.

One or both of the interior and exterior perimeters of the accessory 14010 may resemble one of a variety of different shapes or symbols. In some implementations, the accessory 14010 has a circular or annular shape that may resemble a real-world object such as a wheel or a donut, as shown in FIG. 14D. In other implementations, the shape of the accessory 14010 is substantially square or rectangular shaped, as shown in FIGS. 14E-14F. In other implementations, the accessory 14010 is substantially circular shaped with two flat sides disposed opposite one another, as shown in FIG. 14G. In some implementations, the accessory 14010 has a shape that is substantially oval or oblong, as shown in FIG. 14H. In other implementations, the accessory 14010 has a shape that is substantially hexagonal, as shown in FIG. 14I. In other implementations, the accessory 14010 has as shape that is substantially triangular, or polygonal.

In some implementations one or more supports (e.g., supports 14020, 14022) has a shape and profile substantially conforming to the shape and profile of one or both of the base 14016 and the cap 14018, as shown in FIGS. 14A-14K. In other implementations, one or both of the cap 14018 and the base 14016 may have an inner or outer perimeter that differs from the inner or outer perimeter of one or more supports (e.g., supports 14020, 14022), as shown in FIG. 14J. One or more corners or edges of the accessory 14010 may be sharp or rounded. In some implementations, the aperture 14030 formed in the center of the accessory 14010 has a shape generally matching the outer perimeter of the accessory 14010. In other implementations, the aperture 14030 may have a shape that is substantially triangular, circular, square, rectangular, or polygonal, as shown in FIG. 14J.

In some implementations, the accessory 14010 has a shape resembling a symbol, logo, emblem, or icon, such as a heart, as shown in FIG. 14K. Other possible accessory 14010 shapes may be representations that include, but are not limited to: flowers, plants, human forms, heads, sporting equipment, imaginary creatures, fictional characters, cartoon figures, animals, fish, insects, birds, vegetables, fruits, and vehicles, among others. In various implementations, one or more features or shapes extend laterally or protrude longitudinally from one or more of the base 14016, the cap 14018, the plug 14028, the projections 14024, 14026, and the supports 14020, 14022, and may provide additional functionality or ornamentation to the accessory 14010, as shown in FIG. 14L. In some implementations, the accessory includes corresponding design elements disposed in two or more of the base 14016, the cap 14018, the plug 14028, the projections 14024, 14026, and the supports 14020, 14022, as shown in FIG. 14L.

Figure 15A:
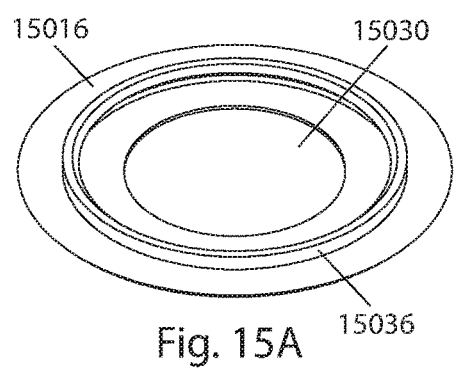
FIG. 15A illustrates a top perspective view of a base with a partially enclosed bottom center portion.
Figure 15C:
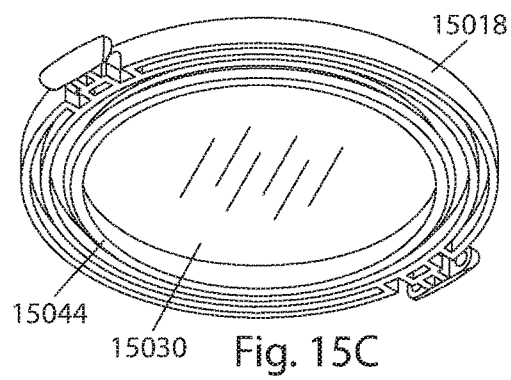
FIG. 15C illustrates a bottom perspective view of a cap with an enclosed top center portion.
Figure 15B:
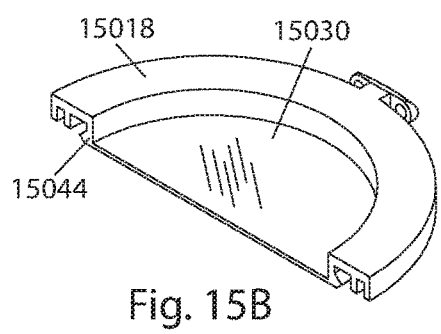
FIG. 15B illustrates a top perspective sectional view of a cap with an enclosed bottom center portion.
Figure 15D:
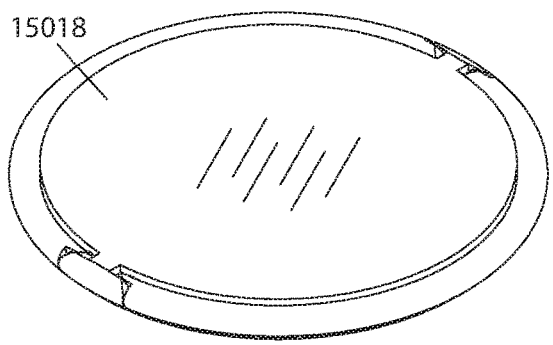
FIG. 15D illustrates a top perspective view of a cap with an enclosed top.
Figure 15E:
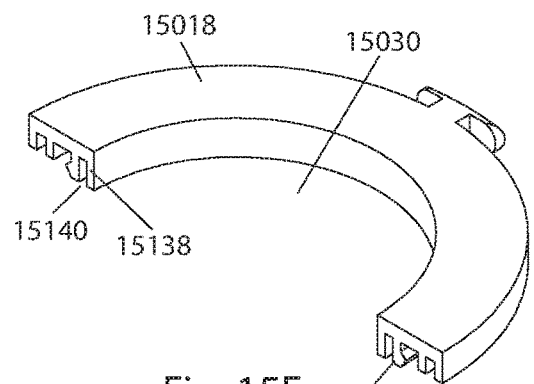
FIG. 15E illustrates a top perspective sectional view of a cap with a fourth annular cap protrusion.
Figure 15F:
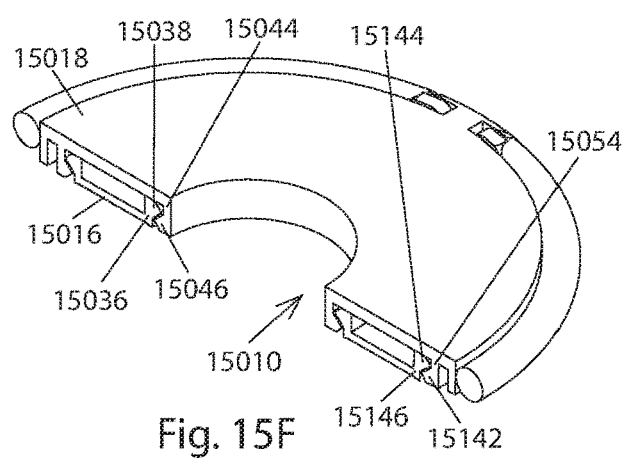
FIG. 15F illustrates a top perspective sectional view of an example accessory with a base and a cap configured with a pair of corresponding engagement features.

FIG. 15A is a top perspective view of a base 15016 with a bottom portion extending radially inward and outward from a first annular base protrusion 15036 and an aperture 15030 formed in the center of the base 15016. FIG. 15B is a top perspective sectional view of a cap 15018 with an enclosed bottom center portion extending radially inward from a first annular cap protrusion 15044. FIG. 15C is a bottom perspective view of a cap 15018 with an enclosed top center portion extending inward from a first annular cap protrusion 15044. FIG. 15D is a top perspective view of a cap 15018 with an enclosed top center portion. FIG. 15E is a top perspective sectional view of a cap 15018 with a fourth annular cap protrusion 15138. FIG. 15F is a top perspective sectional view of an example accessory 15010 with a base 15016 and a cap 15018, each configured with a pair of corresponding engagement features 15038, 15144, and 15046, 15142.

In some implementations, the bottom of a base (e.g., base 15016) extends radially inward from a first annular base protrusion 15036 and may fully or partially enclose the center of the base 15016, as shown in FIG. 15A. In other implementations, the bottom of the base 15016 extends inward from the first annular base protrusion 15036 and the flanged portion extending outward from the first annular base protrusion 15036 is omitted. In some implementations, a portion of a cap (e.g., cap 15018) extends radially inward from the bottom of the first annular cap protrusion 15044 and fully or partially encloses the bottom center portion of the cap 15018, as shown in FIG. 15B. In other implementations, a portion of the cap 15018 extends radially inward from the top of the first annular cap protrusion 15044 and fully or partially encloses the top center portion of the cap 15018, as shown in FIGS. 15C-15D.

In some implementations, the cap 15018 includes a fourth annular cap protrusion 15138, as shown in FIG. 15E. The fourth annular cap protrusion 15138 may be located interior to the first annular cap protrusion 15044 separated by a third interior cap recess 15140 and may circumscribe an aperture 15030 formed in the center of the cap 15018. The fourth annular cap protrusion 15138 may define the interior perimetric face of the cap 15018 and may be configured for receiving a plug. In some implementations, the cap 15018 extends radially inward from the fourth annular cap protrusion 15138 and may fully or partially enclose the top or bottom center of the cap 15018. In other implementations, the cap 15018 includes only the first and second annular cap protrusions 15044, 15048 and one or both of a third and the fourth annular cap protrusions 15054, 15138 are omitted.

In some implementations, the cap 15018 and the base 15016 include multiple corresponding engagement features 15046, 15142, and 15038, 15144, as shown in FIG. 15F. In some implementations, the cap 15018 may include a first cap engagement feature 15046 disposed on a first annular cap protrusion 15044 and a second cap engagement feature 15142 disposed on a third annular cap protrusion 15054. The base 15016 may include a first base engagement feature 15038 disposed on a first annular base protrusion 15036 and a second base engagement feature 15144 disposed on a second annular base protrusion 15146, as shown in FIG. 15F. In some implementations, one or more attachment elements are disposed on top of the base 15016 around the first base protrusion 15038 or in between the first and second annular base protrusions 15036, 15146.

Figure 16B:
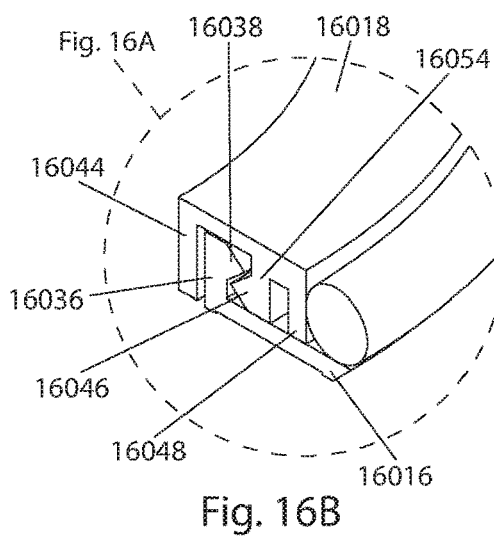
FIG. 16B illustrates an enlarged sectional view of FIG. 16A.
Figure 16A:
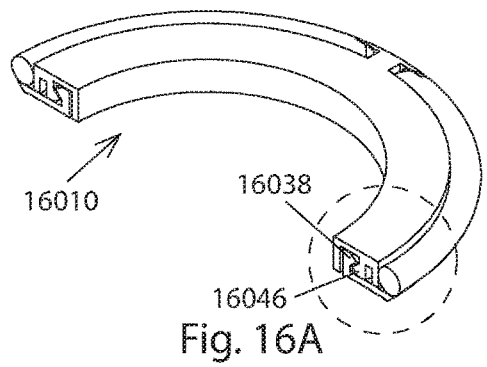
FIG. 16A illustrates a top perspective sectional view of an example accessory with an outward extending base engagement feature and inward extending cap engagement feature.
Figure 16C:
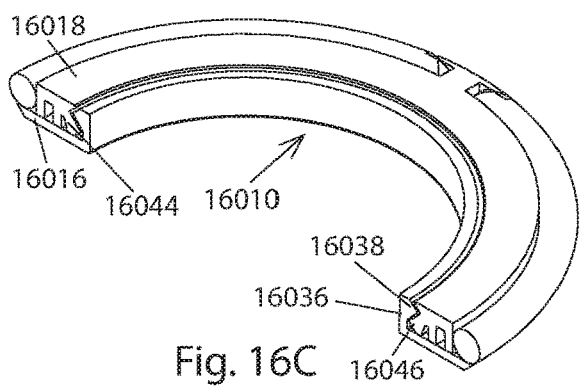
FIG. 16C illustrates a top perspective sectional view of an example accessory with an outward extending base engagement feature and inward extending cap engagement feature.
Figure 16E:
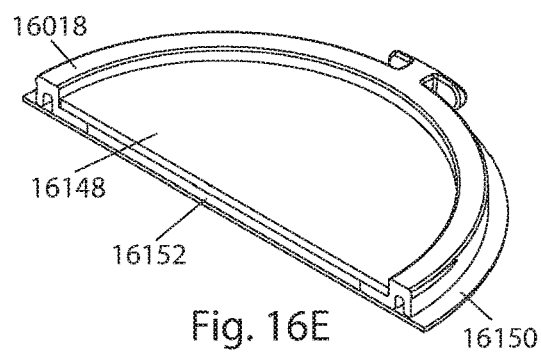
FIG. 16E illustrates a top perspective sectional view of an example accessory with three base components.
Figure 16D:
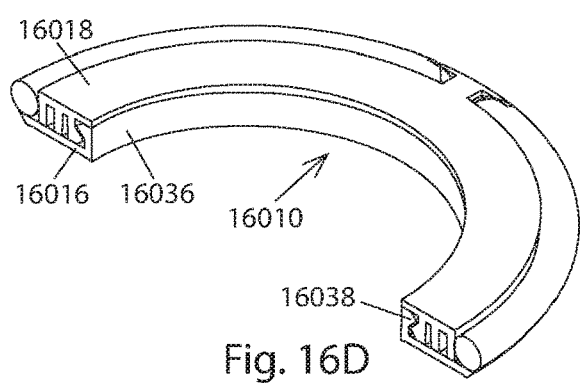
FIG. 16D illustrates a top perspective sectional view of an example accessory with a cap extending over an annular base protrusion.
Figure 16F:
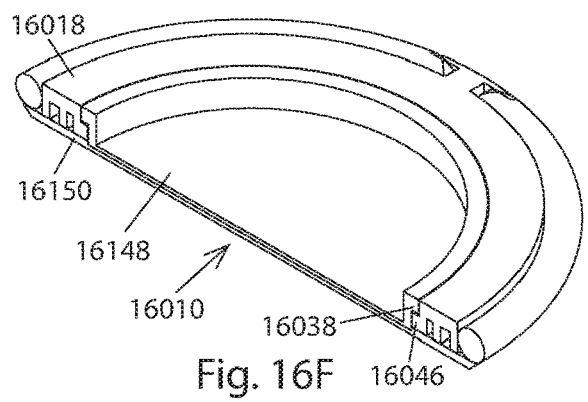
FIG. 16F illustrates a top perspective sectional view of an example accessory with two base components.

FIG. 16A is a top perspective sectional view of an example accessory 16010 with an outward extending base engagement feature 16038 and an inward extending cap engagement feature 16046. FIG. 16B is an enlarged sectional view of FIG. 16A showing an outward extending base engagement feature 16038 disposed on an exterior face of a first annular base protrusion 16036 and an inward extending cap engagement feature 16046 disposed on an interior face of a third annular cap protrusion 16054. FIG. 16C is a top perspective sectional view of an example accessory 16010 with an outward extending base engagement feature 16038 disposed on an exterior face of a first annular base protrusion 16036 and an inward extending cap engagement feature 16046 disposed on an interior face of a first annular cap protrusion 16044. FIG. 16D is a top perspective sectional view of an example accessory 16010 with a top interior portion of a cap extending inward over a first annular base protrusion 16036. FIG. 16E is a top perspective sectional view of an example accessory 16010 with three base components 16148, 16150, 16152. FIG. 16F is a top perspective sectional view of an example accessory 16010 with two base components 16148, 16150. FIG. 16G is a top perspective assembly view of an example accessory 16010 with two base components 16148, 16150 and an accessory cover 16130 attached to a cap 16018. FIG. 16H is a top perspective view of an example accessory 16010 with two cap components 16154, 16156 and two base components 16148, 16150 (not shown). FIG. 16I is a top perspective sectional view of FIG. 16H. FIG. 16J is a top perspective assembly view of FIG. 16H.

As shown in FIGS. 16A-16B, in some implementations, a first base engagement feature 16038 extends radially outward from an exterior face of a first annular base protrusion 16036 and is configured to engage with a first cap engagement feature 16046 extending radially inward from an interior face of a third annular cap protrusion 16054. In other implementations, the first base engagement feature 16038 extends radially outward from an exterior face of the first annular base protrusion 16036 and is configured to engage with the first cap engagement feature 16046 extending radially inward from an interior face of the second annular cap protrusion 16048 (e.g., see FIGS. 19K-19L. In other implementations, the first base engagement feature 16038 extends radially outward from a first annular base protrusion 16036 is configured to engage with a first cap engagement feature 16046 extending radially inward from a first annular cap protrusion 16044, as shown in FIG. 16C. In some implementations, an inner portion of a cap 16018 extends radially inward from the first annular cap protrusion 16044 and covers a portion of one or both of the first annular base protrusion 16036 and the first base engagement feature 16038, as shown in FIGS. 16C-16D. In some implementations, the portion of the cap 16018 extending over the first annular base protrusion 16036 may be a separately formed component and permanently or detachably attached to the top of the cap 16018 and may be configured to protect one or both of the first base engagement feature 16038 and the first annular base protrusion 16036 from contact with one or more of a user's fingers.

In various implementations, one or both of the base 16016 and the cap 16018 are constructed of two or more components. Two or more base 16016 and/or cap 16018 components may be attached together via adhesive, mechanical fasteners, hook and loop fasteners, two-part interlocking fastener system, or magnets, or may be welded together. One or more base 16016 and/or cap 16018 components may be made of plastic, metal, wood, carbon fiber, or other composite material. In some implementations, a portion of the cap 16018 is rotatably disposed between a first base component 16148 and a second base component 16150, as shown in FIG. 16E. In other implementations, the first cap engagement feature 16046 is rotatably disposed between the first base engagement feature 16038 and the second base component 16150, as shown in FIG. 16F. In some implementations, a third base component 16152 is disposed between the first and second base components 16148, 16150 and may include one or more magnets or adhesive layers for connecting the first and second base components 16148, 16150 together, as shown in FIG. 16E. In other implementations, the first 16148 and third base 16152 components are combined and form a single body. In some implementations, one or more of the first, second, and third base components 16148, 16150, 16152 are magnetic and are configured to attach to a magnetic attachment interface and/or one or more magnetic attachment elements disposed in the mobile device housing, case, or cover thereof (e.g., see attachment interface 20042 and magnetic elements 20090 in FIGS. 20F-20H. In other implementations, the bottom of the first base component 16148 is disposed in a recess formed in the top of the second base component 16150, as shown in FIG. 16F. In some implementations, the top of the first base component 16148 may be flush with the top of the cap 16018, as shown in FIG. 16G. In other implementations, the top of the first base component 16148 is recessed with respect to the top of the cap 16018, as shown in FIG. 16E. The bottom of the second base component 16150 may be configured to receive an attachment interface for attaching the base 16016 to a surface of a mobile device housing, case, or cover thereof. In some implementations, an accessory cover 16130 is attached to the top surface of the cap 16018 and may cover a portion of the top of the first base component 16148, as shown in FIG. 16G. The accessory cover 16130 may protect the top of the first base component 16148 from contact with one or more of a user's fingers.

As shown in FIGS. 16H-16J, the cap 16018 may also be constructed of two or more component parts. The bottom of a first cap component 16154 may be configured for attachment to the top of a second cap component 16156. One or more supports 16020, 16022 may be rotatably attached to the first cap component 16154. As shown in FIGS. 16J-16I, the first base component 16148 may include a laterally protruding outer flanged portion and a longitudinally protruding inner center portion. An annular protrusion may extend longitudinally from the top of the second base component 16150 and may circumscribe an aperture 16030 disposed in the center of the second base component 16150 and extending therethrough. A recess may be formed in the bottom of the second base component 16150 circumscribing the aperture 16030 and configured to substantially receive the laterally protruding outer flanged portion of the first base component 16148. The longitudinally protruding center portion of the first base component 16148 may be configured to pass through the apertures 16030 disposed in the center of and extending through the second base component 16150 and the second cap component 16156. The top of the first base component 16148 may be configured to attach to the bottom of the first cap component 16154, longitudinally constraining the second base component 16150 and second cap component 16156 between the first base component 16148 and the first cap component 16154. The first and second cap components 16154, 16156 and first base component 16148 may rotate with respect to the second base component 16150, the bottom of the second base component 16150 configured to attach to the mobile device housing, case, or cover thereof via the attachment interface.

One or more cap components 16154, 16156 may have a shape resembling a symbol, logo, emblem, or icon, as shown in FIG. 16H. Corresponding design features may be disposed in one or more of the first and second cap components 16154, 16156, first and second projections 16024, 16026, and first and second supports 16020, 16022, as shown in FIGS. 16H-16J. In some implementations, one or more recesses are formed in the bottom of the first cap component 16154 and configured to receive and engage a corresponding portion of one or both of the first and second projections 16024, 16026.

In other implementations, one of a first and a second base component 16148, 16150 is substantially incorporated into the mobile device housing, case, or cover thereof. In some implementations, the second base component 16150 is substantially incorporated into the mobile device housing, case, or cover thereof, and a recess formed in an interior surface thereof is configured for receiving a portion of a first base component 16148 configured for attachment to one or both of the first and second cap components 16154, 16156.

FIG. 17A is a top perspective view of an example accessory 17010 with a support 17020 attached to a cap 17018 via a pair of fasteners 17158. FIG. 17B is a top view of two supports 17020, 17022 connected together at their distal ends and attached to a cap 17018 via a pair of fasteners (not shown). FIG. 17C is a top perspective assembly view of FIG. 17B.

In some implementations, the accessory includes no supports. In other implementations, the accessory 17010 includes just one support (e.g., support 17020). As shown in FIG. 17A, one or more supports 17020 may be attached to a cap (e.g., cap 17018) via a pair of fasteners 17158. The fasteners 17158 may be disposed in a pair of holes 17160 formed through each end of the support 17020 and in opposite sides of the exterior of the cap 17018, the holes 17160 configured for receiving and/or engaging the fasteners 17158 and the fasteners 17158 limiting the movement of the support 17020 by at least one degree of freedom with respect to the cap 17018. In some implementations, the cap 17018 includes a laterally extending projection 17024 disposed on the exterior of the cap 17018 configured to limit the rotation of the support 17020 at a predetermined angle, as shown in FIG. 17A.

In other implementations, the accessory 17010 includes two or more supports (e.g., supports 17020, 17022) connected together at their distal ends and rotatably attached to the cap 17018 via a pair of fasteners 17158, as shown in FIGS. 17B-17C. A recess disposed in one or more distal ends of one of the supports 17020, 17022 may be configured for receiving a corresponding portion protruding from one or more distal ends of another one of the supports 17020, 17022, as shown in FIGS. 17B-17C. One or more fasteners 17158 selected from the group of fasteners including screws, bolts, rivets, dowels, rods, and pins, and may be configured for permanently or detachably attaching one or more supports 17020, 17022 to the cap 17018, as shown in FIGS. 17A-17C.

Figure 18A:
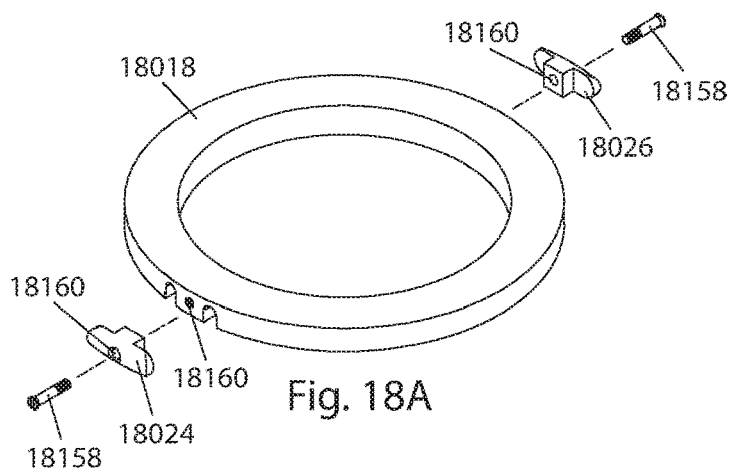
FIG. 18A illustrates a top perspective assembly view of two projections fastened to a cap.
Figure 18B:
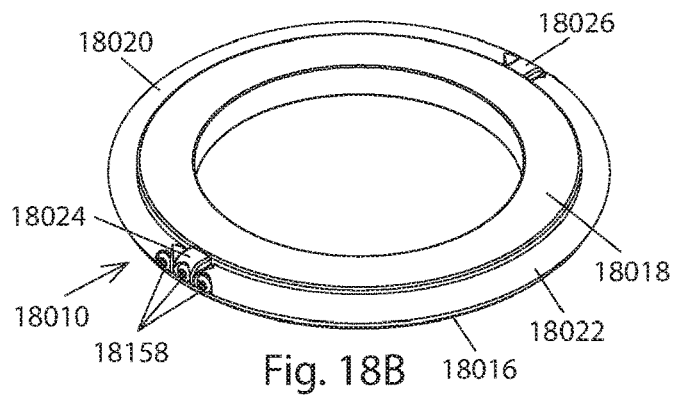
FIG. 18B illustrates a top perspective view of two projections and supports fastened to a cap.
Figure 18C:
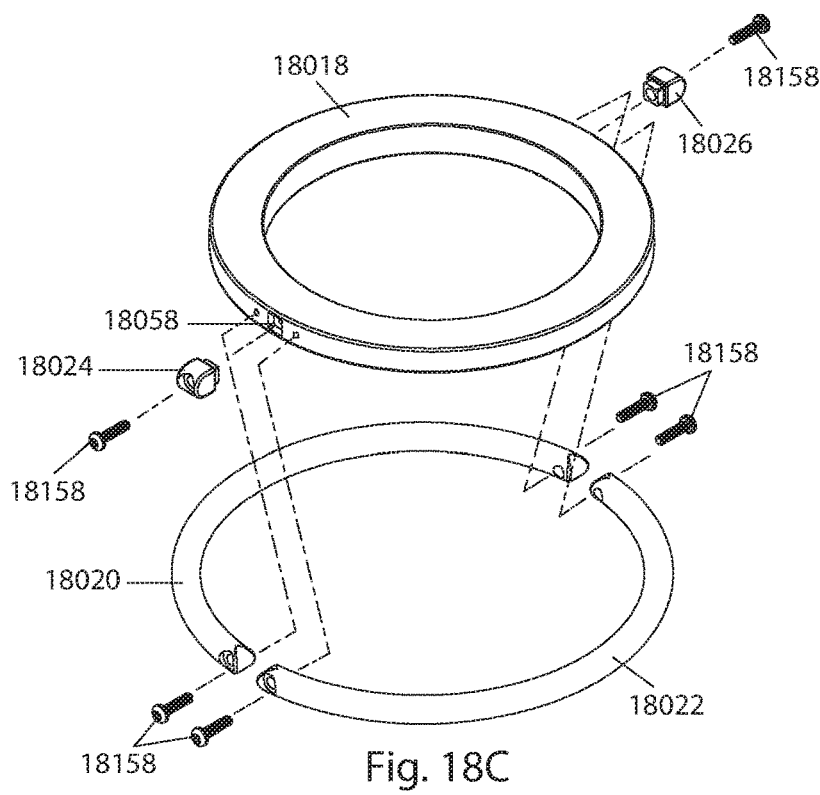
FIG. 18C illustrates a top perspective assembly view of FIG. 18B.
Figure 18D:
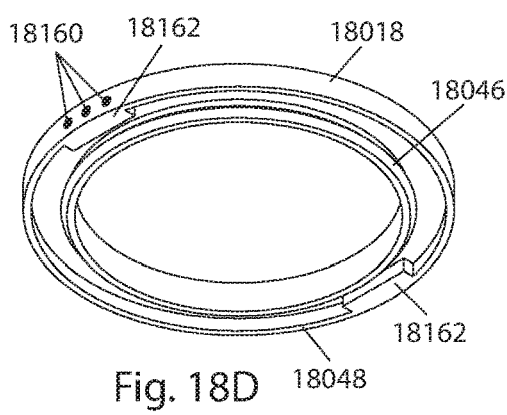
FIG. 18D illustrates a bottom perspective view of a cap configured with multiple exterior cap recesses and fastening blocks.
Figure 18E:
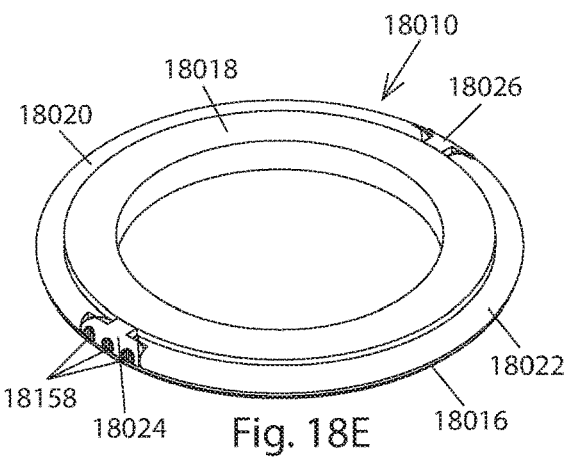
FIG. 18E illustrates a top perspective view of an example accessory with two projections and two supports attached to the cap via multiple fasteners.
Figure 18F:
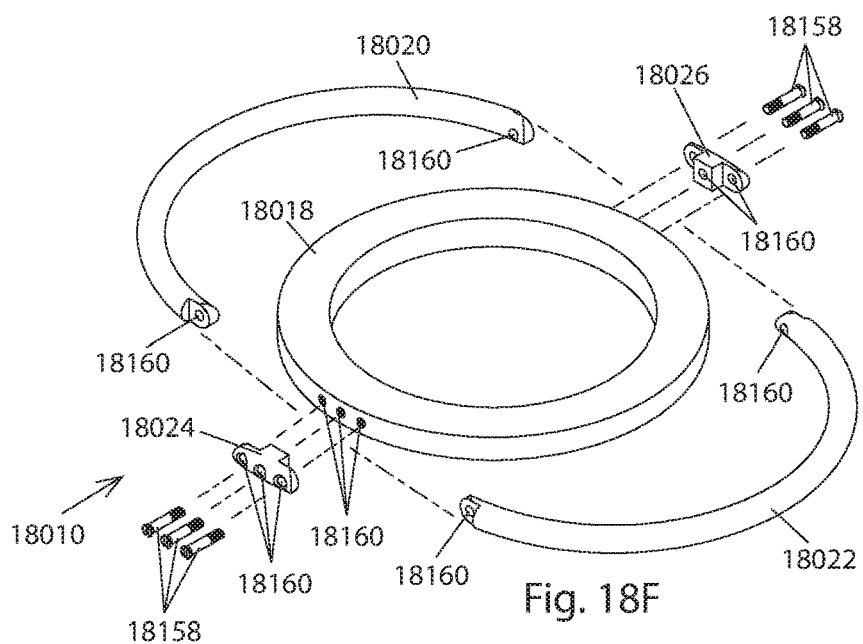
FIG. 18F illustrates a top perspective assembly view FIG. 18E.

FIG. 18A is a top perspective assembly view of two projections 18024, 18026 each attachable to a cap 18018 via a fastener 18158. FIG. 18B is a top perspective view of an example accessory 18010 with two projection 18024, 18026 each attached to a cap 18018 via a fastener 18158 and two supports 18020, 18022 each attached to the cap 18018 via multiple fasteners 18158. FIG. 18C is a top perspective assembly view of two projections 18024, 18026 each attachable to a cap 18018 via a fastener 18158 and a two supports 18020, 18022 each attachable to the cap 18018 via multiple fasteners 18158. FIG. 18D is a bottom perspective view of a cap 18018 with multiple holes 18160 formed in the exterior of the cap 18018 and extending into a fastening block 18162 disposed on the interior of a second annular cap protrusion 18048. FIG. 18E is a top perspective view of an example accessory 18010 with two projections 18024, 18026 and two supports 18020, 18022 attached to a cap 18018 via multiple fasteners 18158. FIG. 18F is a top perspective assembly view two projections 18024, 18026 and two supports 18020, 18022 attached to a cap 18018 via multiple fasteners 18158.

In some implementations, one or more projections (e.g., projections 18024, 18026) are permanently or detachably attached to the exterior of a cap 18018 by one or more fasteners 18158, as shown in FIGS. 18A-18C and FIGS. 18E-18F. In some implementations, one or more supports (e.g., supports 18020, 18022) are permanently or detachably attached to the exterior of the cap 18018 by two or more fasteners 18158, as shown in FIGS. 18B-18C and FIGS. 18E-18F. In various implementations, one or more fasteners 18158 selected from the group of fasteners including screws, bolts, rivets, dowels, rods, and pins, are configured for permanently or detachably attaching one or more supports (e.g., supports 18020, 18022) and/or projections (e.g., projections 18024, 18026) to the cap 18018, as shown in FIGS. 18A-18C and 18E-18F.

In some implementations, one or more holes 18160 formed in the exterior perimetric face of the cap 18018 are configured to receive and/or engage a portion of one or more fasteners 18158 and may include threaded engagement features disposed therein. One or more holes 18160 formed in and extending through one or more projections 18024, 18026 and/or one or more supports 18020, 18022 may be configured to receive and/or engage a portion of the fastener 18158, as shown in FIGS. 18C and 18F. In some implementations, one or more fastening blocks 18162 are disposed on an interior face of a second annular cap protrusion 18048 and configured for receiving a portion of one or more fasteners 18158, as shown in FIG. 18D. One or more holes 18160 formed in the exterior of the cap 18018 may extend through the second annular cap protrusion 18048 and into a portion of the fastening block 18162, wherein one or more fasteners 18158 may be received and engaged. In other implementations, the end of one or more fasteners 18158 attaching one or more supports 18020, 18022 and/or projections 18024, 18026 to the cap 18018 is enlarged and of a size larger than the size of the holes 18160 formed in the supports 18020, 18022 and/or projections 18024, 18026 and configured to limit the lateral movement of one or more supports 18020, 18022 and/or projections 18024, 18026 with respect to the cap 18018, as shown in FIGS. 18C and 18F.

In some implementations, one or more projections (e.g., projections 18024, 18026) are attached to the cap 18018 by a single fastener 18158, as shown in FIGS. 18A-18C. As shown in FIG. 18C, one or more exterior cap recesses 18058 formed in the exterior perimetric face of the cap 18018 may be configured for receiving and engaging a corresponding portion of one of the projections 18024, 18026 protruding from an interior side of the projection, wherein rotational movement of the projection with respect to the cap 18018 may be limited. In other implementations, the projections 18024, 18026 and the supports 18020, 18022 are attached to the cap 18018 by two or more fasteners 18158, as shown in FIGS. 18E-18F. A portion of the fasteners 18158 attaching the supports 18020, 18022 to the cap 18018 may be disposed in corresponding holes 18160 formed in the projections 18024, 18026, as shown in FIGS. 18E-18F.

In some implementations, the distal end of one or more fasteners 18158 attached to the cap 18018 is in contact with a portion of a base 18016, such as a first annular base protrusion, and is configured to enable a user to regulate the amount of rotational friction between the cap 18018 and the base 18016 or to restrict rotational movement of the cap 18018 to or between one or more predetermined positions. In other implementations, one or more fasteners 18158 are configured to regulate the amount of rotational friction between the cap 18018 and one or more attached supports 18020, 18022. In some implementations, one or more fasteners 18158 attached to the cap 18018 extend through one or more annular cap protrusions and are configured to engage with one or more base engagement features, the fasteners 18158 functioning as one or more cap engagement features for rotatably coupling and/or securing the cap 18018 to the base 18016. In other implementations, a distal end of one or more fasteners 18158 may be enlarged and/or include an annular recess disposed therein and configured for engaging an attachable retaining fastener such as a nut, retaining ring, or spring clip, whereby the end of the fastener may be secured to one or more components of the accessory 18010. In some implementations one or more fasteners 18158 may pass through a hole extending lengthwise through the center of one or more support arbors (e.g., see 17068 in FIG. 17A) disposed in the ends of one or more supports 18020, 18022.

Figure 19A:
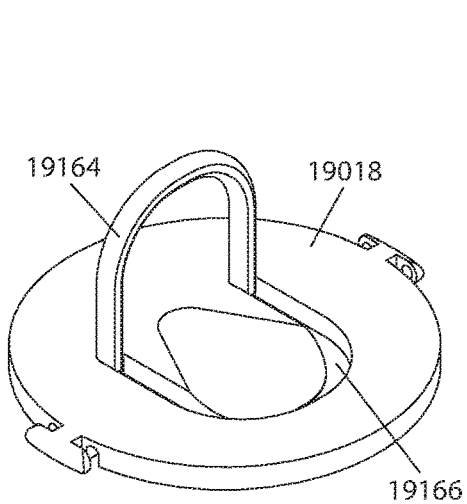
FIG. 19A illustrates a top perspective view of a rigid support attached to a cap.
Figure 19B:
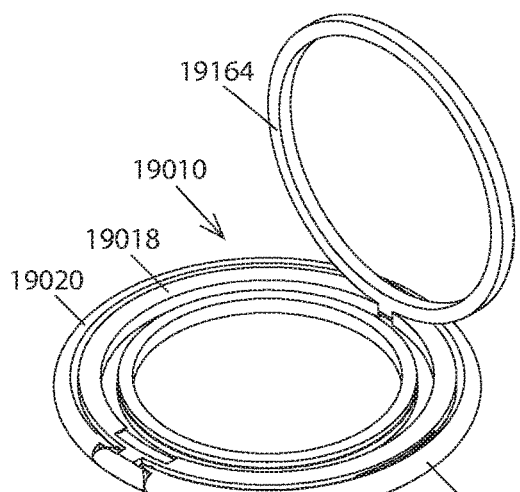
FIG. 19B illustrates a top perspective view of an example accessory with three supports rotatably attached to a cap.
Figure 19D:
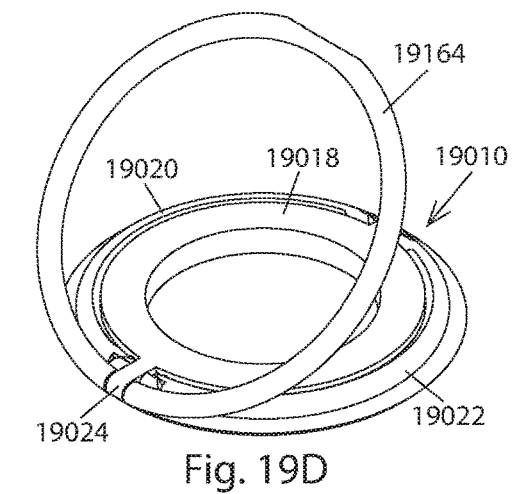
FIG. 19D illustrates a top perspective view of an example accessory with three supports rotatably attached to a cap.
Figure 19C:
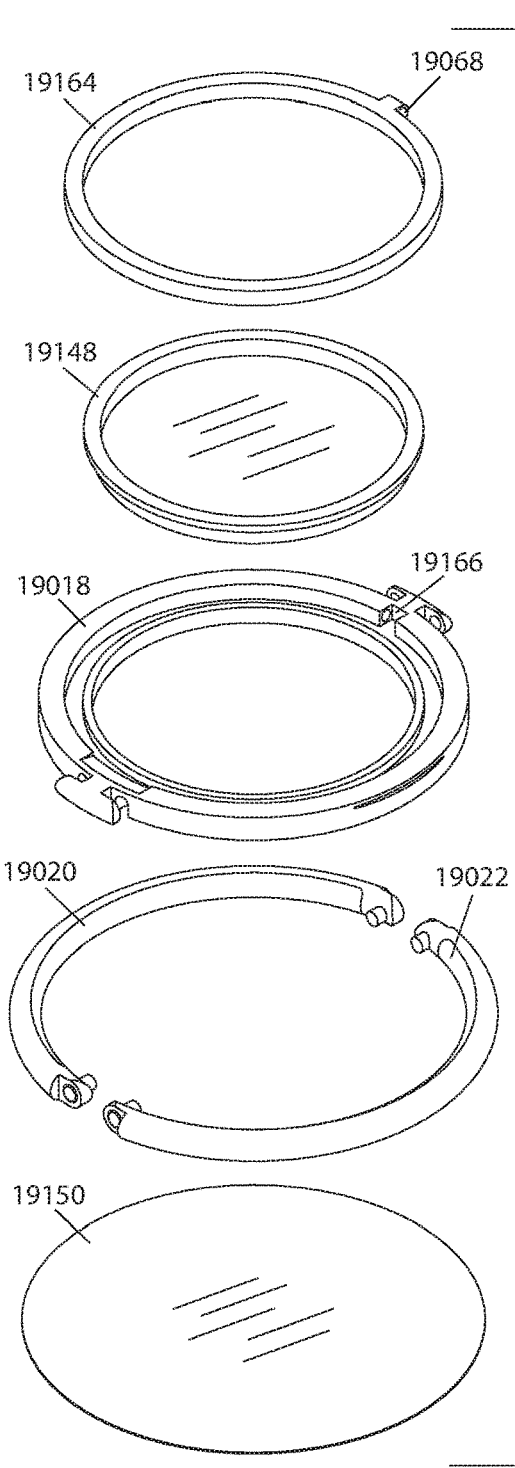
FIG. 19C illustrates a top perspective assembly view of FIG. 19B.
Figure 19E:
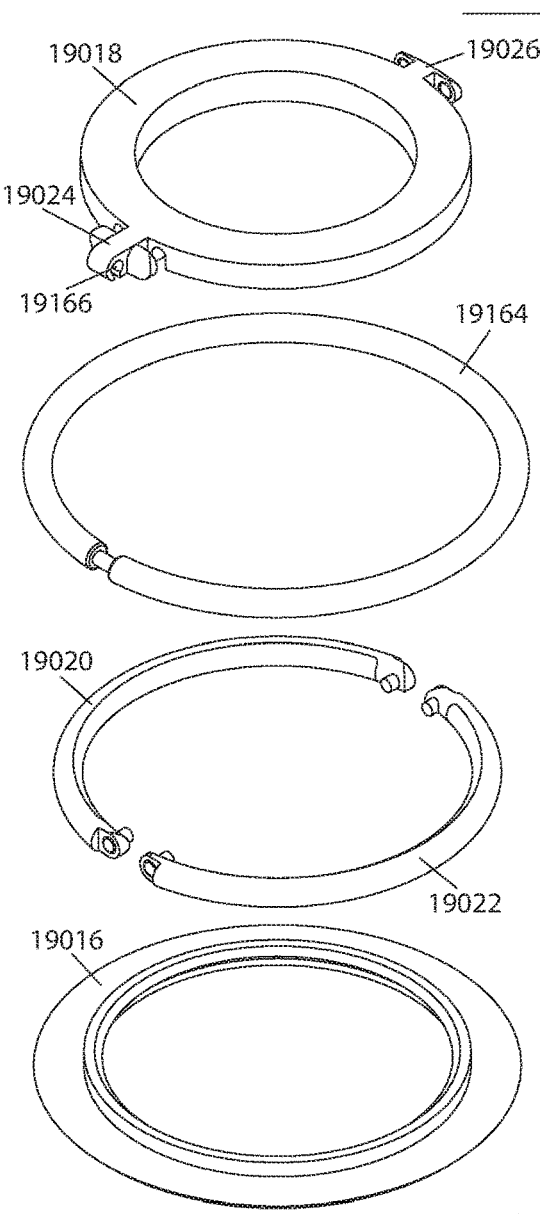
FIG. 19E illustrates a top perspective assembly view of FIG. 19D.
Figure 19F:
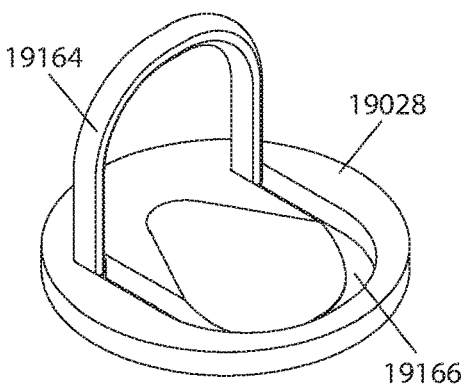
FIG. 19F illustrates a top perspective view of a support rotatably attached to a plug.
Figure 19G:
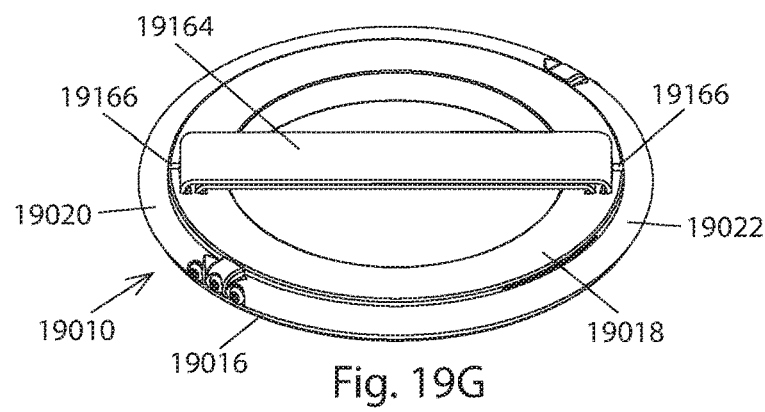
FIG. 19G illustrates a top perspective view of an example accessory with three supports attached to a cap.
Figure 19H:
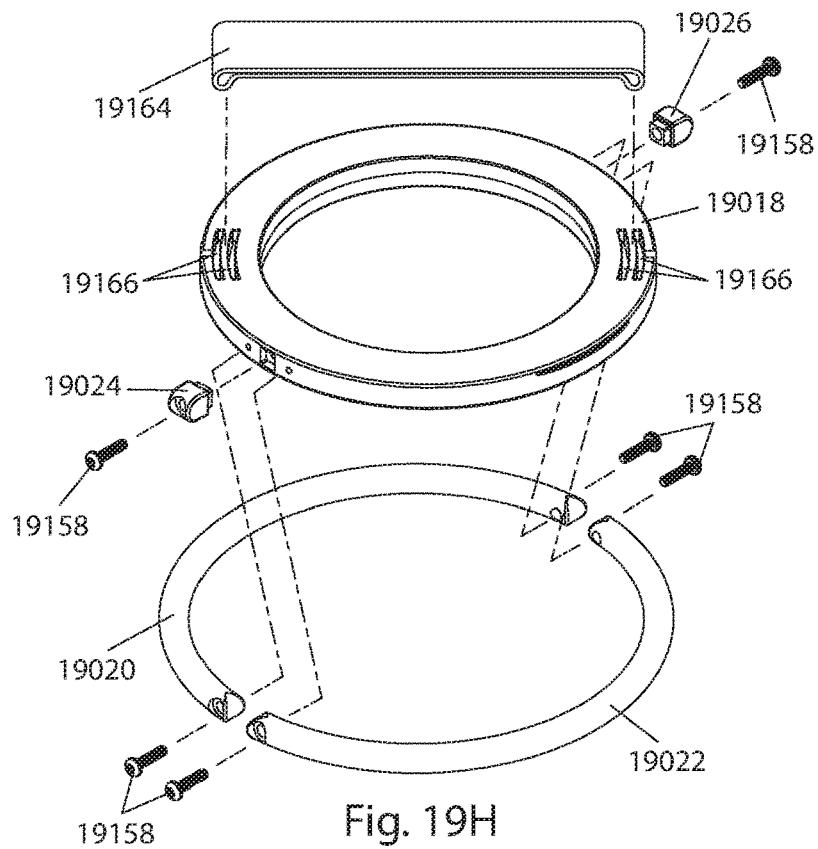
FIG. 19H illustrates a top perspective assembly view of FIG. 19G.
Figure 19I:
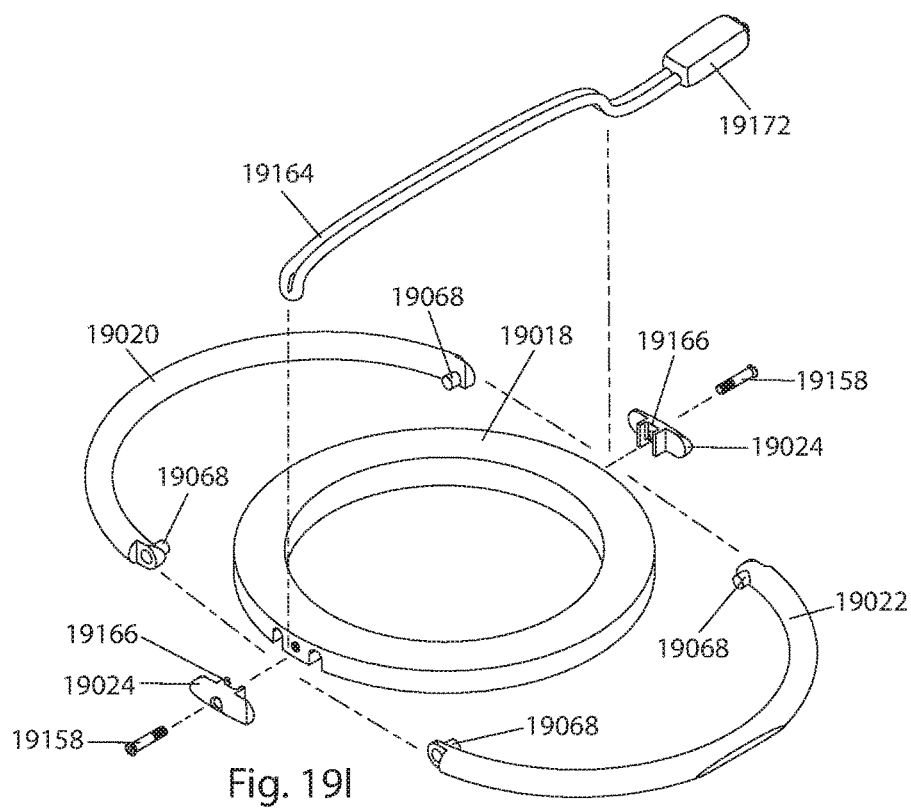
FIG. 19I illustrates a top perspective assembly view of two rigid supports rotatably attached to a cap and a third flexible support configured with an adjustable tensioner and disposed in a pair of projections attached to the cap via fasteners.
Figures 19J, 19K:
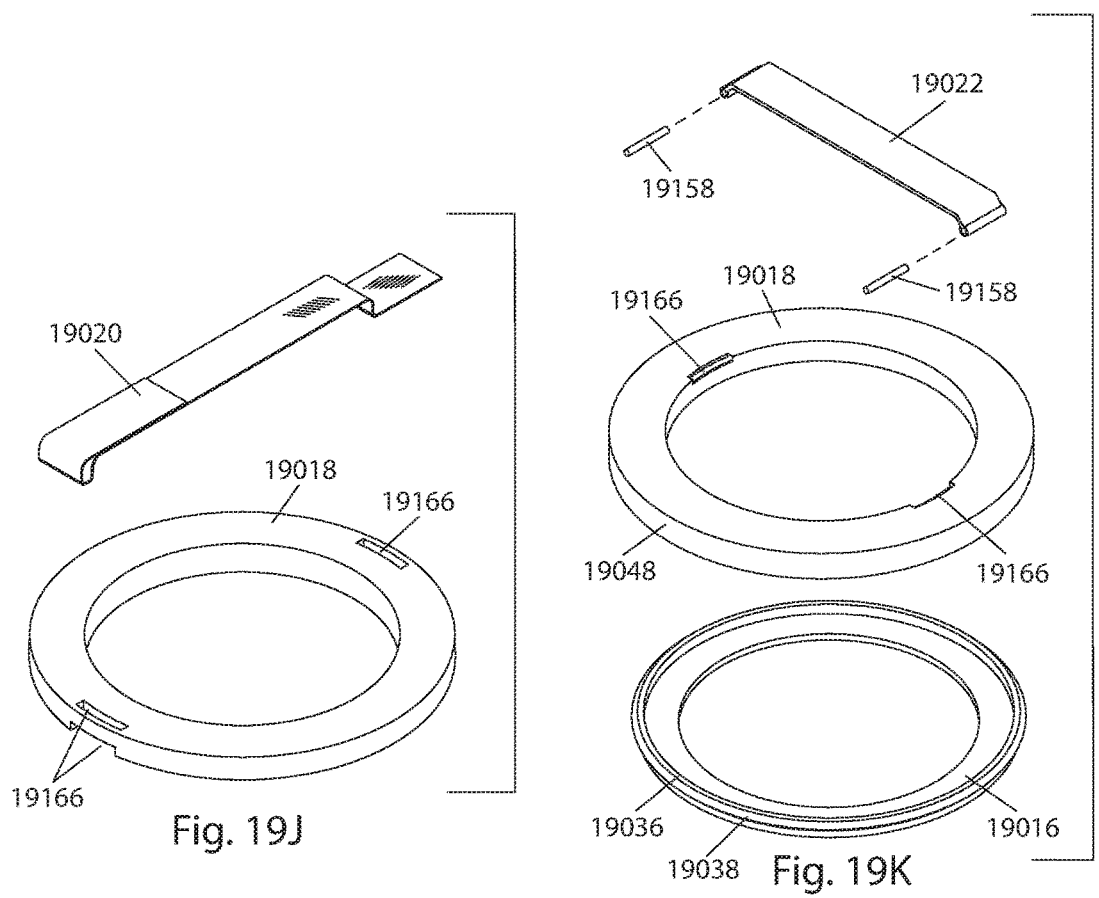
FIG. 19J illustrates a top perspective view of a flexible support configured with a mechanism for self-attachment and attached to a cap through a pair of slots.
FIG. 19K illustrates a top perspective view of a flexible support attached to a cap through a pair of slots and secured via fasteners.
Figure 19L:
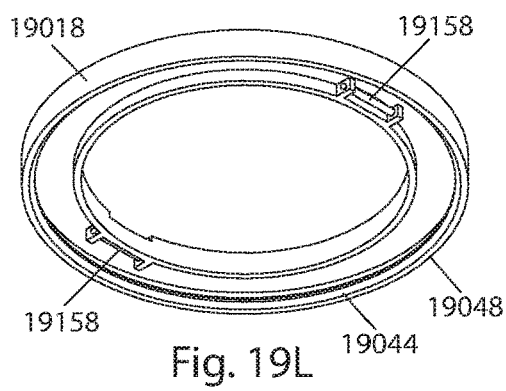
FIG. 19L illustrates a bottom perspective view of a cap with fasteners disposed in opposite ends of the cap and configured for attaching a flexible support.
Figure 19M:
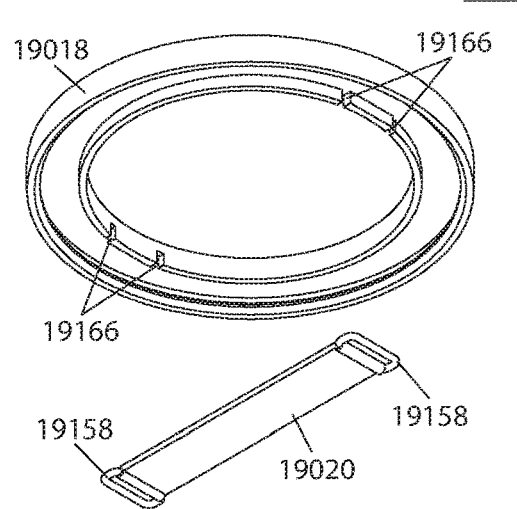
FIG. 19M illustrates a bottom perspective assembly view of a flexible support with a fastener attached at each end and configured for attachment to a cap through a pair of slots.
Figure 19N:
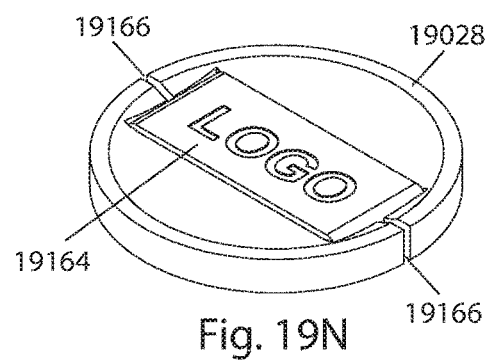
FIG. 19N illustrates a top perspective view of a plug with a flexible support attached to the plug through a pair of recesses disposed in the plug.
Figure 19O:
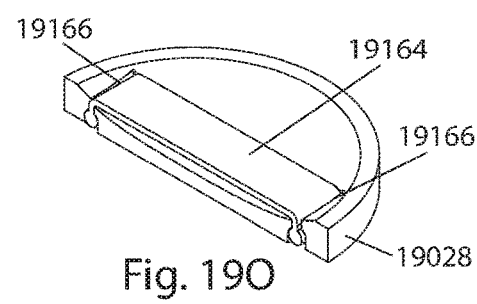
FIG. 19O illustrates a top perspective sectional view of FIG. 19N.
Figure 19Q:
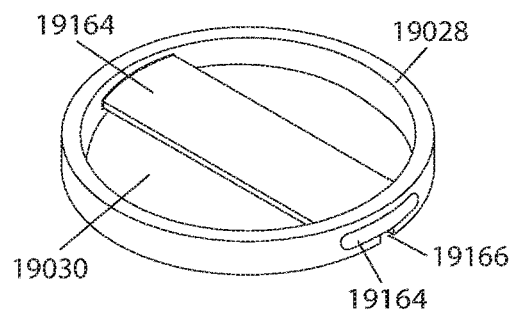
FIG. 19Q illustrates a top perspective view of a plug with enlarged distal ends and disposed in a pair of recesses disposed in the plug.
Figure 19P:
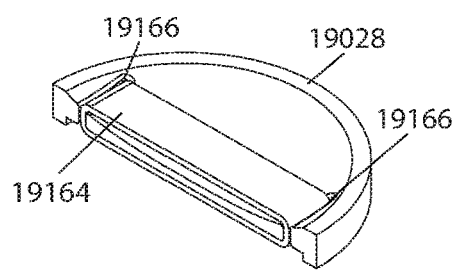
FIG. 19P illustrates a top perspective sectional view of a plug with a flexible support attached through a pair of recesses disposed in the plug.
Figure 19R:
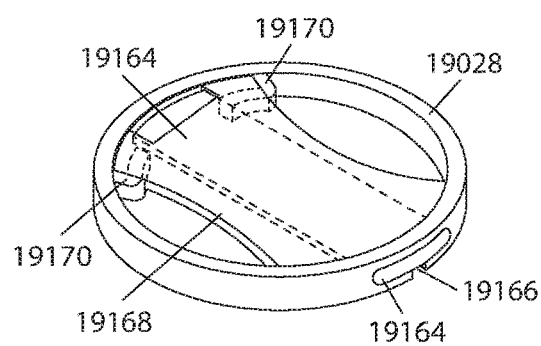
FIG. 19R illustrates a top perspective view of a plug with enlarged distal ends and disposed in a pair of recesses disposed in the plug and a rigid prop attached to the support and configured for engagement with a pair of prop engagement features.
Figure 19S:
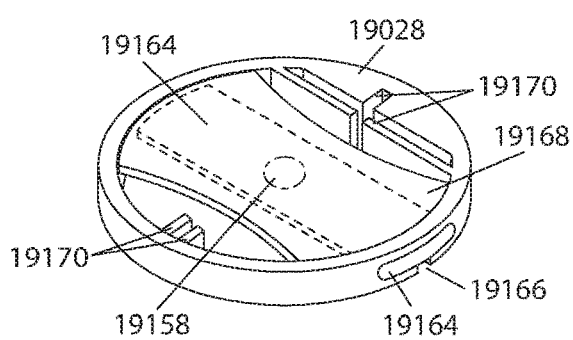
FIG. 19S illustrates a top perspective view of a plug with enlarged distal ends and disposed in a pair of recesses disposed in the plug and a rigid prop rotatably attached to the support and configured for engagement with a pair of prop engagement features.

FIG. 19A is a top perspective view of a cap 19018 with a rigid support 19164 rotatably attached to the cap 19018. FIG. 19B is a top perspective view of an example accessory 19010 with three rigid supports 19020, 19022, 19164 rotatably attached to a cap 19018. FIG. 19C is a top perspective assembly view of FIG. 19B. FIG. 19D is a top perspective view of an example accessory 19010 with three rigid supports 19020, 19022, 19164 rotatably attached to a cap 19018. FIG. 19E is a top perspective assembly view of FIG. 19D. FIG. 19F is a top perspective view of a rigid support 19164 rotatably attached to a plug 19028. FIG. 19G is a top perspective view of an example accessory 19010 with two rigid supports 19020, 19022 each attached to a cap 19018 via fasteners 19158 and a flexible support 19164 attached to the cap 19018 through two pairs of slots 19166 disposed at opposite ends of the cap 19018. FIG. 19H is a top perspective assembly view of two rigid supports 19020, 19022 each attached to a cap 19018 via fasteners 19158 and a flexible support 19164 attached to the cap 19018 through two pairs of slots 19166 disposed at opposite ends of the cap 19018. FIG. 19I is a top perspective assembly view of two rigid supports 19020, 19022 each attached to a cap 19018 via a pair of support arbors 19068 and a third flexible support 19164 configured with an adjustable tensioner 19172 and attached to the cap 19018 via a pair of fasteners 19158. FIG. 19J is a top perspective view of a flexible support 19020 configured with a mechanism for self-attachment and attached to a cap 19018 through a pair of slots 19166 formed in opposite ends of the cap 19018. FIG. 19K is a top perspective view of a flexible support 19022 attached to a cap 19018 through a pair of slots 19166 formed in opposite ends of the cap 19018 and secured via fasteners 19158 at each end, the cap 19018 rotatably coupled to a base 19016. FIG. 19L is a bottom perspective view of a cap 19018 with two fasteners 19158 disposed at opposite ends in the interior of the cap 19018 and configured for attaching a flexible support. FIG. 19M is a bottom perspective assembly view of a flexible support 19020 with fasteners 19158 disposed in each end and configured for attachment to a pair of slots 19166 disposed opposite in the interior perimeter of a cap 19018. FIG. 19N is a top perspective view of a plug 19028 with a flexible support 19164 disposed in a pair of recesses 19166 formed in opposite sides of the plug 19028. FIG. 19O is a top perspective sectional view of FIG. 19N showing the flexible support 19164 configured with enlarged distal ends. FIG. 19P is a top perspective sectional view of a plug 19028 with a concave top portion and a flexible support 19164 disposed in a pair of recesses 19166 formed in opposites sides of the plug 19028. FIG. 19Q is a top perspective view of a plug 19028 with a flexible support 19164 laterally disposed in a pair of recesses 19166 formed in opposites sides of the plug 19028. FIG. 19R is a top perspective view of a plug 19028 with a flexible support 19164 laterally disposed in a pair of recesses 19166 formed in opposites sides of the plug 19028 and a rigid prop 19168 attached to the support 19164 and configured for engagement with a pair of prop engagement features 19170. FIG. 19S is a top perspective view of a plug 19028 with a flexible support 19164 laterally disposed in a pair of recesses 19166 formed in opposites sides of the plug 19028 and a rigid prop 19168 configured for engagement with a prop engagement feature 19170 and rotatably attached to the support 19164 via a fastener 19158.

In various implementations, the accessory 19010 includes more than two supports. In some implementations, a third support (e.g., support 19164) is attached to the accessory 19010. In some implementations, the third support 19164 is substantially rigid, as in FIGS. 19A-19F. In other implementations, the third support 19164 is substantially flexible, as shown in FIGS. 19G-19I. In some implementations, the third support 19164 is disposed in the center of a cap 19018 and is rotatable with respect to the cap, as shown in FIG. 19A. In other implementations, the third support 19164 may be disposed in one or more slots 19166 formed in one or more of the cap 19018, a base 19016, one or more projections 19024, 19026, and a plug 19028, the slots 19166 having a profile corresponding to and configured for receiving a portion of the support 19164, as shown in FIGS. 19H-19I.

In some implementations, the third support 19164 is substantially arc-shaped, annular, or rectangular, as shown in FIGS. 19A-19F. An exterior portion of the third support 19164 may be flat, beveled, or chamfered, as shown in FIG. 19D. In some implementations, the ends of the third support 19164 are attached to the accessory 19010 by one or more fasteners 19158. In other implementations, one or more support arbors 19068 extending from one or more distal ends of the third support 19164 are disposed in one or more corresponding exterior cap recesses and/or slots 19166 formed in one of the cap 19018 and the plug 19028 and configured for limiting movement of the third support 19164 in one or both of a lateral and longitudinal direction, as shown in FIGS. 19A-19C and 19F. In other implementations, one or more features for retaining a portion of the third support 19164 are included in one or more projections 19024, 19026, (e.g., see slot 19166 in FIG. 19E) whereby the third support 19164 may be rotatably connected to the cap 19018 and movement of the support 19164 in one or both of a lateral and longitudinal direction may be restricted, as shown in FIGS. 19D-19E.

As shown in FIGS. 19G-19S, one or more of a first, second, and third support (e.g., supports 19020, 19022, 19164) attachable to the accessory 19010 may be substantially flexible, in the general form of a band, loop, strap, ribbon, or cord. One or more slots 19166 formed in one or more components of the accessory 19010, such as the base 19016, the cap 19018, the plug 19028, and the projections 19024, 19026, may be configured for receiving one or more flexible supports (e.g., support 19164) and may extend through a portion of one or both of the interior and exterior perimeters of the component, facilitating attachment of one or more flexible supports thereto and detachment therefrom, as shown in FIGS. 19G-19I and 19N-19S. In some implementations, a portion of the flexible support (e.g., support 19164) may be configured to pass through a slot formed in one or more projections 19024, 19026 and may be secured to the cap 19018 via one or more fasteners 19158, as shown in FIG. 19I. In other implementations, one end of the flexible support 19164 may be configured to pass through a slot formed in one projection 19026 and the other end of the flexible support 19164 configured to loop around the sides and underneath the other projection 19024, enabling a user to easily attach or detach the support from the accessory 19010 as needed.

One or more adjustment mechanisms 19172 configured for adjusting the length, tautness, or tension of the flexible support (e.g., support 19164), such as a spring-loaded adjustable tensioner, may be attached to one end of the flexible support 19164, as shown in FIG. 19I. In other implementations, one or more flexible supports (e.g., support 19164) may include a mechanism for fastening one portion of the support to another portion, such as hook-and-loop fasteners, interlocking connectors, slide buckles, ladder lock buckles, or reusable adhesive, whereby the length, tautness, or tension of the support 19020 may be adjusted, as shown in FIG. 19J. In other implementations, one or more flexible supports are permanently attached to one or more components of the accessory 19010 and may be joined together by thermoforming, heat staking, welding, or adhesive.

In some implementations, one or more holes or loops formed in one or more ends of one or more flexible supports (e.g., supports 19020, 19022, 19164) are configured for receiving one or more fasteners 19158, whereby the ends of the supports 19022 may be secured to the accessory 19010, as shown in FIGS. 19I and 19K. The fasteners 19158 securing one or more ends of one or more flexible supports to the accessory 19010 may be of a size and shape larger than the slots 19166 formed in one of the base 19016, the cap 19018, the plug 19028, and the projections 19024, 19026 in which one or more flexible supports may be disposed, and may restrict the ends of the supports from passing through the slots 19166 and detaching from the accessory 19010. In other implementations, the ends of one or more flexible supports may be configured to attach to one or more fasteners 19158 disposed in one or more of the base 19016, the cap 19018, the plug 19028, and the projections 19024, 19026, as shown in FIG. 19L. In other implementations, one or more fasteners 19158, such as a buckle, hook, or clasp, are attached to one or more ends of one or more flexible supports (e.g., support 19020) and configured for engaging with one or more corresponding engagement features, fasteners 19158, or slots 19166 disposed in one or more of the cap 19018, the base 19016, the plug 19028, and the projections 19024, 19026, as shown in FIG. 19M.

In other implementations, a rigid feature is disposed in one or more ends of one or more flexible supports (e.g., supports 19020, 19022, 19164) and configured to be received and engaged in one or more slots 19166 formed in one or more of the base 19016, the cap 19018, the plug 19028, and the projections 19024, 19026, the rigid feature preventing the end of the flexible support from passing through one or more slots 19166 in which it is disposed.

In some implementations, the flexible support (e.g., support 19164) is attached to the plug 19028 through a pair of slots 19166 formed in opposite sides of the plug 19028. A portion of one or more of the slots 19166 formed in the plug 19028 may extend through the exterior perimeter of the plug 19028 facilitating attachment and detachment of the support 19164 from the plug 19028, as shown in FIG. 19N. In some implementations, one or more distal ends of the flexible support 19164 are rigid or enlarged and configured to engage with a portion of one or more corresponding slots 19166 formed in the plug 19028 wherein the ends of the support 19164 are constrained from moving in one or both of a lateral and longitudinal direction, as shown in FIGS. 19N-19O and 19Q-19S. An aperture 19030 may be formed in the center of one or both of the cap 19018 and the plug 19028 or a top portion of one or both of the cap 19018 and the plug 19028 may be recessed or concave, in order to facilitate user engagement with and deployment of the flexible support attached therein, as shown in FIGS. 19F-19S.

In other implementations, a substantially flat and rigid prop 19168 is attached to a proximal portion of the flexible support (e.g., support 19164) and configured to engage with one or more prop engagement features 19170 disposed in the plug 19028 wherein one or more ends of the prop 19168 may be rotatably inserted, secured, and oriented such that the opposite end of the prop extends away from the plug 19028 at a predetermined angle and whereby the prop 19168 may be used to support a mobile device in one or more display orientations on a support surface, as shown in FIGS. 19R-19S. A notch may be formed in a portion of one end of the prop 19168, enabling the prop to be inserted into one or more prop engagement features 19170, as shown in FIG. 19R. In some implementations, the prop 19168 is pliable or flexible and may be shaped to conform to an inner or outer profile of the plug 19028 or one or more prop engagement features 19170. In other implementations, the center of the prop 19168 may be attached the center of the flexible support 19164 by one or more fasteners 19158, the fasteners defining an axis of rotation about which the prop 19168 may freely rotate with respect to the flexible support 19164, as shown in FIG. 19S. In some implementations, the plug 19028 includes multiple prop engagement features 19170 configured for engaging one or more sides or ends of the prop 19168 and orienting the prop at different predetermined angles with respect to the plug 19028. In various implementations, one or more supports (e.g., supports 19020, 19022, 19164) include both rigid and flexible parts. Indicia may be disposed on one or more surfaces of one or more of the supports 19020, 19022, 19164, and the prop 19168, as shown in FIG. 19N.

FIG. 20A is a bottom perspective assembly view of an example accessory 20010 with multiple magnetic attachment elements 20084 arranged annularly around the inside of a cap 20018 and configured to attach to a magnetic attachment interface 20042 disposed in the bottom of a base 20016. FIG. 20B is a bottom perspective assembly view of multiple magnetic attachment elements 20084, 20086, 20088 combinable together in a continuous shape and disposed inside a cap 20018. FIG. 20C is a bottom perspective assembly view of a cap 20018 configured for receiving and engaging an annular attachment element 20084 therein. FIG. 20D is a top perspective sectional view of an example accessory 20010 with multiple magnetic attachment elements 20084, 20086, 20088 disposed in a cap 20018 and configured to attach to a magnetic attachment interface 20042 disposed in the bottom of a base 20016, the cap further including multiple annular cap protrusions 20044, 20054 disposed adjacent to an annular base protrusion 20036. FIG. 20E is an enlarged sectional view of an example accessory 20010 with a ball bearing attachment element 20084 disposed in between a cap 20018 and a base 20016. FIG. 20F is a top perspective assembly view of an example accessory 20010 with a magnetic bearing attachment element 20084 attached to one or more magnetic attachment elements (not shown) disposed in a cap 20018 configured to rotatably couple to a magnetic attachment interface 20042 disposed on an exterior surface of a mobile device 20012. FIG. 20G is a top perspective assembly view of an example accessory 20010 including a cap 20018 with a magnetic attachment element 20084 disposed therein and configured to magnetically couple to a magnetic attachment interface 20042 disposed in a recess formed in an exterior surface of a mobile device case 20073, and a plug 20028 with a magnetic attachment element 20088 disposed on a bottom surface thereof and configured for attachment to another magnetic attachment element 20090 disposed in a recess (not shown) formed in the bottom interior surface of the mobile device case 20073. FIG. 20H is a top perspective assembly view of an example accessory 20010 with a cap 20018 rotatably coupled to a base 20016 attached to a magnetic attachment interface 20042 configured for attachment to a mobile device 20012 with multiple magnetic attachment elements 20090 disposed therein.

In various implementations, one or more attachment elements (e.g., elements 20084, 20086, 20088) are attached to or disposed in or on a surface of one or more components of the accessory 20010 such as a base 20016, a cap 20018, a plug 20028, an attachment interface 20042, and an intermediate mounting pad, and are configured for coupling one or more components of the accessory 20010 together. In some implementations, one or more attachment elements (e.g., elements 20084, 20086, 20088), are magnetic and configured for rotatably coupling the base 20016 and the cap 20018 together, as shown in FIGS. 20A and 20D. In other implementations, one or more magnetic attachment elements (e.g., elements 20084, 20086, 20088, 20090) are configured for rotatably coupling the cap 20018 to one or more of the attachment interface 20042 and the mobile device 20012 housing, case 20073, or cover thereof, as shown in FIGS. 20A-20D. In other implementations, one or more attachment elements (e.g., element 20090) are attached to or disposed in or on a surface of one or more of the mobile device 20012 housing, case 20073, or cover thereof and may be configured to mechanically, magnetically, or adhesively engage with one or more of the supports 20020, 20022 and/or other attachment elements attached to or disposed in or on a surface of one or more of the supports 20020, 20022, and may be configured to retain one or more of the supports 20020, 20022 in a retracted position.

One or more attachment elements may be substantially annular, circular, semi-circular, arc-shaped, disc-shaped, wedge-shaped, crescent-shaped, square, rectangular, or cylindrical, and disposed in one or more corresponding recesses formed in one or more of the base 20016, the cap 20018, the attachment interface 20042, and the mobile device 20012 housing, case 20073, or cover thereof. As shown in FIG. 20A, multiple magnetic attachment elements (e.g., element 20084) may be disposed in correspondingly shaped cap recesses 20056 arranged annularly around the inside of the cap 20018 and configured to attach to the magnetic attachment interface 20042 disposed in a corresponding recess 20040 formed in the bottom of the base 20016 circumscribing the first annular base protrusion 20036. The first annular base protrusion 20036 may be disposed adjacent to the first annular cap protrusion 20044 and configured for limiting lateral movement of the cap 20018 and keeping the cap 20018 concentrically aligned with the base 20016 about a common axis of rotation. In some implementations, one or more magnetic attachment elements (e.g., element 20084) are disposed in the cap 20018 between a first and second annular cap protrusion 20044, 20048, as shown in FIGS. 20A-20C. In other implementations, one or more magnetic attachment elements (e.g., element 20084) are disposed in the cap 20018 between the first and third 20044, 20054 or second and third annular cap protrusions 20048, 20054, as shown in FIG. 20D.

One or more magnetic attachment elements (e.g., elements 20084, 20086, 20088, 20090) may have a shape and/or profile corresponding to an exterior or interior perimeter or surface of one or more of the base 20016, the cap 20018, the attachment interface 20042, and the mobile device 20012 housing, case 20073, or cover thereof. In some implementations, one or more magnetic attachment elements (e.g., elements 20084, 20086, 20088) may be combined together to form a continuous shape, as shown in FIG. 20B. In other implementations, one or more annular cap protrusions (e.g., protrusions 20044, 20054) disposed adjacent to a first annular base protrusion 20036 provide a mechanism for concentrically centering the magnetically coupled base 20016 and cap 20018 around a common axis of rotation 20034, as shown in FIGS. 20A-20C.

In some implementations, the attachment interface 20042 is magnetic or includes one or more magnetic attachment elements (e.g., element 20086) attached to or disposed in or on a surface thereof, as shown in FIGS. 20A, 20D, and 20F-20H. The attachment interface 20042 may be attached to or disposed in or on a surface of the mobile device 20012 housing, case 20073, or cover thereof, and may be configured for attachment to one or more other attachment elements (e.g., elements 20084, 20086, 20088) disposed in one or more of the cap 20018, the base 20016, and the plug

20028, as shown in FIGS. 20A, 20D, and 20F-20H. In some implementations one or both of the cap 20018 and the plug 20028 are configured to attach directly to the attachment interface 20042 and/or one or more attachment elements (e.g., element 20090) disposed in the mobile device 20012 housing, case 20073, or cover thereof without a base 20016 disposed in between, as shown in FIGS. 20F-20G. In some implementations, the cap 20018 includes one or more magnetic attachment elements (e.g., elements 20084, 20086) disposed therein and configured to rotatably couple to a magnetic attachment interface 20042 adhesively attached to an exterior surface of the mobile device 20012 housing, case 20073, or cover thereof, or in a recess formed in a surface thereof, as shown in FIGS. 20F-20G. In some implementations, the attachment interface 20042 is wholly or partially received in a recess formed in the bottom of the cap 20018. One or more annular cap protrusions 20044, 20048 disposed adjacent to an inner or outer perimeter of the attachment interface 20042 may keep the cap 20018 concentrically aligned with the attachment interface 20042 about the common axis of rotation 20034 and limit the cap 20018 from moving laterally with respect to the attachment interface 20044. In some implementations, one or both of the cap 20018 and the plug 20028 substantially surround and conceal the attachment interface 20042.

One or more magnetic attachment elements (e.g., elements 20084, 20086, 20088) attached to or disposed in the cap 20018 may be secured to the cap 20018 via friction fit, press fit, adhesive, or epoxy and may be encased in a protective plastic, silicone, or rubber encasement to protect the attachment elements from damage. In some implementations, one or more cap engagement features (e.g., feature 20046) disposed on one or more annular cap protrusions (e.g., protrusion 20044) are configured for engaging and retaining the attachment element in the cap 20018. In other implementations, the base 20016 may be adhesively attached to the top of the magnetic attachment interface 20042, the attachment interface 20042 configured to attach to one or more magnetic attachment elements (e.g., element 20090) disposed in the mobile device 20012 housing, case 20073, or cover thereof, as shown in FIG. 20H.

In some implementations, one or more magnetic attachment elements (e.g., element 20090), are attached to or disposed in or on a surface of one or more of the mobile device 20012 housing, case 20073, and cover thereof, and configured for attachment to one or more other magnetic attachment elements (e.g., elements 20084, 20086, 20088) disposed in one or more of the attachment interface 20042, the base 20016, the cap 20018, the plug 20028, and supports 20020, 20022, as shown in FIG. 20F-20H. One or more recesses may be formed in one or both of an interior and exterior surface of the mobile device 20012 housing, case 20073, or cover thereof, and configured for receiving the attachment interface 20042 and/or one or more attachment elements (e.g., element 20090), as shown in FIG. 20G. In some implementations, one or more magnetic attachment elements (e.g., element 20090) are disposed in a recess (not shown) formed in the interior of a mobile device case 20073 and configured for magnetically attaching to one or more other magnetic attachments element (e.g., element 20088) attached to or disposed in or on a surface of one or more of the base 20016, the cap 20018, and the plug 20028, as shown in FIG. 20G. In some implementations, a substantially rigid or substantially flexible support (e.g., support 20164) may be attached to or disposed in or on a surface of the attachment interface 20042 and/or attachment element (e.g., element 20088), the support 20164 providing an user engagement for detaching one or both of the attachment interface 20042 and the attachment element (e.g., element 20088) from one or more other attachment elements (e.g., element 20090) or from the mobile device 20012 housing, case 20073, or cover thereof, as shown in FIG. 20H.

One or more recesses or protrusions extending longitudinally from one or more surfaces of the attachment interface 20042, the mobile device 20012 housing, case 20073, or cover thereof, may be configured to engage with one or more annular protrusions disposed in one of the base 20016, the cap 20018, and the plug 20028 to concentrically align the components and limit their movement in a lateral direction as shown in FIGS. 20F-20H. In some implementations, the attachment interface 20042 includes one or more recesses formed in the bottom surface thereof and configured for receiving one or more magnetic attachment elements (e.g., element 20086), the magnetic attachment elements configured to magnetically attach to and correlate with one or more other magnetic attachment elements (e.g., element 20090) disposed in the mobile device 20012 housing, case 20073, or cover thereof, as shown in FIG. 20H. In other implementations, one or more attachment elements (e.g., element 20084) with a shape or profile generally conforming to an aperture 20030 formed in one of the base 20016 and the cap 20018 may be attached to or disposed in or on a surface of the attachment interface 20042, and may protrude longitudinally from the top surface of the attachment interface 20042, the inner and/or outer perimetric faces of the attachment element 20086 providing an engagement for limiting the lateral movement of one or more annular protrusions disposed in one or both of the base 20016 and the cap 20018, as shown in FIG. 40H. In other implementations, the aperture 20030 formed in one of the base 20016 and the cap 20018 is enclosed on a bottom side and a magnetic attachment element may be disposed in the aperture 20030 on a top surface thereof, the attachment element configured to magnetically attach one of the base 20016 and the cap 20018 with one or more magnetic attachment elements (e.g, element 20090) attached to or disposed in or on a surface of the mobile device 20012 housing, case 20073, or cover thereof.

In some implementations, a bearing 20175, such as a ball bearing, roller bearing, ultra-thin bearing, race bearing, or turntable type bearing, is attached to or disposed in or around one or both of the cap 20018 and the base 20016, or between the cap 20018 and the attachment interface 20042, the bearing configured for facilitating smooth and continuous rotation between one or more components of the accessory 20010, as shown in FIGS. 20E-20F. In some implementations, the bearing 20175 is magnetic and configured for attachment to the magnetic attachment interface 20042 or one or more magnetic attachment elements disposed in one or both of the cap 20018 and the base 20016. In other implementations, a low-friction element 20174 composed of a material like PTFE, nylon, or Teflon is disposed between two or more components of the accessory 20010, such as the cap 20018 and the attachment interface 20042, or between one or more magnetic attachment elements (e.g., element 20084) and the attachment interface 20042, the low-friction element 20174 configured for reducing rotational friction between two or more components of the accessory 20010, as shown in FIG. 20G. In other implementations, a portion of one or more components of the accessory 20010 may be covered with a low-friction coating.

FIG. 21A is a top perspective assembly view of an example accessory 21010 with a base 21016 substantially integrated into a mobile device case 21073 with a recess (not shown) formed in an interior surface of the case 21073 configured to receive one or more of an attachment interface, a protective cover 21070, and an attachment element 21084. FIG. 21B is a top perspective view of a base 21016 substantially integrated into a mobile device cover 21176 with a first annular base protrusion extending longitudinally from an exterior surface of the cover 21176. FIG. 21C is a top perspective assembly view of an example accessory 21010 with a base 21016 having a shape and profile generally conforming with and configured for attachment to an exterior surface of a mobile device 21012. FIG. 21D is a top perspective view of an example accessory 21010 with a base 21016 configured for attachment to two sides of a mobile device 21012. FIG. 21E is a top perspective view of an example accessory 21010 with a base 21016 disposed on a surface of and attached around two opposite sides of a mobile device 21012. FIG. 21F is a top perspective view of an example accessory 21010 disposed on top of an example second mobile accessory 21178 configured for attachment to a surface of a mobile device 21012 housing, case 21073, or cover 21176 thereof. FIG. 21G is a top perspective sectional view of an example second mobile accessory 21178 with a recess formed in the top configured for receiving a portion of a base 21016. FIG. 21H is a top perspective sectional view of an example second mobile accessory 21178 with a bottom portion configured to attach to a corresponding base engagement feature disposed in one of a base 21016 and a mobile device 21012 housing, case 21073, and cover 21176 thereof.

As shown in FIGS. 21A-21E, in various implementations, a base 21016 has a profile generally matching a portion of the profile of a mobile device 21012 and is configured to attach to one or more exterior surfaces of the mobile device 21012. In other implementations, the base 21016 is substantially incorporated into one of the mobile device 21012 housing, case 21073, and cover 21176 thereof, as shown in FIGS. 21A-21B. In some implementations, one or more base engagement features 21038 extends radially inward or outward from an interior or exterior perimetric face of one or more annular base protrusions 21036 disposed in and extending longitudinally from a surface of one of the base 21016 and/or a mobile device 21012 housing, case 21073, and cover 21176 thereof, as shown in FIGS. 21A-21B.

An aperture 21030 circumscribed by the first annular base protrusion 21036 may be formed in the center of the base 21016 and may be enclosed on one side (e.g., see FIG. 21B) or extend therethrough (e.g., see FIG. 21A). A recess (not shown) formed in the bottom of the base 21016 and/or in an interior surface of one of the mobile device case 21073 and the mobile device cover 21176 may be configured for receiving and/or engaging one or more of a permanently or detachably attachable attachment interface (not shown), one or more attachment elements (e.g., element 21084), and a protective cover 21070. In some implementations, the protective cover 21070 is permanently attached to the interior surface of one of the base 21016, the mobile device case 21073, and the mobile device cover 21176 via thermoforming, welding, or adhesive and is configured to protect a surface of the mobile device 21012. In other implementations one of the protective cover 21070 and one or more attachment elements (e.g., element 21084) may be attached to the interior surface of one of the mobile device case 21073 and cover 21176 via the attachment interface. In some implementations, one or more attachment elements (e.g., element 21084) disposed in the bottom of the base 21016 and/or an interior surface of one of the mobile device case 21073 and cover 21176 are magnetic or otherwise configured to provide a mechanism for attaching to one or more other attachment elements (e.g., element 21090) disposed in one or more of a cap 21018, a plug 21028, or a mount (not shown), as shown in FIG. 21A.

As shown in FIG. 21B, one or more magnetic attachment elements (e.g., element 21084) may be attached to or embedded in one or more portions of a mobile device cover 21176 and configured for attachment to one or more other magnetic attachment elements disposed in one of the cap 21018 and the plug 21028. In some implementations, the mobile device cover 21176 includes two substantially flat portions connected by a flexible hinged portion, as shown in FIG. 21B. One substantially flat portion of the mobile device cover 21176 containing one or more magnetic attachment elements (e.g., element 21084) may be folded back and placed adjacent to or in close proximity to one or more other magnetic attachment elements disposed in one of the cap 21018 and the plug 21028, whereby a magnetic force is exerted between the magnetic elements sufficient to magnetically secure the folded cover portion to the accessory 21010. In other implementations, a protrusion may be disposed on an exterior surface of a substantially flat portion of the mobile device cover 21176, with the exterior perimeter of the protrusion configured to fit inside the aperture 21030 formed in the center of the accessory 21010, the interior perimeter of the cap 21010 configured to retain the annular protrusion disposed in the cover 21176 by friction, interference fit, or snap fit. In other implementations, the protrusion extending from the exterior surface of the cover 21176 includes one or more attachment features or attachment elements (e.g., element 21084) disposed in an outer surface thereof and may be configured to engage with one or more attachment features or attachment elements disposed in one of the base 21016 and the cap 21018, or on an opposite side of the cover 21176.

In some implementations, the base 21016 has a shape generally conforming to one of the two largest surfaces of the mobile device 21012 and is configured to substantially cover and protect the surface of the mobile device 21012 from damage, as shown in FIG. 21C. In some implementations, an attachment interface (not shown), such as an adhesive film, nano-suction pad, or sticky gel pad, having a profile generally matching the profile of the base 21016, is disposed on a bottom surface of the base 21016 or disposed in a recess formed therein and configured for attachment to the mobile device 21012 housing, case 21073, or cover 21176 thereof. In some implementations, the base 21016 is substantially flat and configured for attachment to a substantially flat surface of the mobile device 21012 housing, case 21073, or cover 21176 thereof, as shown in FIG. 21C. In other implementations, one or more portions of the base 21016 is configured to detachably attach to one or more edges or sides of the mobile device 21012. One or more portions of the base 21016 may attach to the mobile device 21012 by snap fit or friction fit. In some implementations, the base 21016 is attached to two opposing sides of the mobile device 21012, allowing the accessory 21010 to be secured to the mobile device 21012 at one or more predetermined positions, as shown in FIGS. 21D-21E.

In other implementations, the base 21016 is disposed in or configured for attachment to the top of a second mobile accessory 21178 such as a card case configured for storing one or more of a user's cards. The bottom of the second mobile accessory 21178 may be configured for attachment to one of the base 21016 and the mobile device 21012 housing, case 21073, and cover 21176 thereof, and the top of the second mobile accessory 21178 may be configured for attachment to one of the attachment interface, the base 21016, the cap 21018. Other examples of second mobile accessories 21178 include, but are not limited to, wallets, charging devices, batteries, scanners, cameras, spatial location beacons, and financial payment processors.

In some implementations, a protrusion with a shape and profile generally conforming to the shape of the aperture 21030 formed in the center of the accessory 21010 extends longitudinally from the bottom of the second accessory 21178 and is configured to attach to one of the base 21016 and the cap 21018, as shown in FIG. 21G. In other implementations, a recess is disposed in the top surface of the second accessory 21178 and configured for substantially receiving a bottom portion of the base 21016, as shown in FIG. 21G. In other implementations, one or more recesses or apertures may be disposed in the top of the second mobile accessory 21178 and configured for receiving and engaging a portion of one or both of a first and second base components, (e.g., see first and second base components 16148, 16150 in FIG. 16J). In other implementations, one or more base engagement features (e.g., see feature 21038 in FIG. 21B) extends radially inward or outward from an interior or exterior perimetric face of one or more annular base protrusions 21036 (e.g., see protrusion 21036 in FIG. 21B) disposed in and extending longitudinally from the top of the second mobile accessory 21178 and are configured to attach to the cap 21018. In other implementations, an attachment element may be attached to or disposed in or on a surface of the second mobile accessory 21178 and configured for attachment to one or more of the attachment interface, the base 21016, the cap 21018, the plug 21028, and another attachment element. In other implementations, one or more portions of the cap 21018, such as an annular cap protrusion 21044 and cap engagement feature 21046, are disposed in the bottom of the second mobile accessory 21178 and configured for attaching to a portion of the base 21016, such as the base engagement feature (e.g., see 21038 in FIG. 21B), as shown in FIG. 21H. In some implementations, one or both of the top and bottom exterior surfaces of the second mobile accessory 21178 are substantially flat. In other implementations, a recess is formed in the bottom of the second mobile accessory 21178 configured for substantially receiving one or more portions of the base 21016, as shown in FIG. 21H. Other recesses may be formed in the top, bottom, or sides of the second mobile accessory 21178 and configured for receiving and/or retaining one or more tools or common items of everyday personal conveyance such as a key or a pocket-knife, as shown in FIG. 21H.

FIG. 22A is a top perspective view of a base 22016 with an opening 22180 formed in the bottom surface and extending through an interior and exterior perimetric face thereof. FIG. 22B is a bottom perspective view of an attachment interface 22042 with two openings 22180 extending through an interior and exterior perimetric face thereof and attached to the bottom of a base. FIG. 22C is a top perspective view of an intermediate mounting pad 22072 with an opening 22180 formed in and extending through an interior and exterior perimetric face thereof. FIG. 22D is a top perspective view of a plug 22028 with a flexible support 22164 attached at one end. FIG. 22E is a top perspective view of a plug 22028 disposed in a cap 22018 and configured with a flexible support 22164 extending outward through an opening 22180 (not shown) formed in the bottom of a base 22016. FIG. 22F is a top perspective assembly view of an electronic port 22184 connected to an electronic connector 22188 via a flexible cable 22186 and configured for connection with a second electronic port 22190 disposed in a plug 22028. FIG. 22G is a top perspective assembly view of an example accessory 22010 with an electronic port 22184 disposed in a base 22016 and configured for connection with a second electronic port 22190 (not shown) disposed in a plug 22028 with visual indicators 22192 disposed in a top surface thereof. FIG. 22H is a top perspective view of an example accessory 22010 with an electronic connector 22188 disposed in the electronic port of a mobile device 22012, with a flexible cable 22186 connecting the electronic connector 22188 and a first electronic port 22184 (not shown) configured for attachment to a second electronic port 22190 (not shown) disposed in a plug 22028.

In some implementations, one or more openings 22180 formed in one or more of an intermediate mounting pad 22072, an attachment interface 22042, and a base 22016 and extending through a portion of the interior and exterior perimeters thereof are configured for receiving a portion of a substantially thin, flat, or flexible component, such as a portion of a plug removal feature (not shown, e.g., see 6074 in FIG. 6B) or a support (e.g., 22164 in FIG. 22D). In some implementations, one or more base openings 22180 are formed in the bottom of the base 22016 and extend through a portion of the interior and exterior perimeters thereof, as shown in FIG. 22A. In other implementations, one or more openings 22180 are disposed in the attachment interface 22042 and extend through a portion of the interior and exterior perimeters thereof, as shown in FIG. 22B. In other implementations one or more openings 22180 are disposed in the intermediate mounting pad 22072 and extend through a portion of the interior and exterior perimeters thereof, as shown in FIG. 22C. One or more openings formed in one or more of the intermediate mounting pad 22072, the attachment interface 22042, and the base 22016 may extend into an aperture 22030 formed in the center of one of the intermediate mounting pad 22072, the attachment interface 22042, and the base 22016.

As shown in FIGS. 22D-22E, one or more flexible supports (e.g., support 22164) may be configured to pass through one or more openings 22180 formed in one of the intermediate mounting pad 22072, the attachment interface 22042, and the base 22016. In some implementations, one or more flexible supports 22164 attached to one of the cap 22018 and a plug 22028 are configured to extend through one or more openings 22180 formed in one of the intermediate mounting pad 22072, the attachment interface 22042, and the base 22016, and may be configured for engaging one or more of a user's fingers.

As shown in FIGS. 22F-22H, in other implementations, an electronic port (e.g., port 22184) with a flexible cable 22186 extending therefrom is configured to pass through one or more openings 22180 formed in one or both of the intermediate mounting pad 22072, the attachment interface 22042, and the base 22016. An electronic connector (e.g., connector 22188) configured for connecting to an electronic port (not shown) disposed in a mobile device 22012 may be disposed on one distal end of the cable 22186 opposite the electronic port 22184. The electronic port 22184, cable 22186, and electronic connector 22188 may be configured to transmit one or both of power and data between the mobile device 22012 and a second electronic port 22190 disposed in the plug 22028. In some implementations, a flexible support is disposed on top of the cable 22186 and configured for receiving one or more of a user's fingers. In other implementations, the cable 22186 may function as a flexible support and be configured for receiving one or more of a user's fingers. In other implementations, an adhesive film, nano-suction pad, or sticky gel pad may be disposed on a bottom surface of one or both of the electronic port 22184 and cable 22186 and configured to adhere to a surface of the mobile device 22012 housing, case, or cover thereof, or an intermediate mounting pad 22072. In other implementations, one or more of the electronic port 22184, cable 22186, and electronic connector 22188 are substantially integrated into or embedded in the mobile device 22012 housing, case, or cover thereof. In some implementations, one or more plugs 22028 configured with an electronic port 22190 include one or more LED indicators 22192 disposed in the top of the plug 22028 and configured to display information to a user related to one or both of power and data, as shown in FIGS. 22G-22H.

In some implementations, one or more magnetic elements are disposed in or around the electronic port 22184 and are configured for aligning with and attaching to one or more magnetic elements disposed in or around the second electronic port 22190 disposed in the plug 22028. In some implementations, the plug 22028 includes a battery capable of charging one or more other batteries disposed in the mobile device 22012 through the second electronic port 22190, first electronic port 22184, cable 22186, and connector 22188. In other implementations, the plug 22028 includes one or both of a solid-state data drive and data processor, capable of transmitting, storing, and/or processing data to and/or from the mobile device 22012.

FIG. 23A is a top perspective view of a flexible support 23194 disposed in an intermediate mounting pad 23072. FIG. 23B is a top perspective view of a flexible support 23194 disposed in a base projection 23198. FIG. 23C is a top perspective view of a flexible support 23194 and a rotatable rigid support 23196 disposed in a base projection 23198. FIG. 23D is a top perspective view of a rotatable rigid support 23196 attached to a base projection 23198 by a hinge 23200. FIG. 23E is a top perspective view of a rotatable rigid support 23196 attached to a base projection 23198 by a hinge 23200. FIG. 23F is a top perspective view of a rotatable rigid support 23196 disposed in the bottom of a base 23016 and with a stop 23204 extending from one end of the support 23196 through an opening disposed in the bottom of the base 23016, the stop 23204 configured to be received in a corresponding recess formed in the bottom of a plug 23028. FIG. 23G is a top perspective view of an example accessory 23010 and support retainer 23202 attached to a surface of a mobile device 23012, the accessory including three rotatable rigid supports 23020, 23022, 23196, extended in a deployed position. FIG. 23H is a side view of an example accessory 23010 with three rotatable rigid supports 23020, 23022, 23196, retracted in a retained position. FIG. 23I is a top perspective view of an example accessory 23010 with three rotatable rigid supports 23020, 23022, 23196, retracted in a retained position. FIG. 23J is a front view of an example accessory 23010 with three rotatable rigid supports 23020, 23022, 23196, retracted in a retained position. FIG. 23K is a back view of an example accessory 23010 with three rotatable rigid supports 23020, 23022, 23196, retracted in a retained position. FIG. 23L is a bottom perspective view of an example accessory 23010 with three rotatable rigid supports 23020, 23022, 23196, retracted in a retained position. FIG. 23M is a top view of an example accessory 23010 with three rotatable rigid supports 23020, 23022, 23196, retracted in a retained position. FIG. 23N is a bottom view of an example accessory 23010 with three rotatable rigid supports 23020, 23022, 23196, retracted in a retained position.

In some implementations, one or more supports (e.g., supports 23194, 23196) are disposed in one or both of an intermediate mounting pad 23072 and a base 23016. One or more supports (e.g., supports 23194, 23196) disposed in one of the intermediate mounting pad 23072 and the base 23016 may be substantially flexible or substantially rigid. In various implementations, one or more supports (e.g., supports 23194, 23196) disposed in one or both of the intermediate mounting pad 23072 and the base 23016 are configured for engaging one or more of a user's fingers, supporting a mobile device 23012 in a preferred display orientation, or mounting the accessory 23010 to one of a mount (not shown) and a mounting structure (not shown).

In some implementations, one or more supports (e.g., support 23194) are attached to the intermediate mounting pad 23072 as shown in FIG. 23A. In other implementations, one or more supports (e.g., supports 23194, 23196) are disposed in the base 23016, as shown in FIGS. 23B-23N. In some implementations, the base 23016 includes a laterally extending base projection 23198 wherein one or more flexible and/or rigid supports (e.g., supports 23194, 23196) may be disposed. In some implementations, the base projection 23198 includes two slots (not shown) formed therethrough wherein each end of a flexible support (e.g., support 23194) may be attached, as shown in FIG. 23B. A recess (not shown) may be formed in the bottom of the base projection 23198 wherein a portion of the attached flexible support 23194 may be substantially received.

In some implementations, a portion of the exterior perimeter of the base projection 23198 is configured to engage with an interior portion of the support (e.g., support 23196) whereby the support 23196 may be disposed in retained position, as shown in FIG. 23C. In some implementations, the support 23196 is rotatably attached to the base projection 23198 via a pair of support arbors (not shown), rotatably disposed in a pair of recesses (not shown) formed in the sides of the base projection 23198, as shown in FIG. 23C. In other implementations, one or more supports are rotatably attached to the base projection 23198 via one or more fasteners (not shown). In other implementations, one or more substantially rigid supports (e.g., support 23196) are rotatably connected to the base projection 23198 via a hinge 23200, such as a living hinge, as shown in FIG. 23D, or a pin hinge, as shown in FIG. 23E. A distal portion of one or more supports (e.g., support 23196) disposed in one of the intermediate mounting pad 23072 and the base 23016 may be beveled. In some implementations, a distal portion of one or more supports (e.g., supports 23194, 23196) disposed in one of the intermediate mounting pad 23072 and the base 23016 may extend beyond one end of the mobile device 23012 in order to facilitate user deployment.

An aperture 23030 formed in one or more supports (e.g., supports 23194, 23196) and extending therethrough may be configured for receiving and engaging one or more of a user's fingers, as shown in FIGS. 23D-23G. In some implementations, a support retainer 23202 is attached to the mobile device 23012 housing, case, or cover thereof, and has an exterior perimeter configured to engage with the aperture 23030 formed in the support (e.g., support 23196) whereby the support 23196 may be disposed in a retained position, as shown in FIG. 23G. In some implementations, the support retainer 23202 is magnetic or has one or more magnetic attachment elements disposed therein. In some implementations, one or more attachment elements 23088 such as a magnet or a hook-and-loop fastener may be attached to or disposed in or on a surface of the support retainer 23202 or disposed in a recess formed in a top or bottom side thereof. As shown in FIG. 23G, one or more attachment elements 23090 may be attached to or disposed in or on a surface of one or more of the mobile device housing 23012, case, and cover thereof, and may be configured to mechanically, magnetically, or adhesively engage with one or more other attachment elements 23086 attached to or disposed in or on a surface of one or more of the supports (e.g., supports 23020, 23022, 23196) and may be configured to retain one or more of the supports 23020, 23022, 23194, 23196 in a retracted position. The bottom of the support retainer 23202 may be attached to the mobile device 23012, housing, case, or cover thereof via an attachment element, such as an adhesive film.

In some implementations, one or more supports (e.g., support 23196) may be detachably attached to the accessory 23010 and secured by a plug 23028. A support stop 23204 disposed on one end of the support 23196 may be inserted through an opening (not shown, e.g., see 22180 in FIG. 22A) formed in the bottom of the base 23016 and extending through an interior and exterior perimetric face thereof and wherein longitudinal movement of the support 23196 may be restricted. One end of the support stop 23204 may be configured for engagement in a corresponding recess disposed in the bottom of the plug 23028 whereby the support 23196 may be secured to the accessory 23010 and movement of the support 23196 may be restricted by at least one degree of freedom, as shown in FIG. 23F. In some implementations, an exterior perimetric portion of the accessory 23010 (e.g., an exterior portion of supports 23020, 23022, or cap projections 23024, 23026) may limit one or more supports (e.g., support 23196) rotatably disposed in one of the base 23016 and the intermediate mounting pad 23072 from rotating beyond a predetermined position, as shown in FIG. 23E. In other implementations, one or more slidable, rotatable, stretchable, or extendable supports (e.g., supports 23194, 23196) attached to or disposed in one or more of the base 23016, the cap 23018, the plug 23028, the intermediate mounting pad 23072, the cap projections 23024, 23026, and the base projection 23198 are configured for engaging and restricting the movement of one or more other supports (e.g., supports 23020, 23022) attached to the accessory 23010 by at least one degree of freedom.

FIG. 24 is a top perspective view of an example accessory 24010 with a base 24016 slidably disposed inside a base track 24206. In some implementations, the base 24016 may be disposed in a base track 24206, as shown in FIG. 24. In some implementations, the base track 24206 is attached to the top of an intermediate mounting pad 24072. An inner perimetric portion of the base track 24206 may be configured to engage with an outer perimetric portion of the base 24016, restricting the base 24016 from moving longitudinally while enabling the base 24016 to traverse linearly along a lateral axis parallel to the two longest edges of the base track 24206. In some implementations the inner perimeter of the base track 24206 and the outer perimeter of the base 24016 are substantially rectangular. In other implementations, the inner perimeter of the base track 24206 and the outer perimeter of the base 24016 are substantially oblong. The inner perimeter of the base track 24206 and the outer perimeter of the base 24016 may have corresponding beveled edges and one or more interior or exterior corners of one or both of the base 24016 and the base track 24206 may be rounded. In some implementations, the base track 24206 is permanently attached to the intermediate mounting pad 24072 via an adhesive layer or welding. In other implementations, the base track 24206 is detachably attached to the intermediate mounting pad 24072 via one or more fasteners. One or more portions of the base track 24206 may be hinged or separably detachable from the rest of the base track 24206 in order to allow the base 24016 to be inserted into and removed from the base track 24206.

Although the invention has been discussed with reference to specific embodiments, it is apparent and should be understood that the concept can be otherwise embodied to achieve the advantages discussed. The preferred embodiments above have been described primarily as mobile device accessories for use with mobile devices such as mobile phones, however, the accessory may be used in conjunction with any mobile device capable of being held, operated, positioned, mounted, accessorized, or adapted. The foregoing description of the adaptive support accessory is presented for purposes of illustration and description. Furthermore, the description is not intended to limit the invention in any way to the form disclosed herein.

Accordingly, variants and modifications consistent with the following teaching, skill, and knowledge of the relevant art are within the scope of the present invention. Moreover, the accessory may be used in applications other than those specifically directed toward what are commonly regarded as mobile devices, such as carrying water bottles, or mounting picture frames. The embodiments described herein are further intended to explain modes known for practicing the invention disclosed herewith and to enable others skilled in the art to utilize the invention in equivalent or alternative embodiments and with various modifications considered necessary by the particular application(s) or use(s) of the present invention. Furthermore, structural features of different embodiments may be combined in yet another embodiment without departing from the recited claims. Since many embodiments of the invention can be made without departing from the spirit and scope of the invention, the invention resides in the claims hereinafter appended.

What is claimed is:

1. A mobile device support accessory comprising:
    a base attachable to a mobile device and including a first annular base protrusion extending longitudinally from the base and centered about an axis of rotation, the axis of rotation oriented perpendicular to the mobile device;
    a cap rotatably coupled to the base and including a first annular cap protrusion extending longitudinally from the cap, the first annular cap protrusion centered about the axis of rotation and disposed adjacent to the first annular base protrusion, the annular protrusions axially aligning the cap with reference to the base, and wherein the cap includes:
        a top perimetric face extending around the axis of rotation and providing a first engagement surface for a user's finger;
        an exterior perimetric face extending around the axis of rotation and providing a second engagement surface for the user's finger on an outside circumference of the accessory; and
        an aperture formed in the top perimetric face of the cap and centered about the axis of rotation;
    wherein an interior perimetric face of the accessory extending around the axis of rotation provides a third engagement surface for the user's finger on an inside circumference of the accessory.

2. The mobile device support accessory of claim 1, further comprising:
    a support attached to one of the base, the cap, and a plug and configured to engage with one or more of the user's finger, a mount, and a mounting structure.

3. The mobile device support accessory of claim 2, further comprising:
    a projection disposed laterally on an exterior of the cap, the projection limiting movement of the support by at least one degree of freedom.

4. The mobile device support accessory of claim 2, wherein the support includes a rigid arc-shaped structure connected to one of the base, the cap and a plug at opposing distal ends of the rigid arc-shaped structure.

5. The mobile device support accessory of claim 2, wherein the support is substantially flat and rigid.

6. The mobile device support accessory of claim 2, wherein the support includes a flexible strap attached to one of the base, the cap, and a plug.

7. The mobile device support accessory of claim 2, wherein the support is configured to extend away from the mobile device.

8. The mobile device support accessory of claim 2, wherein the cap further includes a retaining protrusion extending laterally from an exterior of the cap, the retaining protrusion to selectively engage with the support to retain the support in position.

9. The mobile device support accessory of claim 2, wherein the support includes a rigid annular structure attached to one of the base, the cap, and the plug.

10. The mobile device support accessory of claim 1, wherein the base extends radially from the first annular base protrusion conforming to a portion of one or more exterior surfaces of the mobile device.

11. The mobile device support accessory of claim 1, further comprising:
an attachment interface for detachably attaching one of the base, the cap, and a plug to one of a housing, a case, and a cover for the mobile device.

12. The mobile device support accessory of claim 1, further comprising:
one or more attachment elements arranged around the axis of rotation within the accessory.

13. The mobile device support accessory of claim 1, further comprising:
a plug configured to detachably attach within the aperture formed in the accessory.

14. The mobile device support accessory of claim 13, wherein the plug adds one or more of a storage device, battery, communication device, radio, meter, stand, tool, personal care item, electronic accessory, control device, sensor, recording device, optical device, container, toy, game, mount, support, accessory cover, and attachment element or feature to the accessory.

15. The mobile device support accessory of claim 13, wherein the plug includes a flanged attachment feature extending radially from an exterior of the plug.

16. The mobile device support accessory of claim 1, further comprising:
one or more attachment features configured to detachably attach one or more of the cap, the base, a plug, a mount, a mounting structure, a support, an accessory cover, and an attachment element to the accessory.

17. The mobile device support accessory of claim 1, further comprising:
one or more attachment elements configured to detachably attach one or more of the cap, the base, a plug, a mount, a mounting structure, a support, an accessory cover, and an attachment feature to the accessory.

18. The mobile device support accessory of claim 1, further comprising:
an electronic port and cable extending therefrom, the cable having a distal end to be detachably connected to the mobile device, wherein the electronic port and the cable extending therefrom are configured to carry one or more of power and data between the accessory and the mobile device.

19. The mobile device support accessory of claim 1, wherein the accessory includes a projection extending laterally from an exterior of the base, the projection providing an attachment to one or more of a support, an attachment interface, an attachment element, and an attachment feature.

20. The mobile device support accessory of claim 1, further comprising:
an accessory cover attachable to an exterior surface of one of the base, the cap, and a plug.

21. The mobile device support accessory of claim 1, further comprising:
an annular array of magnets centered about the axis of rotation and disposed in one or both of the base and the cap, the magnets coupling the base to the cap.

22. The mobile device support accessory of claim 1, further comprising:
an annular array of arc-shaped magnets centered about the axis of rotation and disposed in one or both of the base and the cap, the magnets axially aligned with and configured to detachably attach to a corresponding annular array of arc-shaped magnets disposed in one of a mobile device housing, a case, and a cover; the magnets rotatably coupling the accessory to one of the mobile device housing, case, and cover.

23. The mobile device support accessory of claim 1, wherein the base is substantially incorporated into one of a mobile device case and a cover.

24. A method for using a mobile device support accessory in conjunction with a mobile device comprising:
attaching a base including a first annular base protrusion extending longitudinally from the base and centered about an axis of rotation to the mobile device, the axis of rotation oriented perpendicular to the mobile device; and
rotating a cap with reference to the base about the axis of rotation, the cap rotatably coupled to the base and including a first annular cap protrusion extending longitudinally from the cap, the first annular cap protrusion centered about the axis of rotation and disposed adjacent to the first annular base protrusion, the annular protrusions axially aligning the cap with reference to the base, and wherein the cap includes:
a top perimetric face extending around the axis of rotation and providing a first engagement surface for a user's finger;
an exterior perimetric face extending around the axis of rotation and providing a second engagement surface for the user's finger on an outside circumference of the accessory; and
an aperture formed in the top perimetric face of the cap and centered about the axis of rotation;
wherein an interior perimetric face of the accessory extending around the axis of rotation provides a third engagement surface for the user's finger on an inside circumference of the accessory.

25. The method of claim 24, further comprising:
engaging a support attached to one of the base, the cap, and a plug with one or more of the user's finger, a mount, and a mounting structure.

26. The method of claim 24, further comprising:
attaching the cap to the base prior to the rotating operation.

27. A mobile device support accessory comprising:
a ring-shaped base to be attached to a mobile device and including a first annular base protrusion extending longitudinally from the base and centered about an axis of rotation, the axis of rotation oriented perpendicular to the mobile device;

a ring-shaped cap including a first annular cap protrusion extending longitudinally from the cap, the first annular cap protrusion in contact with the first annular base protrusion, the annular protrusions having engagement features to secure the cap to the base, the first annular cap protrusion further centered about the axis of rotation rendering the cap rotatable with reference to the base, wherein the accessory includes opposing projections from an exterior of the cap, wherein the cap includes:
- a top perimetric face extending around the axis of rotation and providing a first engagement surface for a user's finger;
- an exterior perimetric face extending around the axis of rotation and providing a second engagement surface for the user's finger; and
- an aperture formed in the top perimetric face of the cap and centered about the axis of rotation;

wherein an interior perimetric face of the accessory extending around the axis of rotation provides a third engagement surface for the user's finger on an inside circumference of the accessory;

a first rigid arc-shaped support rotatably connected to the cap at opposing distal ends of the first rigid arc-shaped support; and a second rigid arc-shaped support rotatably connected to the cap at opposing distal ends of the second rigid arc-shaped support, wherein the opposing projections limit movement of the first and second supports by at least one degree of freedom.

\* \* \* \* \*